(12) United States Patent
Yoneyama et al.

(10) Patent No.: US 8,057,907 B2
(45) Date of Patent: Nov. 15, 2011

(54) OPTICAL FILM, COATING COMPOSITION, POLARIZING PLATE AND IMAGE DISPLAY DEVICE

(75) Inventors: Hiroyuki Yoneyama, Minami-Ashigara (JP); Yasuhiro Okamoto, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 623 days.

(21) Appl. No.: 11/712,459

(22) Filed: Mar. 1, 2007

(65) Prior Publication Data
US 2007/0207307 A1 Sep. 6, 2007

(30) Foreign Application Priority Data
Mar. 6, 2006 (JP) .................. 2006-059999

(51) Int. Cl.
B32B 25/20 (2006.01)

(52) U.S. Cl. ........................... 428/447; 528/42

(58) Field of Classification Search ............. 428/447; 528/42
See application file for complete search history.

(56) References Cited

U.S. PATENT DOCUMENTS

2005/0121654 A1* 6/2005 Muraguchi et al. ........... 252/500
2005/0181146 A1* 8/2005 Yoneyama et al. ........... 428/1.31

FOREIGN PATENT DOCUMENTS

| JP | 9-127305 A | | 5/1997 |
|---|---|---|---|
| JP | 10-148701 | * | 6/1998 |
| JP | 2005-119909 A | | 5/2005 |
| JP | 2005-196122 A | | 7/2005 |

* cited by examiner

Primary Examiner — Kuo-Liang Peng
(74) Attorney, Agent, or Firm — Buchanan Ingersoll & Rooney PC

(57) ABSTRACT

An optical film, which comprises: a support; and a layer containing an electrically-conductive particulate material, in which an interior of the electrically-conductive particulate material is porous or hollow, wherein the optical film comprises a fluorine-containing silane compound.

19 Claims, 2 Drawing Sheets

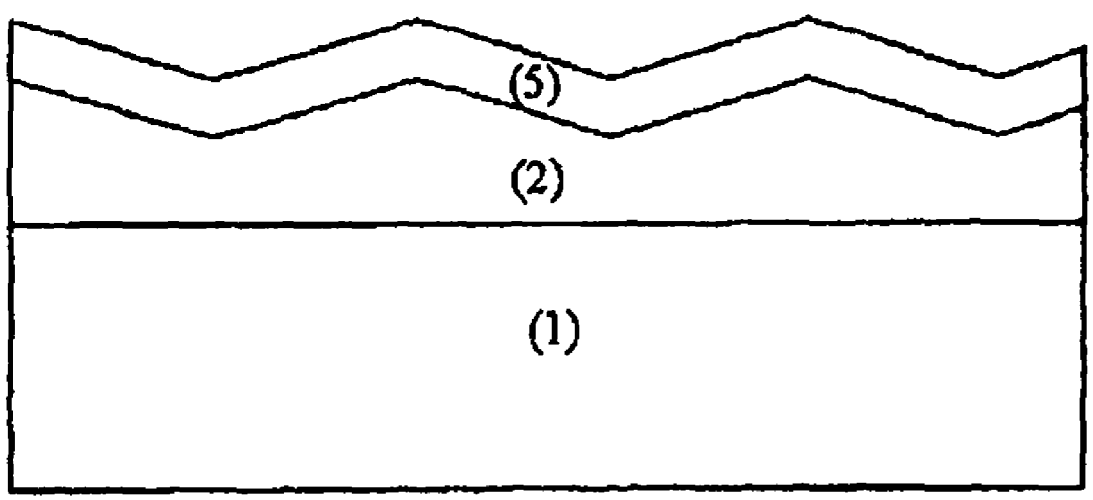

OPTICAL FILM, COATING COMPOSITION, POLARIZING PLATE AND IMAGE DISPLAY DEVICE

BACKGROUND OF THE INVENTION

1. Field of the Invention

The present invention relates to an optical film and more particularly to an anti-reflection film, a coating composition, a polarizing plate and an image display device.

2. Description of the Related Art

In recent years, display devices have been more used at home. Thus, these display devices have been required to have sufficient toughness against handling by ordinary users. The optical film to be provided on the surface of various image display devices such as liquid crystal display device (LCD), plasma display panel (PDP), electroluminescence display (ELD), cathode ray tube (CRT) and SED (Surface-Conduction Electron-emitter Display) is required to have a high physical strength (e.g., scratch resistance), transparency, chemical resistance and weathering resistance (e.g., moist heat resistance, light-resistance). Further, in order to prevent the drop of contrast by the reflection of external light or image, anti-glare properties or anti-reflection properties are required. Further, a countermeasure for preventing the attachment of dust deteriorating the viewability of display to the surface of the optical film is required.

From the standpoint of prevention of the attachment of stain, it is effective to lower the surface free energy of the optical film. To this end, a fluorine-containing stain inhibitor is disclosed (see, e.g., JP-A-9-127305).

On the other hand, it is known to provide an antistatic layer containing an electrically-conductive particulate material from the standpoint of prevention of attachment of dust (see, e.g., JP-A-2005-196122).

From the standpoint of reduction of the refractive index of electrically-conductive particulate material, a particulate silica the surface of which is coated with antimony oxide is proposed (see, e.g., JP-A-2005-119909).

SUMMARY OF THE INVENTION

However, the fluorine-containing stain inhibitor as disclosed in JP-A-9-127305 can be electrostatically charged. As the amount of the fluorine-containing stain inhibitor used increases, dust can be attached to the surface of the optical film more easily. It has thus been desired to render the optical film sufficiently stainproof without limiting the amount of the fluorine-containing stain inhibitor used.

The method disclosed in JP-A-2005-196122 requires the provision of further layers that gives burden on procedural time and economy. Further, most electrically-conductive particulate materials which have been heretofore used have a refractive index of from about 1.6 to 2.2. Therefore, the refractive index of the antistatic layer containing such a particulate material is occasionally high. In the case where the refractive index of the antistatic layer is high, the resulting optical film can unexpectedly exhibit a raised interference unevenness or tint of reflected light. It has thus been desired to eliminate these defects.

The particularly material as disclosed in JP-A-2005-119909, too, has been required to have further improvements in stainproofness.

Because of its chargeability, a fluorine-containing stain inhibitor has heretofore been used in a limited amount or used in combination with an antistatic layer. When a fluorine-containing stain inhibitor and an electrically-conductive particulate material are introduced (into, e.g., a low refractive index layer), desired stainproofness and antistatic properties can be attained at the same time by a simple layer configuration. It is an aim of the invention to provide an optical film excellent in stainproofness and dustproofness.

The inventors made extensive studies of solution to the aforementioned problems. As a result, an optical film having a specific structure defined by the invention was found. It was further found that this optical film has exceptional optical properties beyond expectation. Thus, the invention has been worked out.

(1) An optical film, which comprises:
a support; and
a layer containing an electrically-conductive particulate material, in which an interior of the electrically-conductive particulate material is porous or hollow,
wherein the optical film comprises a fluorine-containing silane compound.

(2) The optical film as described in (1) above, which further comprises:
a stainproof layer containing a fluorine-containing silane compound provided on or above the layer containing the electrically-conductive particulate material.

(3) The optical film as described in (1) or (2) above,
wherein the layer containing the electrically-conductive particulate material comprises at least one cured material of a hydrolyzate of an organosilane and a condensate of the organosilane.

(4) The optical film as described in any of (1) or (3) above,
wherein the layer containing the electrically-conductive particulate material comprises a fluorine-containing silane compound and is an outermost surface.

(5) The optical film as described in any of (1) to (4) above,
wherein the fluorine-containing silane compound is a compound represented by formula [1]:

$$(Rf\text{-}L_1)_n\text{-}Si(R^{11})_{4-n} \quad \text{Formula [1]}$$

wherein Rf represents a $C_1$-$C_{20}$ straight-chain, branched or cyclic fluorine-containing alkyl group or a $C_6$-$C_{14}$ fluorine-containing aromatic group;
$L_1$ represents a divalent connecting group having 10 or less carbon atoms;
$R^{11}$ represents an alkyl group, a hydroxyl group or a hydrolyzable group; and
n represents an integer of from 1 to 3.

(6) The optical film as described in (5) above,
wherein the fluorine-containing silane compound represented by formula [1] is represented by formula [2]:

$$C_nF_{2n+1}\text{---}(CH_2)_m\text{---}Si(R)_3 \quad \text{Formula [2]}$$

wherein n represents an integer of 10 or more;
m represents an integer of from 1 to 5; and
R represents a $C_1$-$C_5$ alkoxy group or a halogen atom.

(7) The optical film as described in any of (1) to (4) above,
wherein the fluorine-containing silane compound contains a perfluoropolyether group.

(8) The optical film as described in (7) above,
wherein the fluorine-containing silane compound is a compound represented by formula [3]:

Formula [3]

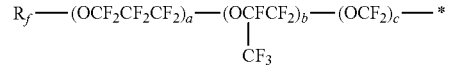

-continued

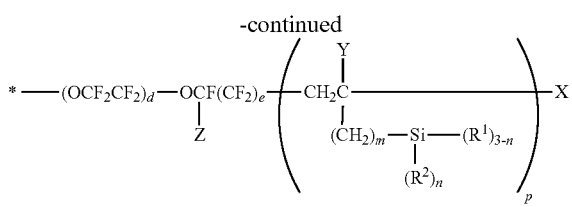

wherein Rf represents a $C_1$-$C_{16}$ straight-chain or branched perfluoroalkyl group;
X represents an iodine atom or a hydrogen atom;
Y represents a hydrogen atom or a lower alkyl group;
Z represents a fluorine atom or a trifluoromethyl group;
$R^1$ represents a hydrolyzable group;
$R^2$ represents a hydrogen atom or an inactive monovalent organic group;
a, b, c and d each independently represents an integer of from 0 to 200;
e represents an integer of 0 or 1;
m and n each independently represents an integer of from 0 to 2; and
p represents an integer of from 1 to 10.

(9) The optical film as described in (8) above,
wherein the fluorine-containing silane compound represented by formula [3] is a compound represented by formula [4]:

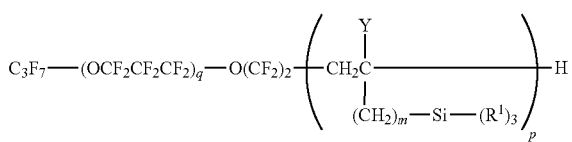

Formula [4]

wherein Y represents a hydrogen atom or a lower alkyl group;
$R^1$ represents a hydrolyzable group;
q represents an integer of from 1 to 50;
m represents an integer of from 0 to 2; and
p represents an integer of from 2 to 10.

(10) The optical film as described in any of (1) to (4) above,
wherein the fluorine-containing silane compound is a compound represented by formula [5]:

$$Rf^5[-(L_5)_n\text{-}X\text{—}R^{51}\text{—}Si(OR^{52})_3]_m \qquad \text{Formula [5]}$$

wherein $Rf^5$ represents a perfluoropolyether group;
$R^{51}$ represents an alkylene group;
$R^{52}$ represents an alkyl group;
$L_5$ represents —CO—;
X represents a group selected from the group consisting of —O—, —$NR^{53}$—, —S—, —$SO_2$—, —$SO_2NR^{53}$— and —$NR^{53}CO$—;
$R^{53}$ represents a hydrogen atom or an alkyl group having 3 or less carbon atoms;
n represents a natural number of 0 or 1; and
m represents a natural number of 2 or less.

(11) The optical film as described in any of (1) to (10) above,
wherein the layer containing the fluorine-containing silane compound further contains a compound represented by formula [7]:

$$R^{71}\text{—}Si(OR^{72})_3 \qquad \text{Formula [7]}$$

wherein $R^{71}$ represents a long-chain hydrocarbon group having 10 or more carbon atoms; and
$R^{72}$ represents an alkyl group.

(12) The optical film as described in any of (1) to (11) above,
wherein a ratio of peak area (Si2p/Fls) of silicon atom (Si2p) to fluorine atom (Fls) on a surface of the optical film as measured by X-ray photoelectron spectroscopy is from not smaller than 0.0 to not greater than 0.4.

(13) The optical film as described in any of (1) to (12) above, which has a dynamic friction coefficient of from not smaller than 0.02 to not greater than 0.30.

(14) The optical film as described in any of (1) to (13) above, which has a contact angle of 95° or more with respect to water.

(15) The optical film as described in any of (1) to (14) above, which has a surface resistivity of 12 or less as expressed in terms of log (SR).

(16) The optical film as described in any of (1) to (15) above,
wherein the layer containing the electrically-conductive particulate material is a low refractive index layer and has a thickness of from not smaller than 130 nm to not greater than 500 nm.

(17) A coating composition, which comprises the following components (A), (B) and (C):
(A) an electrically-conductive particulate material, in which an interior of the electrically-conductive particulate material is porous or hollow;
(B) at least one of an organosilane, a hydrolyzate of the organosilane and a condensate of the organosilane; and
(C) at least one of a fluorine-containing silane compound, a hydrolyzate of the fluorine-containing silane compound and a condensate of the fluorine-containing silane compound.

(18) The coating composition as described in (17) above,
wherein the fluorine-containing silane compound of the component (C) is represented by one of formulae [1] to [5]:

$$(\text{Rf-}L_1)_n\text{-}Si(R^{11})_{4-n} \qquad \text{Formula [1]}$$

wherein Rf represents a $C_1$-$C_{20}$ straight-chain, branched or cyclic fluorine-containing alkyl group or a $C_6$-$C_{14}$ fluorine-containing aromatic group;
$L_1$ represents a divalent connecting group having 10 or less carbon atoms;
$R^{11}$ represents an alkyl group, a hydroxyl group or a hydrolyzable group; and
n represents an integer of from 1 to 3, $$C_nF_{2n+1}\text{—}(CH_2)_m\text{—}Si(R)_3 \qquad \text{Formula [2]}$$

wherein n represents an integer of 10 or more;
m represents an integer of from 1 to 5; and
R represents a $C_1$-$C_5$ alkoxy group or a halogen atom, Formula [3]

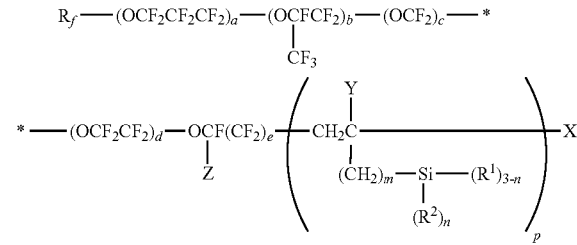

wherein Rf represents a $C_1$-$C_{16}$ straight-chain or branched perfluoroalkyl group;

X represents an iodine atom or a hydrogen atom;

Y represents a hydrogen atom or a lower alkyl group;

Z represents a fluorine atom or a trifluoromethyl group;

$R^1$ represents a hydrolyzable group;

$R^2$ represents a hydrogen atom or an inactive monovalent organic group;

a, b, c and d each independently represents an integer of from 0 to 200;

e represents an integer of 0 or 1;

m and n each independently represents an integer of from 0 to 2; and p represents an integer of from 1 to 10, Formula [4]

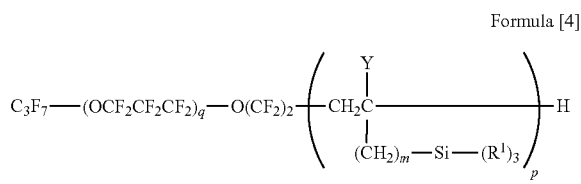

wherein Y represents a hydrogen atom or a lower alkyl group;

$R^1$ represents a hydrolyzable group;

q represents an integer of from 1 to 50;

m represents an integer of from 0 to 2; and p represents an integer of from 2 to 10, and

   Formula [5]

wherein $Rf^5$ represents a perfluoropolyether group;

$R^{51}$ represents an alkylene group;

$R^{52}$ represents an alkyl group;

$L_5$ represents —CO—;

X represents a group selected from the group consisting of —O—, —$NR^{53}$—, —S—, —$SO_2$—, —$SO_2NR^{53}$— and —$NR^{53}CO$—;

$R^{53}$ represents a hydrogen atom or an alkyl group having 3 or less carbon atoms;

n represents a natural number of 0 or 1; and m represents a natural number of 2 or less.

(19) A polarizing plate, which comprises an optical film as described in any of (1) to (16) above.

(20) An image display device, which comprises an optical film as described in any of (1) to (16) above.

BRIEF DESCRIPTION OF THE DRAWINGS

FIG. 5 is a schematic sectional view diagrammatically illustrating a still further preferred exemplary embodiment of the film of the invention, wherein (1) denotes support; (2) denotes hard coat layer; (3) denotes middle refractive index layer; (4) denotes high refractive index layer; and (5) denotes low refractive index layer.

DETAILED DESCRIPTION OF THE INVENTION

Figure 1:
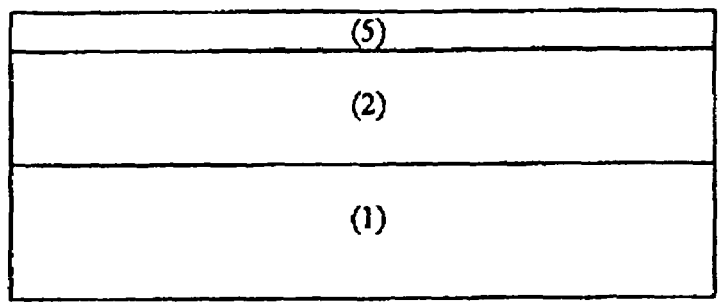
FIG. 1 is a schematic sectional view diagrammatically illustrating a preferred exemplary embodiment of the film of the invention.

The invention will be further described hereinafter. In the present specification, in the case where the numerical value represents physical value or other properties, the term "(numerical value 1) to (numerical value 2)" as used herein is meant to indicate "from not smaller than "numerical value 1" to not greater than "numerical value 2"). The terms "(meth)acrylate" as used herein is meant to indicate "at least any of acrylate or methacrylate". This can apply also to "(meth)acrylic acid", etc.

The optical film of the invention is an optical film comprising an electrically-conductive particulate material the interior of which is porous or hollow and a fluorine-containing silane compound. Preferably, the layer comprising an electrically-conductive particulate material contains at least any one cured material of hydrolyzate and/or condensate of organosilane. The layer comprising an electrically-conductive particulate material is not specifically limited in its function in the optical film and can act as an electrically-conductive layer, hard coat layer, anti-glare layer, low refractive index layer or the like. It is particularly preferred that the layer comprising an electrically-conductive particulate material act as a low refractive index layer. In an embodiment comprising a fluorine-containing silane compound incorporated in the layer comprising an electrically-conductive particulate material and/or its upper adjacent stainproof layer, the effect of the invention can be exerted most remarkably. In the invention, it was quite beyond expectation that the combined use of an electrically-conductive particulate material the interior of which is porous or hollow and a fluorine-containing silane compound makes it possible to not only render the optical film electrically-conductive and stainproof but also enhance stainproof durability of the optical film. It is possible that the electrically-conductive particulate material the interior of which is porous or hollow has some effect on the reactivity or fixability of the fluorine-containing silane compound on the film. This mechanism will be apparent from future analysis.

The constituents of the invention will be further described hereinafter.

<Electrically-Conductive Particulate Material the Interior of which is Porous or Hollow>

The electrically-conductive particulate material of the invention the interior of which is porous or hollow will be described hereinafter. The electrically-conductive particulate material of the invention may have any composition or structure so far as it is an electrically-conductive particulate material the interior of which is porous or hollow. Preferred examples of the electrically-conductive particulate material of the invention include core/shell type composite particulate material comprising a high porosity (high void) particulate material as a nucleus and an electrically-conductive material shell layer provided thereoutside and inner bore type hollow particulate material obtained by providing an electrically-conductive material shell layer outside an acid-, alkali- or organic solvent-soluble particulate material as a nucleus to form a composite particulate material, and then subjecting the composite particulate material to treatment with an acid, alkali or organic solvent so that the nuclear particle is removed therefrom to form an inner bore.

In any case, the nuclear particle may be electrically-conductive or non-conductive.

In the former case, i.e., core-shell type composite particulate material, the kind of the nuclear particle to be used herein is not limited so far as it is a high porosity particulate material and can be provided with a shell. Preferred examples of the nuclear particle employable herein include silica gel, synthetic or natural zeolite, carbon black, fullerene, and porous titanium oxide. Particularly preferred among these nuclear particles is silica gel.

In the latter case, i.e., inner bore type hollow particulate material, the kind of the nuclear particles to be used in the production procedure is not limited so far as when treated with an acid, alkali or organic solvent, it can be dissolved away through the shell layer. Preferred examples of the nuclear particles employable herein include particulate materials made of metal selected from the group consisting of elements belonging to the group 2A, 2B, 3A and 5B of the periodic table. Particularly preferred among these particulate metal oxides are particulate ZnO, $Y_2O_3$ and $Sb_2O_5$.

Examples of the method for providing a shell in the case of core-shell type composite particulate material include sol-gel conversion method involving the use of metal alkoxide, particulate metal addition method involving the use of a coupling agent or its hydrolyzate, and method involving the doping with an electrically-conductive material.

For example, the aforementioned inorganic particulate material may be formed directly on the surface of particulate $SiO_2$ produced by the method disclosed in JP-A-7-133105 or JP-A-2001-233611 by a sol-gel method involving the use of a metal alkoxide or the like.

Referring to the combination of nuclear particle and shell material in the case of inner bore type hollow particulate material, there may be used a method which comprises coating the surface of particulate material such as ZnO, $Y_2O_3$ and $Sb_2O_5$ with a particulate material such as ATO, ITO and $SnO_2$ or its thin film, and then eluting the internal particulate material with an acidic or alkaline aqueous solution to form a hollow electrically-conductive particulate material. For the details of particulate silica the surface of which is coated with antimony oxide, reference can be made to JP-A-2005-119909.

On the other hand, it is known that a metal such as Au, Ag, Cu, Sn, Al, Ni, Fe and Rh or an alloy such as Al—Cu and Cu—Ni is colored but exhibits a relatively low refractive index equal to or less than 1.7 and a high electrical conductivity. Accordingly, the use of a small amount of such a particulate metal (alloy) as a shell makes it possible to form an electrically-conductive particulate material having a substantially high transparency and a low refractive index.

The core-shell type composite particulate material comprising a shell formed by a coupling agent, which is a preferred embodiment of the hollow electrically-conductive particulate material of the invention, will be further described hereinafter.

This electrically-conductive particulate material is a composite particulate material having a particulate semiconductor or particulate insulating material having an average particle diameter of from 2 nm to 100 nm as a nucleus and a particulate metal filler having an average particle diameter of from 1 nm to 20 nm bonded to the surface of the particulate semiconductor or particulate insulating material via at least one coupling agent or its hydrolyzate. In the invention, the nuclear particle of the aforementioned particulate semiconductor or insulating material is preferably made of a transparent compound having a refractive index of 1.70 or less. Examples of such a compound include $Al_2O_3$ and $SiO_2$. The coupling agent has two reactive groups per molecule. At least one of the two reactive groups is bonded to the particulate semiconductor or insulating material and at least the other reactive group is bonded to the particulate metal so that the particulate semiconductor or insulating material and the particulate metal are bridged. A hydrolyzate of the coupling agent may act to bridge the particulate semiconductor or insulating material to the particulate metal. The coupling agent is preferably a compound represented by the following formula [A].

$$M\text{-}(R)_n \quad [A]$$

In the formula [A], M represents Si or Al, and n represents an integer corresponding to the valency of M. R represents an organic group. R's in a number of n may be the same or different. At least two of R's in a number of n are a group reactive with particulate semiconductor, particulate inorganic material or ultrafinely divided metal.

Examples of the group reactive with particulate semiconductor, particulate inorganic material or ultrafinely divided metal among the organic groups represented by R include (1) reactive groups such as vinyl group, allyloxy group, acryloyloxy group, methacryloxy group, isocyanato group, formyl group, epoxy group, styryl group, ureido group and halogen or alkyl group terminated thereby, (2) alkyl groups terminated by adsorbing group such as —SH, —CN, —$NH_2$, —$SO_2OH$, —SOOH, —OPO(OH)$_2$ and —COOH, (3) alkoxy groups such as methoxy group, ethoxy group, isopropoxy group, n-propoxy group and t-butoxy group, n-butoxy group and (4) phenoxy groups. These alkyl groups, alkoxy groups and phenoxy groups each have 8 or less carbon atoms. These alkyl groups, alkoxy groups and phenoxy groups each may further have substituents. The other organic groups represented by R may be arbitrary but each have 8 or less carbon atoms.

Specific examples of the coupling agent employable herein will be given below, but the invention is not limited thereto.

N-(2-aminoethyl)-3-amiopropylmethyldimethoxy silane, N-(2-aminoethyl)-3-aminopropyltrimethoxy silane, 3-aminophenoxydimethylvinylsilane, aminophenyltrimethoxysilane, 3-aminopropyltriethoxy silane, bis(trimethoxysilylpropyl)amine, (p-chloromethyl)phenyltrimethoxysilane, (3-glycycloxypropyl)trimethoysilane, 3-mercaptopropyltrimethoxy silane, (3-glycycloxypropyl)-3-mercaptopropyldimethoxy silane, vinyl trichlorosilane, tetraethoxysilane, aminophenyl aluminum dimethoxide, aluminum isopropoxide.

The ultrafinely divided metal is preferably made of a metal or alloy (composite metal) having a specific resistivity of 20 μΩ·cm or less (preferably 10 μΩ·cm or less, more preferably 6 μΩ·cm or less) at 20° C. It is known that the physical properties of a metal or alloy normally differ from bulk to particle. The range of the specific resistivity of the ultrafinely divided metal indicates those of the bulk of metal or alloy. Accordingly, these physical properties are disclosed in literatures such as "Kagaku Binran (Chemical Handbook)", The Chemical Society of Japan, and "Bunseki Kagaku Binran (Handbook of Analytical Chemistry)", The Chemical Society of Japan.

Examples of metals satisfying the aforementioned conditions include Au, Ag, Cu, Zn, Cd, Al, In, Tl, Sn, Co, Ni, Fe, Pd, Ir, Mo, Pt, Ru, Rh, and W. Preferred among these metals are Au, Ag, Cu, Pt, Pd, Ni, Ru and Sn, which have a low specific resistivity and thus can be difficulty oxidized. In the case where the aforementioned ultrafinely divided metal is made of an alloy, an alloy containing at least one of Au, Ag, Cu, Pt, Pd, Ni, Ru and Sn is preferably used. Examples of such an alloy include Cu—Zn, Cu—Sn, Al—Cu, Cu—Sn—P, Cu—Ni, Au—Ag—Cu, Au—Zn, Au—Ni, Ag—Cu—Zn, Ag—Cu—Zn—Sn, Sn—Pb, Ag—In, Cu—Ag—Ni, and Ag—Pd. However, the invention is not limited to these examples. The composition ratio of the various metals in the alloy is not specifically limited and may be varied. The metal or alloy may contain impurity elements, but its content is preferably less than 1%. Examples of these impurity elements include metals such as Cr, Sb, Bi and Rh. Examples of impurity elements other than metal include nonmetallic elements such as P, B, C, N and S, alkaline metals such as Na and K, and alkaline earth metals such as Mg and Ca. One or more of these impurity elements may be incorporated in the metal or alloy.

The particulate core/shell type composite material preferably has an ultrafinely divided metal bonded thereto in an amount of at least 1/10 times by mass, more preferably 1/5 times by mass based on the mass of nuclear particle. (In this specification, mass ratio is equal to weight ratio.)

In the invention, the electrically-conductive particulate material has a refractive index of from 1.20 to 2.00, more preferably from 1.30 to 1.80, particularly preferably from 1.30 to 1.70, most preferably from 1.35 to 1.65.

The powder specific resistivity of the electrically-conductive particulate material of the invention is preferably as low as possible, more preferably $1 \times 10^5$ Ω·cm or less, even more preferably $1 \times 10^4$ Ω·cm or less, still more preferably $1 \times 10^3$ Ω·cm or less, particularly preferably $1 \times 10^2$ Ω·cm or less. For the measurement of the powder resistivity, the sample powder may be molded at a pressure of 9.8 MPa (100 kg/cm$^2$) to form a compressed powder material. The compressed powder material is then measured for dc resistivity. For the details of this method, reference can be made to JP-A-6-92636.

The average particle diameter of primary particles of the electrically-conductive particulate material is preferably not higher than the visible light wavelength range (i.e., 400 nm or less), more preferably from 1 nm to 200 nm, even more preferably from 1 nm to 100 nm, particularly preferably from 1 nm to 80 nm. In the case where the particulate material is an internal hollow type particle, the thickness of the shell portion constituting the shell of the particle is preferably from 1 nm to 100 nm, more preferably from 1 nm to 50 nm, most preferably from 1 nm to 20 nm. The electrically-conductive particulate material may be in the form of any of grain, sphere, cube, spindle, rod, amorphous form and mixture thereof. The term "average particle diameter" as used herein is meant to indicate the average of the maximum diameter of particles. For example, in the case of spindle form particles, the average of main axis diameter of the particles is defined to be average particle diameter. The particle diameter of the electrically-conductive particulate material is defined by the average of diameter electron-microphotographically measured on at least 1,000 particles.

<Organosilane Compound to be Used in the Layer Containing an Electrically-Conductive Particulate Material of the Invention>

The organosilane compound to be used in the invention will be further described hereinafter. This compound can be used a binder for the layer containing an electrically-conductive particulate material of the invention as it is or in the form of hydrolyzate or condensate. The formula of the organosilane compound will be shown below.

(B)

In the formula (B), $R^{10}$ represents a substituted or unsubstituted alkyl or aryl group. Examples of the alkyl group include methyl group, ethyl group, propyl group, isopropyl group, hexyl group, t-butyl group, sec-butyl group, hexyl group, decyl group, and hexadecyl group. The alkyl group preferably has from 1 to 30 carbon atoms, more preferably from 1 to 16 carbon atoms, particularly preferably from 1 to 6 carbon atoms. Examples of the aryl group include phenyl groups, and naphthyl groups. Phenyl groups are preferred.

X represents a hydroxyl group or hydrolyzable group. Preferred examples of the hydrolyzable group include alkoxy groups (preferably a $C_1$-$C_5$ alkoxy group, i.e., methoxy group, ethoxy group), halogen atoms (e.g., Cl, Br, I), and $R^2$COOR group (in which $R^2$ is preferably a hydrogen atom or $C_1$-$C_5$ alkyl group such as $CH_3COO$ and $C_2H_5COO$). More desirable among these hydrolyzable groups are alkoxy groups, particularly preferably methoxy group or ethoxy group.

The suffix m represents an integer of from 0 to 3. When there are a plurality of $R^{10}$'s or X's, they may be the same or different. The suffix m is preferably 0, 1 or 2.

The substituents to be contained in $R^{10}$ are not specifically limited. Examples of these substituents employable herein include halogen atoms (e.g., fluorine atom, chlorine atom, bromine atom), hydroxyl groups, mercapto groups, carboxyl groups, epoxy groups, alkyl groups (e.g., methyl group, ethyl group, i-propyl group, propyl group, t-butyl group), aryl groups (e.g., phenyl group, naphthyl group), aromatic heterocyclic groups (e.g., furyl group, pyrazolyl group, pyridyl group), alkoxy groups (e.g., methoxy group, ethoxy group, i-propoxy group, hexyloxy group), aryloxy groups (e.g., phenoxy group), alkylthio groups (e.g., methylthio group, ethylthio group), arylthio groups (e.g., phenylthio group), alkenyl groups (e.g., vinyl group, 1-propenyl group), acyloxy groups (e.g., acetoxy group, acryloyloxy group, methacryloyloxy group), alkoxycarbonyl groups (e.g., methoxycarbonyl group, ethoxycarbonyl group), aryloxycarbonyl groups (e.g., phenoxycarbonyl group), carbamoyl groups (e.g., carbamoyl group, N-methylcarbamoyl group, N,N-dimethylcarbamoyl group, N-methyl-N-octylcarbamoyl group), and acylamino groups (e.g., acetylamino group, benzoylamino group, acrylamino group, methacrylamino group). These substituents may be further substituted. In the present specification, even a single atom that substitutes hydrogen atom is treated as a substituent for convenience.

At least one of the plurality of $R^{10}$'s, if any, is preferably a substituted or unsubstituted alkyl or aryl group. In particular, the substituted alkyl or aryl group has a vinyl-polymerizable group.

Preferred examples of the compound employable herein include tetraalkoxysilanes such as tetramethoxysilane, tetraethoxysilane, tetrapropoxy silane and tetrabutoxysilane, trialkoxysilanes such as methyltrimethoxysilane, methyltriethoxysilane, ethyl trimethoxysilane, ethyltrimethoxysilane, propyl trimethoxysilane, propyltriethoxysilane, butyl triethoxysilane, butyltriethoxysilane, pentyltrimethoxysilane, pentyltriethoxysilane, heptyl trimethoxysilane, heptyltriethoxysilane, octyl trimethoxysilane, octyltriethoxysilane, dodecyl trimethoxysilane, dodecyltriethoxysilane, hexadecyl trimethoxysilane, hexadecyltriethoxysilane, octadecyl trimethoxysilane, octadecyltriethoxysilane, phenyl trimethoxysilane, phentyltriethoxysilane, vinyltrimethoxysilane, γ-aminopropyltrimethoxy silane, γ-aminopropyltriethoxysilane, γ-glycidoxy propyltrimethoxysilane, γ-glycidoxypropyltriethoxy silane, γ-methacryloylpropyltrimethoxysilane, γ-methacryloxypropyltriethoxysilane, γ-acryloxypropyl trimethoxysilane and γ-acryloxypropyltriethoxysilane, and dialkoxysilanes such as dimethyldimethoxysilane and dimethyldiethoxysilane. Preferred among these compounds are tetramethoxysilane, tetraethoxysilane and γ-acryloxypropyltrimethoxysilane from the standpoint of dispersion stability of inorganic particles in the cured composition and scratch resistance.

(Hydrolysis and Condensation Reaction of Organosilane)

In the invention, the organosilane compound may be previously hydrolyzed or partially condensed before being incorporated in the coating composition. At least any one of the hydrolysis and condensation reaction of the organosilane is preferably effected in the presence of a catalyst. Examples of the catalyst employable herein include inorganic acids such as hydrochloric acid, sulfuric acid and nitric acid, organic acids such as oxalic acid, acetic acid, formic acid, methanesulfonic acid and toluenesulfonic acid, inorganic bases such as sodium hydroxide, potassium hydroxide and ammonia, organic bases such as triethylamine and pyridine, and metal alkoxides such as triisopropoxy aluminum and tetrabutoxy zirconium. From the standpoint of production stability and storage stability of solution of inorganic oxide particles, at least any one of acid catalysts (inorganic acids, organic acids) and metal chelate compounds is used in the invention. Preferred among the inorganic acids are hydrochloric acid, sulfuric acid and nitric acid. Preferred among the organic acids are those having a dissociation constant (pKa value (25° C.)) of 4.5 or less in water. In some detail, preferred among the organic acids are methanesulfonic acid, oxalic acid, phthalic acid and malonic acid, particularly preferably oxalic acid.

In the invention, the metal chelate compound to be used in the production of hydrolyzate of organosilane and condensation reaction of organosilane is preferably at least one metal chelate compound comprising an alcohol represented by the formula $R^3OH$ (in which $R^3$ represents a $C_1$-$C_{10}$ alkyl group) and a compound represented by the formula $R^4COCH_2COR^5$ (in which $R^4$ represents a $C_1$-$C_{10}$ alkyl group; and $R^5$ represents a $C_1$-$C_{10}$ alkyl or alkoxy group) as a ligand and a metal selected from the group consisting of Zr, Ti and Al as a central metal.

As the metal chelate compound there may be used any metal chelate compound having a metal selected from the group consisting of Zr, Ti and Al as a central metal without limitation. Two or more metal chelate compounds may be used in combination if they fall within this category. Specific examples of these metal chelate compounds employable herein include zirconium chelate compounds such as tri-n-butoxy ethyl acetoacetate zirconium, di-n-butoxybis(ethyl acetoacetate) zirconium, n-butoxytris(ethylaceto acetate)zirconium, tetrakis(n-propylacetoacetate) zirconium, tetrakis(acetylacetoacetate)zirconium and tetrakis(ethylacetoacetate)zirconium, titanium compounds such as diisopropoxy bis(ethylacetoacetate)titanium, diisopropoxy bis(acetylacetate)titanium and diisopropoxy bis(acetylacetone)titanium, and aluminum chelate compounds such as diisopropoxyethyl acetoacetate aluminum, diisopropoxyacetylacetonate aluminum, isopropoxy bis(ethylacetoacetate)aluminum, isoproposy bis(acetylacetonate)aluminum, tris(ethyl acetoacetate) aluminum, tris(acetylacetonate)aluminum and monoacetyl acetonate bis(ethylacetoacetate) aluminum.

Preferred among these metal chelate compounds are tri-n-butoxyethyl acetoacetate zirconium, diisopropoxy bis(acetylacetonate)titanium, diisopropoxy ethyl acetoacetate aluminum and tris(ethylacetoacetate) aluminum. These metal chelate compounds may be used singly or in combination of two or more thereof. Alternatively, these metal chelate compounds may be used in the form of partial hydrolyzate.

The hydrolysis and condensation reaction of the organosilane may be effected free from solvent or in a solvent. In accordance with this reaction, the curable composition of the invention can be produced. In the case where a solvent is used, the concentration of the hydrolyzate of organosilane and the partial condensate thereof can be properties predetermined.

As such a solvent there is preferably used an organic solvent to mix the components uniformly. Preferred examples of such an organic solvent employable herein include alcohols, aromatic hydrocarbons, ethers, ketones, and esters. The solvent is preferably capable of dissolving organosilane and catalyst therein. Further, the organic solvent is preferably used as a coating solution or a part thereof from the procedural standpoint of view. The organic solvent to be used herein preferably does not impair its dissolving power or dispersing properties when mixed with other materials such as fluorine-containing polymer.

Examples of the alcohols among these organic solvents employable herein include monovalent alcohols and divalent alcohols. Preferred examples of the monovalent alcohols include $C_1$-$C_8$ saturated aliphatic alcohols. Specific examples of these alcohols include methanol, ethanol, n-propyl alcohol, i-propyl alcohol, n-butyl alcohol, sec-butyl alcohol, tert-butyl alcohol, ethylene glycol, diethylene glycol, triethylene glycol, ethylene glycol monobutyl ether, and ethylene glycol monoethyl ether acetate.

Specific examples of the aromatic hydrocarbons include benzene, toluene, and xylene. Specific examples of the ethers include tetrahydrofurane, and dioxane. Specific examples of the ketones include acetone, methyl ethyl ketone, methyl isobutyl ketone, and diisobutyl ketone. Specific examples of the esters include ethyl acetate, propyl acetate, butyl acetate, and propylene acetate. These organic solvents may be used singly or in combination of two or more thereof. The concentration of solid content in the solvent during the reaction is not specifically limited but is normally from 1% to 90% by mass, preferably from 20% to 70% by mass.

The hydrolysis and condensation reaction is normally carried out by adding water in an amount of from 0.3 to 2 mols, preferably from 0.5 to 1 mols per mol of the hydrolyzable group in organosilane, and then stirring the mixture in the absence or presence of the aforementioned solvent in the presence of a catalyst at 25 to 100° C. In the case where the hydrolyzable group is an alkoxy group and the acid catalyst is an organic acid, the carboxyl group or sulfo group of the organic acid provides proton, making it possible to reduce the added amount of water. The amount of water to be added per mol of hydrolyzable group such as alkoxy group of organosilane is from 0 to 2 mols, preferably from 0 to 1.5 mols, more preferably from 0 to 1 mols, particularly preferably from 0 to 0.5 mols. In the case where an alcohol is used as a solvent, it is also preferred that water is substantially not added.

The amount of the acid catalyst to be used, if the acid catalyst is an inorganic acid, is from 0.01 to 10 mol-%, preferably from 0.1 to 5 mol-% based on the amount of the hydrolyzable group. The optimum amount of the acid catalyst to be used, if the acid catalyst is an organic acid, depends on the added amount of water. In the case where water is added, the amount of the acid catalyst to be used is from 0.01 to 10 mol-%, preferably from 0.1 to 5 mol-% based on the amount of the hydrolyzable group. In the case where water is substantially not added, the amount of the acid catalyst to be used is from 1 to 500 mol-%, preferably from 10 to 200 mol-%, more preferably from 20 to 200 mol-%, even more preferably from 50 to 150 mol-%, particularly preferably from 50 to 120 mol-% based on the amount of the hydrolyzable group. The reaction is carried out by stirring the mixture at a temperature of from 25° C. to 100° C. However, the reaction is preferably adjusted depending on the reactivity of the organosilane.

(Shape and Molecular Mass of Hydrolyzate and Condensation Product of Organosilane)

The shape of the hydrolyzate and condensation product of the organosilane to be used in the invention may be a chain or three-dimensional network. The mass-average molecular mass of these compounds is preferably from 300 to 10,000 in ethylene glycol equivalence. When the mass-average molecular mass of these compounds falls within the above defined range, the resulting curable composition exhibits a good spreadability and storage stability and the cured film can be provided with sufficient scratch resistance to advantage. The mass-average molecular mass in ethylene glycol equivalence is more preferably from 300 to 9,000, particularly preferably from 300 to 8,000.

The aforementioned mass-average molecular mass is a molecular mass obtained by converting values detected with DMF by a differential refractometer using a GPC analyzer with columns TSKgel GMHxL, TSKgel G4000HxL and TSKgel G2000HxL (trade name of products of TOSOH CORPORATION) in ethylene glycol equivalence.

<Fluorine-Containing Organosilane Compound to be Contained in the Surface of the Optical Film of the Invention>

The fluorine-containing organosilane compound to be contained in the surface of the optical film of the invention will be further described hereinafter. The fluorine-containing organosilane compound is not limited so far as it is an organosilane compound containing fluorine atom. However, compounds represented by the following formulae [1] to [4] are preferred. These compounds will be sequentially described hereinafter.

$$(Rf-L_1)_n-Si(R^{11})_{4-n} \quad [1]$$

In the formula [1], Rf represents a $C_1$-$C_{20}$ straight-chain, branched or cyclic fluorine-containing alkyl group or $C_6$-$C_{14}$ fluorine-containing aromatic group. Rf may be further substituted by other substituents. Rf is more preferably a $C_3$-$C_{14}$ straight-chain, branched or cyclic fluoroalkyl group, more preferably a $C_4$-$C_{14}$ straight-chain fluoroalkyl group. $L_1$ represents a divalent connecting group having 10 or less carbon atoms, preferably a $C_1$-$C_{10}$ alkylene group, more preferably a $C_1$-$C_5$ alkylene group. The alkylene group is a substituted or unsubstituted straight-chain or branched alkylene group which may have a connecting group (e.g., ether, ester, amide) thereinside. The alkylene group may have substituents. Preferred examples of the substituents employable herein include halogen atoms, hydroxyl groups, mercapto groups, carboxyl groups, epoxy groups, alkyl groups, and aryl groups. $R^{11}$ represents an alkyl group, hydroxyl group or hydrolyzable group, preferably a $C_1$-$C_5$ alkoxy group or halogen atom, more preferably a methoxy group, ethoxy group or chlorine atom. When there are a plurality of Rf's, $L_1$'s or $R^{11}$'s, then may be the same or different, respectively. The suffix n represents an integer of from 1 to 3.

Preferred among the fluorine-containing silane compounds represented by the formula [1] is a fluorine-containing silane compound represented by the following formula [2].

$$C_nF_{2n+1}\text{—}(CH_2)_m\text{—}Si(R)_3 \quad [2]$$

In the formula [2], n represents an integer of 10 or more, and m represents an integer of from 1 to 5. R represents a $C_1$-$C_5$ alkoxy group or halogen atom. The suffix n is preferably from 10 to 14, the suffix m is preferably from 1 to 3, and R is preferably a methoxy group, ethoxy group or chlorine atom.

The use of a compound represented by the formula [2] makes it possible to enhance the stainproof durability of the optical film. The optical film comprising a compound represented by the formula [2] is excellent particularly in stainproof durability after being rubbed with a cloth impregnated with a weakly alkaline detergent. This is presumably because the surface of the layer is covered by fluorine atom and the fluorine-containing compound has so high a fixability that it cannot come off the surface of the layer even when the layer is rubbed under alkaline conditions.

Specific examples of the fluorine-containing silane coupling agents represented by the formula [1] or [2] will be given below, but the invention is not limited thereto.

| | |
|---|---|
| $C_6F_{13}CH_2CH_2Si(OCH_3)_3$ | A-1 |
| $C_4F_9CH_2CH_2Si(OCH_3)_3$ | A-2 |
| $C_8F_{17}CH_2CH_2Si(OCH_3)_3$ | A-3 |
| $C_6F_{13}CH_2CH_2Si(OC_2H_5)_3$ | A-4 |
| $C_8F_{17}CH_2CH_2Si(OC_2H_5)_3$ | A-5 |
| $C_4F_9CH_2CH_2Si(OC_2H_5)_3$ | A-6 |
| $C_6F_{13}CH_2CH_2SiCl_3$ | A-7 |
| $C_8F_{17}CH_2CH_2SiCl_3$ | A-8 |
| $C_4F_9CH_2CH_2SiCl_3$ | A-9 |
| $C_6F_{13}CH_2CH_2Si(OCH_3)_2CH_3$ | A-10 |
| $C_8F_{13}CH_2CH_2CH_2Si(OCH_3)_3$ | A-11 |
| $C_4F_9CH_2CH_2CH_2Si(OCH_3)_3$ | A-12 |
| $C_8F_{17}CH_2CH_2CH_2Si(OCH_3)_3$ | A-13 |
| $C_6F_{13}CH_2Si(OC_2H_5)_3$ | A-14 |
| $C_8F_{17}CH_2CH_2Si(OC_4H_9)_3$ | A-15 |
| $C_4F_9CH_2CH_2CH_2Si(OCH_3)_3$ | A-16 |
| $C_6F_{13}CH_2CH_2Si(OCH_3)_2Br$ | A-17 |
| $C_8F_{17}CH_2CH_2CH_2Si(OCH_3)_2Cl$ | A-18 |
| $C_4F_9CH_2CH_2Si(CH_3)_2OCH_3$ | A-19 |
| $C_6F_{13}CH_2CH_2Si(OCH_3)Cl_2$ | A-20 |
| $(CF_3)_2CFCF_2CF_2CH_2CH_2Si(OCH_3)_3$ | A-21 |
| $(C_4F_9)_2CFCH_2CH_2Si(OCH_3)_3$ | A-22 |
| $(C_6F_{13})_2CFCH_2CH_2Si(OCH_3)_3$ | A-23 |
| $(CF_3)_3CCF_2CH_2CH_2Si(OCH_3)_3$ | A-24 |
| $(C_4F_9)_3CCH_2CH_2Si(OCH_3)_3$ | A-25 |
| $(CF_3)_2CFOCH_2CH_2CH_2Si(OC_2H_5)_3$ | A-26 |
| $(CF_3)_2CFOCH_2CH_2CH_2SiCl_3$ | A-27 |

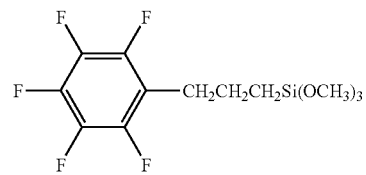

A-28

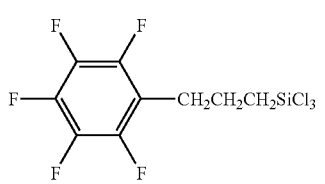  A-29

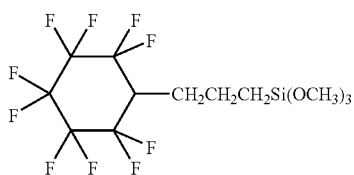  A-30

H(CF₂)₆CH₂Si(OCH₃)₃  A-31

H(CF₂)₄CH₂Si(OCH₃)₃  A-32

H(CF₂)₈CH₂Si(OCH₃)₃  A-33

(CH₃O)₃SiCH₂CH₂(CF₂)₆CH₂CH₂Si(OCH₃)₃  A-34

(CH₃O)₃SiCH₂CH₂(CF₂)₄CH₂CH₂Si(OCH₃)₃  A-35

(CH₃O)₃SiCH₂CH₂(CF₂)₈CH₂CH₂Si(OCH₃)₃  A-36

(C₂H₅O)₃SiCH₂CH₂(CF₂)₆CH₂CH₂Si(OC₂H₅)₃  A-37

(C₂H₅O)₃SiCH₂CH₂(CF₂)₄CH₂CH₂Si(OCH₃)₃  A-38

Cl₃SiCH₂CH₂(CF₂)₆CH₂CH₂SiCl₃  A-39

(CH₃O)₂CH₃SiCH₂CH₂(CF₂)₆CH₂CH₂Si(OCH₃)₂CH₃  A40

C₃F₇CH₂CH₂Si(OC₂H₅)₃  A-41

C₈F₁₇CH₂CH₂Si(CH₃)(OCH₃)₂  A-42

C₁₀F₂₁CH₂CH₂Si(OCH₃)₃  A-43

C₁₀F₂₁CH₂CH₂Si(OC₂H₅)₃  A-44

C₁₂F₂₄CH₂CH₂Si(OCH₃)₃  A-45

C₁₄F₂₉CH₂CH₂Si(OCH₃)₃  A-46

Preferred among these specific examples are (A-43), (A-45) and (A-46), particularly preferably (A-43). These compounds can be synthesized by the method disclosed in, e.g., JP-A-11-189599.

In the invention, from the standpoint of enhancement of surface slipperiness in addition to stainproofness, a fluorine-containing silane compound containing a perfluoropolyether group is preferably used. Preferred structural formulae of the fluorine-containing silane compound will be sequentially described hereinafter.

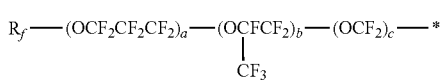  [3]

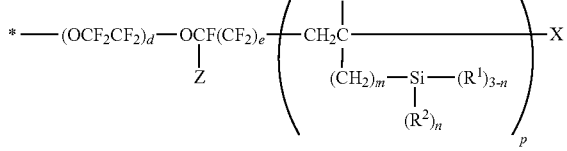

wherein Rf represents a $C_1$-$C_{16}$ straight-chain or branched perfluoroalkyl group; X represents an iodine atom or hydrogen atom; Y represents a hydrogen atom or lower alkyl group; Z represents a fluorine atom or trifluoromethyl group; $R^1$ represents a hydrolyzable group; $R^2$ represents a hydrogen atom or inactive monovalent organic group; a, b, c and d each represent an integer of from 0 to 200; e represents an integer of 0 or 1; m and n each represent an integer of from 0 to 2; and p represents an integer of from 1 to 10.

In the formula [3], Rf is normally a $C_1$-$C_{16}$ straight-chain or branched perfluoroalkyl group, preferably $CF_3$ group, $C_2F_5$ group or $C_3F_7$ group. Examples of the lower alkyl group represented by Y include those having from 1 to 5 carbon atoms. Preferred examples of the hydrolyzable group represented by $R^1$ include halogen atoms such as chlorine atom, bromine atom and iodine atom, $R^3O$ group, $R^3COO$ group, $(R^4)_2C=C(R^3)CO$ group, $(R^3)_2C=NO$ group, $R^5C=NO$ group, $(R^4)_2N$ group, and $R^3CONR^4$ group (in which $R^3$ is a $C_1$-$C_{10}$ aliphatic hydrocarbon group such as alkyl group or $C_6$-$C_{20}$ aromatic hydrocarbon group such as phenyl group, $R^4$ is a hydrogen atom or a $C_1$-$C_5$ lower aliphatic hydrocarbon group such as alkyl group, and $R^5$ is a $C_3$-$C_6$ divalent aliphatic hydrocarbon group such as alkylidene group). More desirable are chlorine atom, $CH_3O$ group and $C_2H_5O$ group. $R^2$ is a hydrogen atom or an inactive monovalent organic group, preferably a $C_1$-$C_4$ monovalent hydrocarbon group such as alkyl group. The suffixes a, b, c and d each are an integer of from 0 to 200, preferably from 1 to 50. The suffixes m and n each are an integer of from 0 to 2, preferably 0. The suffix p is an integer of from 1 or 2 or more, preferably from 1 to 10, more preferably from 1 to 5. The number-average molecular mass of the compound is preferably from $5\times10^2$ to $1\times10^5$, more preferably from $1\times10^3$ to $1\times10^4$.

Preferred examples of the structure of the fluorine-containing silane compound represented by the formula [3] include those wherein Rf is a $C_3F_7$ group, the suffix a is an integer of from 1 to 50, the suffixes b, c and d each are 0, the suffix e is 1, Z is a fluorine atom, n is 0, and p is from 2 to 10, i.e., compound represented by the following formula [4].

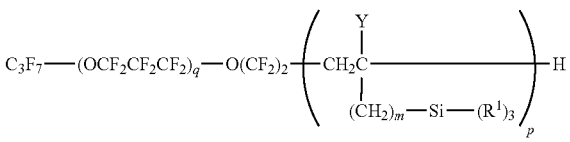  [4]

wherein Y, m and $R^1$ are as defined above; q represents an integer of from 1 to 50; and p represents an integer of from 2 to 10.

In the invention, in order to enhance stainproof durability, particularly after being rubbed with an alkaline detergent, p is preferably 2 or more, most preferably 3 or more. It is presumed that when the connection of the fluorine-containing ether compound is connected to the main body of matrix via a plurality of connecting groups wherein p is 2 or more, the durability is enhanced.

These fluorine-containing silane compounds can be obtained by subjecting a commercially available perfluoropolyether to silane treatment. For example, they can be obtained in the manner as shown in JP-A-1-294709.

The compound having a perfluoropolyether group represented by the following formula, too, is excellent in stainproofness.

$$Rf^5[-(L_5)_n-X-R^{51}-Si(OR^{52})_3]_m \quad [5]$$

wherein $Rf^5$ represents a perfluoropolyether group; $R^{51}$ represents an alkylene group; $R^{52}$ represents an alkyl group; $L_5$ represents —CO—; X represents a group selected from the group consisting of —O—, —NR$^{53}$—, —S—, —SO$_2$—, —SO$_2$NR$^{53}$— and —NR$^{53}$CO— in which $R^{53}$ represents a hydrogen atom or an alkyl group having 3 or less carbon atoms; n represents a natural number of 0 or 1; and m represents a natural number of 2 or less.

In the formula [5], among the perfluoropolyether groups $Rf^5$, monovalent groups include those of the following formulae [51], [52] and [53]. However, the invention is not limited to these structural formulae. The perfluoropolyether group $Rf^5$ may be divalent. In this case, $Rf^5$ group is terminated by an alkoxysilane compound at the both ends thereof. The molecular mass of the perfluoropolyether group, too, is not specifically limited. However, there may be used one having a molecular mass of from 500 to 10,000, preferably from 500 to 2,000 as calculated in terms of number-average molecular mass from the standpoint of stability or handleability.

$$F(CF_2CF_2CF_2O)_j- \quad [51]$$

$$CF_3(OCF(CF_3)CF_2)_m(OCF_2)_l- \quad [52]$$

$$F(CF(CF_3)CF_2O)_k- \quad [53]$$

In the formulae [51], [52] and [53], j, k, l and m each represent a natural number of 1 or more.

Specific examples of these compounds are disclosed in, e.g., JP-A-10-148701.

Examples of the organosilazalane compound which exhibits a high curing reactivity include a compound represented by the following formula.

$$[C_nF_{2n+1}C_mH_{2m}Si(CH_3)_2]_2-NH \quad [6]$$

In the formula [6], n represents an integer of 4 or more, and m is 2 or 3. Examples of such a disilazalane compound include the following compounds.

$$[C_4F_9C_2H_4(CH_3)_2Si]_2NH$$

$$[C_4F_9C_3H_6(CH_3)_2Si]_2NH$$

$$[C_8F_{17}C_2H_4(CH_3)_2Si]_2NH$$

$$[C_8F_{17}C_3H_6(CH_3)_2Si]_2NH$$

$$[C_8F_{17}C_3H_6(CH_3)(C_2H_5)Si]_2NH$$

$$[C_{10}F_{21}C_3H_6(CH_3)_2Si]_2NH$$

These compounds may be used singly or in admixture. These compounds are disclosed in JP-A-10-26703.

As the fluorine compound to be used in the invention, an alkoxysilane compound having a perfluoropolyether group represented by any of the aforementioned formulae [3] to [5] is preferred to compounds having a simple perfluoroalkyl group from the standpoint of abrasion resistance or water repellency. The reason is not definitely known. However, this is presumably because the fluorine compound groups have mutual interaction not a little or the mutual interaction between the alkoxysilane compound group, which is a polar group, and the underground layer changes.

As a high molecular fluorine-containing silane compound there is preferably used a compound disclosed in JP-A-2000-191977, JP-A-2000-204319, JP-A-2000-328001, etc. because it can eliminate spreading defects.

(Method for Disposing Fluorine-Containing Silane Compound on Optical Film)

The fluorine-containing silane compound of the invention may be incorporated in the coating composition with the aforementioned electrically-conductive particulate material of the invention, organosilane compound, hydrolyzate or condensate thereof before the formation of the coat film. Alternatively, the fluorine-containing silane compound may be provided on the layer containing an electrically-conductive particulate material of the invention as a separate stainproof layer. Further, both the two structures may be used. The aforementioned method which comprises incorporating the fluorine-containing silane compound of the invention in the same coating composition as the electrically-conductive particulate material does not require the provision of another stainproof layer and thus provides a high productivity. In the case where another stainproof layer is provided, even when a difficulty-soluble fluorine-containing silane compound is used, a dedicated solvent may be used. Alternatively, vacuum evaporation free from solvent may be used. From a standpoint of improving stainproof durability, the addition to a stainproof layer is preferable.

The fluorine-containing silane compound can be previously partially condensed to the organosilane compound of the invention before use to advantage from the standpoint of stability of coat layer conditions. It is particularly preferred from the standpoint of stainproof durability that the fluorine-containing organosilane compound-containing layer further comprise an organosilane compound represented by the following formula [7].

$$R^{71}-Si(OR^{72})_3 \quad [7]$$

wherein $R^{71}$ represents a long-chain hydrocarbon group having 10 or more carbon atoms; and $R^{72}$ represents an alkyl group. The long-chain hydrocarbon group $R^{71}$ preferably has 10 or more carbon atoms. Which the long-chain hydrocarbon group $R^{71}$ is straight-chain or branched is not questioned. The long-chain hydrocarbon group $R^{71}$ may further contain an unsaturated bond or a cyclic structure such as aromatic ring. However, a straight-chain hydrocarbon group having from 12 to 20 carbon atoms is preferably selected. In accordance with such a molecular design, the alkoxysilano moiety of the formula [7] can have mutual interaction with $SiO_2$ or the like in the antireflection layer. Further, the moiety of long-chain hydrocarbon group $R^{71}$ exhibits an enhanced hydrophobicity. As a result, the intermolecular mutual action between the hydrophobic groups, i.e., van der Waals force is enhanced. When the organosilane compound of the formula [7] is used in combination with the alkoxysilane compound having a perfluoropolyether group represented by any of the formulae [3] to [5], these effects can be synergistically exerted, making it possible to remarkably enhance the solvent resistance, water repellency and abrasion resistance of the optical film.

In the case where the fluorine-containing silane compound is incorporated in the stainproof layer, the proportion of the fluorine-free organosilane compound based on 100 parts by mass of the fluorine-containing organosilane compound is preferably from not smaller than 1 parts by mass to not greater than 150 parts by mass, more preferably from not smaller than 1 parts by mass to not greater than 50 parts by mass. When the proportion of the fluorine-free organosilane compound falls within the above defined range, the resulting optical film exhibits an excellent stainproofness and scratch resistance.

In the optical film of the invention, the layer containing an electrically-conductive particulate material the interior of which is porous or hollow preferably contains a fluorine-containing silane compound. This layer also preferably is an outermost layer.

<Coating Composition of Layer Containing Electrically-Conductive Particulate Material of the Invention>

The layer containing an electrically-conductive particulate material of the invention is preferably formed by a coating composition containing the electrically-conductive particulate material, the organosilane compound of the invention and optionally the fluorine-containing silane compound of the invention. Specific examples of the film forming method employable herein include spin coating method, dip coating method, roll coating method, gravure coating method, curtain flow coating method, and die coating method.

(Surface Modification of Electrically-Conductive Particulate Material)

The electrically-conductive particulate material of the invention may be optionally subjected to surface treatment from the standpoint of stability in the coating solution, enhancement of the electrical conductivity of the coat film and enhancement of the strength of the coat film. The surface treatment methods to be used in the invention can be roughly divided into two methods, i.e., method involving the treatment with a compound which forms a covalent bond with the surface of particles and method involving the treatment with a compound which forms no covalent bonds with the surface of particles.

The compound which forms no covalent bonds with the surface of particles is not specifically limited but is preferably a nonionic surface active agent or cationic surface active agent having HLB value of from not smaller than 4 to not greater than 10 or the like.

A basic low molecular amine can provide the coat film with an enhanced electrical conductivity and thus is a desirable dispersant.

Preferred examples of the compound which forms a covalent bond with the surface of particles include silane coupling agents and titanate coupling agents. Most desirable among these compounds are silane coupling agents. It is particularly preferred that the electrically-conductive particulate material be subjected to surface treatment with at least one of silane coupling agent (organosilane compound) and hydrolyzate and condensate thereof.

Specific examples of the compound which forms a covalent bond with the surface of particles include the aforementioned fluorine-free or fluorine-containing silane compounds of the invention. In the invention, organosilane compounds having (meth)acryloyl group, epoxy group, oxetanyl group or fluorine-substituted alkyl group are particularly preferred. The amount of the silane coupling agent to be used is not specifically limited but is preferably from 1% by mass to 300% by mass, more preferably from 1% by mass to 100% by mass, most preferably from 3% by mass to 50% by mass based on the amount of the electrically-conductive particulate material.

When the amount of the organosilane compound to be used falls within the above defined range, the effect of stabilizing the dispersion can be fully exerted to attain the rise of strength of coat film or a high electrical conductivity.

(Solvent for Coating Composition)

The electrically-conductive particulate material according to the invention described above can be combined with a binder and optionally a diluent solvent to form a coating composition by which the various layers of the optical film are then formed. The solvent for coating composition is not limited but preferably contains at least two volatile solvents. For example, at least two selected from the group consisting of alcohols, derivatives thereof, ethers, ketones, hydrocarbons and esters are preferably used in combination. The solvent employable herein can be selected from the standpoint of solubility of binder components, stability of electrically-conductive particulate material, adjustment of viscosity of coating solution, etc. The boiling point of the solvent to be used in the invention is preferably from not lower than 50° C. to not higher than 250° C., more preferably from not lower than 65° C. to not higher than 200° C. The dielectric constant of the solvent to be used in the invention is preferably from not smaller than 1 to not greater than 50, more preferably from not smaller than 5 to not greater than 30 at 20° C. A solvent having a dielectric constant of not smaller than 10 is preferably incorporated in an amount of not smaller than 10% by mass based on the amount of the electrically-conductive particulate material.

Examples of the solvent employable herein will be given below, but the invention is not limited thereto.

Alcohols and derivatives thereof (e.g., methanol, ethanol, n-propanol, isopropyl alcohol, n-butanol, isobutanol, secondary butanol, tertiary butanol, n-amyl alcohol, isoamyl alcohol, secondary amyl alcohol, 3-pentanol, tertiary amyl alcohol, n-hexanol, methyl amyl alcohol, 2-ethylbutanol, n-heptanol, 2-heptanol, 3-heptanol, n-octanol, 2-octanol, 2-ethylhexanol, 3,5,5-trimethylhexanol, nonaol, benzyl alcohol, ethylene glycol, ethylene glycol monomethyl ether, ethylene glycol monomethyl ether acetate, ethylene glycol monomethyl ethyl ether, ethylene glycol diethyl ether, ethylene glycol monoethyl ether acetate, ethylene glycol isopropyl ether, ethylene glycol monobutyl ether, ethylene glycol dibutyl ether, ethylene glycol monobutyl ether acetate, ethylene glycol isoamyl ether, methoxy methoxy ethanol, methoxy propanol, butoxy ethanol, ethylene glycol monoacetate, ethylene glycol diacetate, diethylene glycol, diethylene glycol monomethyl ether, diethylene glycol monoethyl ether, diethylene glycol diethyl ether, propylene glycol, propylene glycol monomethyl ether, propylene glycol monoethyl ether, propylene glycol monobutyl ether, dipropylene glycol monomethyl ether, dipropylene glycol monomethyl ether, dipropylene glycol monoethyl ether)

Ethers (isopropyl ether, n-butyl ether, diisoamyl ether, methyl phenyl ether, ethyl phenyl ether)

Ketones (acetone, methyl acetone, methyl ethyl ketone, methyl-n-propyl ketone, methyl-n-butyl, methyl isobutyl ketone, methyl-n-amyl ketone, methyl-n-hexyl ketone, diethyl ketone, ethyl-n-butyl ketone, di-n-propyl ketone, diisobutyl ketone, acetonyl acetone, diacetone alcohol, cyclohexanone, methyl cyclohexanone)

Hydrocarbons (n-hexane, isohexane, n-heptane, n-octane, isooctane, n-decane, toluene, xylene, ethyl benzene, diethyl benzene, isopropyl benzene, amyl benzene)

Esters (propyl formate, n-butyl formate, isobutyl formate, amyl formate, ethyl acetate, n-propyl acetate, isopropyl acetate, n-butyl acetate, isobutyl acetate, secondary butyl acetate, n-amyl acetate, isoamyl acetate, methyl isoamyl acetate, methoxy butyl acetate, secondary hexyl acetate, 2-ethyl butyl acetate, 2-ethyl hexyl acetate, cyclohexyl acetate, methyl cyclohexyl acetate, benzyl acetate, methyl propionate, ethyl propionate, n-butyl propionate, isoamyl propionate, methyl butyrate, ethyl butyrate, n-butyl butyrate, isoamyl butyrate, ethyl oxyisobutyrate, methyl acetoacetate, ethyl acetoacetate, isoamyl isovalerate, methyl lactate, ethyl lactate, n-butyl lactate, isobutyl lactate, n-amyl lactate, isoamyl lactate, methyl benzoate, diethyl oxalate)

Referring to particularly preferred combination of solvents, an alcohol is preferably used in combination with at least two, more preferably three of derivatives of alcohol, ketones and esters. Preferably, two or more selected from the group consisting of methyl ethyl ketone, methyl isobutyl ketone, cyclohexanone, butyl acetate, 2-methoxy propanol, 2-butoxy ethanol, isopropyl alcohol, methyl alcohol and ethyl alcohol are used in combination.

<Solvent for Stainproof Layer>

The fluorine-containing silane compound of the invention may be incorporated also in the stainproof layer which can be provided on the layer containing the electrically-conductive particulate material of the invention. In the case where the stainproof layer is formed by spreading, the stainproof layer coating compound is preferably diluted with a solvent to control the thickness of the layer made of the fluorine-containing silane compound or improve workability. Examples of the solvent employable herein include $C_5$-$C_{12}$ perfluoroaliphatic hydrocarbons such as perfluorohexane, perfluoromethyl cyclohexane and perfluoro-1,3-dimethyl cyclohexane, polyfluorinated aromatic hydrocarbons such as bis(trifluoromethyl)benzene, and polyfluorinated aliphatic hydrocarbons. The concentration of the fluorine-containing silane compound in the coating solution is preferably from 0.05% to 0.5% by mass.

<Method for Curing Coat Film>

The layer containing the electrically-conductive particulate material of the invention is formed by spreading the coating composition over a support, and then allowing the solvent to be evaporated. The curing conditions depend on the kind of the organosilane compound or catalyst used, but the curing temperature is preferably from 20° C. to 200° C., more preferably from 60° C. to 140° C., most preferably from 80° C. to 110° C. When the curing temperature falls within the above defined range, a sufficient curing rate can be attained, making it possible to eliminate damage on the support. The curing time is not specifically limited but is normally from 1 to 50 hours, when the curing temperature is 60° C. and preferably from 1 minute to 30 minutes when the curing temperature is 140° C. As the curing catalyst there is preferably used any of the acids exemplified above with reference to the hydrolysis of organosilane.

The curing conditions of the stainproof layer are the same as mentioned above. The stainproof layer coating composition may be spread after the curing of the underlying layer but is preferably spread and cured without curing the underlying layer or after partial curing of the underlying layer to enhance the fixability of the fluorine-containing silane compound and hence the stainproofness of the stainproof layer.

Further, in the case where the layer containing an electrically-conductive particulate material contains a radically-polymerizable compound represented by polyfunctional acrylate in the lower surface thereof, the layer may be irradiated with ionizing radiation before, during or after heat curing. In this manner, the interfacial bond of the two layers can be raised, making it possible to enhance the scratch resistance of the coat film. The materials to be used in the underlying layer will be described later with reference to paragraph 1-(1).

<Formulation and Physical Properties of Coat Film>

In the layer containing the electrically-conductive particulate material of the invention, the volume fraction of the electrically-conductive particulate material is preferably from not smaller than 15% to not greater than 90%, more preferably from not smaller than 30% to not greater than 80%, most preferably from not smaller than 40% to not greater than 70%. When the volume fraction of the electrically-conductive particulate material falls within the above defined range, the electrical conductivity and the scratch resistance of the layer can be predetermined to fall within the desired range.

In the layer containing the electrically-conductive particulate material, the volume fraction of the hydrolyzate and/or condensate of the organosilane compound of the invention among the components other than the electrically-conductive particulate material is preferably from not smaller than 5% to not greater than 100%, more preferably from not smaller than 10% to not greater than 100%.

In the case where the fluorine-containing silane compound of the invention is used in the same layer as the electrically-conductive particulate material of the invention and the organosilane compound of the invention, the fluorine-containing silane compound is preferably used in an amount of from not smaller than 0.01% to not greater than 50% by mass, more preferably from not smaller than 0.1% to 20% by mass, most preferably from not smaller than 0.2% to not greater than 10% by mass based on the total solid content of the layer.

Further, the layer containing the electrically-conductive particulate material of the invention may further comprise other inorganic particulate materials incorporated therein. For example, when a porous or hollow particulate material free of electrically-conductive component described later is used, the refractive index of the layer can be lowered. Further, when a general-purpose particulate silica having a dense interior is used, the scratch resistance of the coat film can be enhanced. These materials will be further described later with reference to paragraph <Low refractive index particles>.

Referring to the formulation of the coating composition, various components may be used in admixture such that the aforementioned formulation can be attained after the curing of the coat film. The solid content concentration of the coating composition is preferably from not smaller than 1% to not greater than 10% by mass, more preferably from not smaller than 1% to not greater than 5% by mass.

The thickness of the layer containing the electrically-conductive particulate material of the invention is not specifically limited. In the case of hard coat layer, the thickness thereof is preferably from not smaller than 0.1 μm to not greater than 50 μm, more preferably from not smaller than 1.0 μm to not greater than 20 μm. In the case of the low refractive index layer, the thickness thereof is preferably from not smaller than 30 nm to not greater than 500 nm, more preferably from not smaller than 70 nm to not greater than 500 nm. In order to lower electrical conductivity, the thickness of the low refractive index layer is preferably from not smaller than 130 nm to not greater than 500 nm, most preferably from not smaller than 230 nm to not greater than 330 nm.

The refractive index of the layer containing the electrically-conductive particulate material of the invention is not specifically limited and may be predetermined as required by the layer in which the electrically-conductive particulate material is incorporated. In the case of the low refractive index layer, the thickness thereof is from not smaller than 1.30 to not greater than 1.48, more preferably from not smaller than 1.35 to not greater than 1.46, most preferably from not smaller than 1.35 to not greater than 1.45. When the refractive index falls within the above defined range, the reduction of refractive index and the enhancement of electrical conductivity can be attained at the same time.

In the case where the stainproof layer containing a fluorine-containing silane compound of the invention is provided, the thickness thereof is preferably from not smaller than 0.5 nm to not greater than 150 nm, more preferably from not smaller than 1.0 nm to not greater than 10 nm. In the case where the layer disposed directly under the stainproof layer comprises a fluorine atom-containing compound incorporated therein, the stainproof layer does not necessarily be uniform to provide stainproofness, which is one of the aims of the invention.

(Formulation of Elements of Surface of Optical Film)

Referring to element formulation of the surface of the optical film of the invention, the ratio of peak area (Si2p/Fls) of silicon atom (Si2p) to fluorine atom (Fls) on the surface of the film as measured by X-ray photoelectron spectroscopy described below is preferably from not smaller than 0.0 to not greater than 0.4, more preferably from not smaller than 0.0 to not greater than 0.3, most preferably from not smaller than 0.05 to not greater than 0.15. The smaller this ratio is, the more is the proportion of fluorine atom based on silicon atom in the surface of the film and the more can be expected the reduction of surface free energy.

In the invention, the term "peak area ratio" as used above is defined to be calculated from the area of photoelectron spectrum of Si2p and Fls on the outermost surface measured using a Type ESCA-3400 X-ray photoelectron spectroscope (produced by Shimadzu Corporation; degree of vacuum: $1 \times 10^{-5}$ Pa; X-ray source: target Mg; voltage: 12 kV; current: 20 mA).

(Surface Resistivity of Optical Film)

The surface resistivity of the optical film is preferably from $10^5$ to $10^{12}$ Ω/sq, more preferably from $10^6$ to $10^{11}$ Ω/sq, most preferably from $10^7$ to $10^{10}$ Ω/sq. The surface resistivity of the antistatic layer can be measured at 25° C. and 60% RH by a four-point probe method.

(Contact Angle of Optical Film)

The contact angle of the film of the invention with respect to purified water is preferably 95° or more, more preferably 100° or more, most preferably 105° or more. The contact angle of the film of the invention with respect to purified water can be measured, e.g., by the following method.

Using a Type CA-V contact angle meter (produced by Kyowa Interface Science Co., Ltd.), a 2 μl droplet of purified water as a liquid was formed on the surface of the film under dried conditions (25° C./60% RH). The angle on the liquid side between the line normal to the surface of the liquid and the surface of the film at the point at which the film and the liquid come in contact with each other is defined to be contact angle.

(Surface Free Energy of Optical Film)

The surface energy can be determined by a contact angle method, wet heat method or adsorption method as described in "Nure no kiso to oyo (Elementary and Application of Wetting)", Realize Corporation, Dec. 10, 1989. For the film of the invention, the contact angle method is preferably used.

In some detail, two solutions having known surface energies are dropped onto the film. The angle between the line normal to the droplet and the surface of the film at the crossing point of the surface of the droplet with the surface of the film is defined to be contact angle. The measurements can then be subjected to calculation to determine surface energy.

The term "surface free energy ($\gamma s^v$: unit: mN/m) of the film of the invention" as used herein is meant to indicate a surface tension defined by the value $\gamma s^v$ ($=\gamma s^d + \gamma s^h$) represented by the sum of $\gamma s^d$ and $\gamma s^h$ determined from the contact angle of purified water $H_2O$ and methylene iodide $CH_2I_2$ determined experimentally on the optical film according to D. K. Owens, "J. Appl. Polym. Sci.", 13, 1741 (1969). The smaller the value $\gamma s^v$ is and the lower the surface free energy is, the higher is the repellency of the surface and the better is stainproofness in general.

For the measurement of contact angle, a Type CA-V automatic contact angle meter (produced by Kyowa Interface Science Co., Ltd.) was used. A 2 μl droplet was dropped onto the film at 25° C. and 60% RH. After 30 seconds, contact angle was determined.

The surface free energy of the optical film of the invention is preferably 25 mN/m or less, more preferably 20 mN/m.

(Dynamic Friction Coefficient of Optical Film)

As an indication of surface slipperiness there may be used dynamic friction coefficient. The dynamic friction coefficient of the optical film of the invention is preferably from not smaller than 0.02 to not greater than 0.30, more preferably from not smaller than 0.02 to not greater than 0.25, most preferably from not smaller than 0.05 to not greater than 0.20. When the dynamic friction coefficient of the optical film of the invention falls within the above defined range, the stainproofness and scratch resistance of the optical film can be kept good.

For the measurement of dynamic friction coefficient, the film sample was moisture-conditioned at 25° C. and 60% RH for 24 hours. Using a Type HEIDON-14 dynamic friction coefficient meter, measurement was effected with a 5 mmφ stainless steel sphere at a load of 100 g and a speed of 60 cm/min.

1. Constituents Of The Invention

The various compounds to be incorporated in the film of the invention will be further described hereinafter.

1-(1) Binder

The film of the invention can be formed by the crosslinking reaction or polymerization reaction of a heat- and/or ionizing radiation-curable compound. In some detail, the film of the invention can be formed by spreading a coating composition containing an ionizing radiation-curable polyfunctional monomer or polyfunctional oligomer as a binder over a transparent support, and then allowing the polyfunctional monomer or polyfunctional oligomer to undergo crosslinking reaction or polymerization reaction.

As the ionizing radiation-curable polyfunctional monomer or oligomer there is preferably used a photo-, electron ray- or radiation-polymerizable compound, particularly preferably a photo-polymerizable compound.

Examples of the photo-polymerizable functional group employable herein include unsaturated polymerizable functional groups such as (meth)acryloyl group, vinyl group, styryl group and allyl group. Preferred among these light-polymerizable functional groups is (meth)acryloyl group. In particular, the following compounds each containing two or more (meth)acryloyl groups per molecule are preferably used.

Specific examples of the photo-polymerizable polyfunctional monomer having a photopolymerizable functional group include:

(Meth)acrylic acid diesters of alkylene glycol such as neopentyl glycol acrylate, 1,6-hexanediol (meth)acrylate and propylene glycol di(meth)acrylate;

(Meth)acrylic acid diesters of polyoxyalkyene glycol such as triethylene glycol di(meth)acrylate, dipropylene glycol di(meth)acrylate, polyethylene glycol di(meth)acrylate and polypropylene glycol di(meth)acrylate;

(Meth)acrylic acid diesters of polyvalent alcohol such as pentaerythritol di(meth)acrylate; and (Meth)acrylic acid diesters of ethylene oxide or propylene oxide adduct such as 2,2-bis {4-(acryloxy•diethoxy) phenyl}propane and 2-2-bis {4-(acryloxy•polypropoxy) phenyl}propane.

Further, epoxy(meth)acrylates, urethane (meth)acrylates and polyester (meth)acrylates, too, are preferably used as photopolymerizable polyfunctional monomer.

Preferred among these photo-polymerizable monomers are esters of polyvalent alcohol with (meth)acrylic acid. More preferably, a polyfunctional monomer having three or more (meth)acryloyl groups per molecule is used. Specific examples of such a polyvalent monomer employable herein include trimethylolpropane tri(meth)acrylate, trimethylolethane tri(meth) acrylate, 1,2,4-cyclohexanetetra(meth)acrylate, pentaglycerol triacrylate, pentaerythritol tetra(meth) acrylate, pentaerythritol tri(meth)acrylate, (di) pentaerythritol triacrylate, (di)pentaerythritol pentaacrylae, (di)pentaerythritol tetra(meth)acrylate, (di)pentaerthritol hexa (meth)acrylate, tripentaerythritol triacrylate, and tripentaerythritol hexatriacrylate. The terms "(meth)acrylate", "(meth)acrylic acid" and "(meth)acryloyl" as used herein are meant to indicate "acrylate or methacrylate", "acrylic acid or methacrylic acid" and "acryloyl or methacryloyl", respectively.

As the monomer binder there may be used monomers having different refractive indices to control the refractive index of the various layers. Examples of the high refractive index monomer in particular include bis(4-methacryloylthiophenyl)sulfide, vinyl naphthalene, vinyl phenyl sulfide, and 4-methacryloylphenyl-4'-methoxyphenylthioether.

Further, dendrimers disclosed in JP-A-2005-76005 and JP-A-2005-36105 and norbornene ring-containing monomers disclosed in JP-A-2005-60425 may be used.

Two or more polyfunctional monomers may be used in combination.

The polymerization of these ethylenically unsaturated groups may be effected upon irradiation with ionizing radiation or heating in the presence of a photoradical initiator or heat radical initiator.

For the polymerization reaction of the photopolymerizable polyfunctional monomer, a photopolymerization initiator is preferably used. As the photopolymerization initiator there is preferably used a photoradical polymerization initiator or photocationic polymerization initiator, particularly preferably photoradical polymerization initiator.

1-(2) Polymer Binder

In the invention, as the binder there may be used a polymer or crosslinked polymer. As the crosslinked polymer there may be used an anionic polymer. The polymer having a crosslinked anionic group is arranged such that the main chain of the polymer having an anionic group is crosslinked.

Examples of the polymer main chain include polyolefins (saturated hydrocarbon), polyethers, polyureas, polyurethanes, polyesters, polyamines, polyamides, and melamine resins. Preferred among these polymer main chains are polyolefin main chain, polyether main chain and polyurea main chain. More desirable among these polymer main chains are polyolefin main chain and polyether main chain. Most desirable among these polymer main chains is polyolefin main chain.

The polyolefin main chain is made of saturated hydrocarbon. The polyolefin main chain is obtained, e.g., by the addition polymerization reaction of unsaturated polymerizable group. In the polyether main chain, repeating units are connected to each other with an ether bond (—O—). The polyether main chain is obtained, e.g., by the ring opening polymerization reaction of epoxy group. In the polyurea main chain, repeating units are connected to each other with an urea bond (—NH—CO—NH—). The polyurea main chain is obtained, e.g., by the polycondensation reaction of isocyanate group with amino group. In the polyurethane main chain, repeating units are connected to each other with an urethane bond (—NH—CO—O—). The polyurethane main chain is obtained, e.g., by the polycondensation reaction of isocyanate with hydroxyl group (containing N-methylol group). In the polyester main chain, repeating units are connected to each other with an ester bond (—CO—O—). The polyester main chain is obtained, e.g., by the polycondensation reaction of carboxyl group (containing acid halide group) with hydroxyl group (containing N-methylol group). In the polyamine main chain, repeating units are connected to each other with an imino bond (—NH—). The polyamine main chain is obtained, e.g., by the ring opening polymerization reaction of ethyleneimine group. In the polyamide main chain, repeating units are connected to each other with an amide bond (—NH—CO—). The polyamide main chain is obtained, e.g., by the reaction of isocyanate group with carboxyl group (containing acid halide group). The melamine resin main chain is obtained, e.g., by the polycondensation reaction of triazine group (e.g., melamine) with aldehyde (e.g., formaldehyde). In the melamine resin, the main chain itself has a crosslinked structure.

The anionic group is connected to the main chain of the polymer directly or with a connecting group. The anionic group is preferably connected to the main chain as a side chain with a connecting group.

Examples of the anionic group include carboxylic acid groups (carboxyl), sulfonic acid groups (sulfo), and phosphoric acid groups (phosphono). Preferred among these anionic groups are sulfonic acid groups and phosphoric acid groups.

The anionic group may be in the form of salt. The cation constituting the salt with anionic group is preferably an alkaline metal ion. The anionic proton may be dissociated.

Preferred examples of the connecting group with which the anionic group and the polymer chain are connected include —CO—, —O—, alkylene group, arylene group, and divalent group selected from the group consisting of combinations thereof.

In the crosslinked structure, two or more main chains are chemically bonded to each other (preferably covalently bonded). Preferably, three or more main chains are covalently bonded to each other. The crosslinked structure is preferably made of group having a valency of two or more selected from the group consisting of —CO—, —O—, —S—, nitrogen atom, phosphorus atom, aliphatic residue, aromatic residue and combinations thereof.

The polymer having a crosslinked anionic group is preferably a copolymer comprising repeating units having anionic group and repeating units having a crosslinked structure. The proportion of the repeating units having an anionic group in the copolymer is preferably from 2% by mass to 96% by mass, more preferably from 4% by mass to 94% by mass, most preferably from 6% by mass to 92% by mass. The repeating unit may have two or more anionic groups. The proportion of the repeating units having a crosslinked structure in the copolymer is preferably from 4% by mass to 98% by mass, more preferably from 6% by mass to 96% by mass, most preferably from 8% by mass to 94% by mass.

The polymer repeating unit having a crosslinked structure may have both anionic group and crosslinked structure. Other repeating units (repeating unit having neither anionic group nor crosslinked structure) may be included.

Preferred examples of the other repeating units include repeating units having amino group or quaternary ammonium group and repeating units having benzene ring. The amino group or quaternary ammonium group is capable of keeping inorganic particles dispersed as the anionic group is. The amino group, quaternary ammonium group and benzene ring can exert the same effect even when incorporated in the repeating unit having an anionic group or the repeating unit having a crosslinked structure.

In the repeating unit having an amino group or quaternary ammonium group, the amino group or quaternary ammonium group is connected to the polymer main chain directly or via a connecting group. The amino group or quaternary ammonium group is preferably connected to the main chain as a side chain via a connecting group. The amino group or quaternary ammonium group is preferably a secondary amino group, tertiary amino group or quaternary ammonium group, more preferably a tertiary amino group or quaternary ammonium group. The group connected to the nitrogen atom in the secondary amino group, tertiary amino group or quaternary ammonium group is preferably an alkyl group, more preferably a $C_1$-$C_{12}$ alkyl group, even more preferably a $C_1$-$C_6$ alkyl group. The counter ion of quaternary ammonium group is preferably a halide ion. The connecting group via which the amino group or quaternary ammonium group and the polymer main chain are connected to each other is preferably a divalent group selected from the group consisting of —CO—, —NH—, —O—, alkylene group, arylene group and combination thereof. In the case where the polymer having a crosslinked anionic group contains a repeating unit having an amino group or quaternary ammonium group, the proportion of the repeating unit is preferably from 0.06% by mass to 32% by mass, more preferably from 0.08% by mass to 30% by mass, most preferably from 0.1% by mass to 28% by mass.

1-(3) Organosilane Compound

The film of the invention preferably comprises an organosilane compound or hydrolyzate and/or partial condensate thereof or the like (hereinafter, the reaction solution thus obtained will be occasionally referred to as "sol component") incorporated therein from the standpoint of scratch resistance.

These compounds act as a binder when spread as a curable composition, dried and then condensed at the heating step to form a cured material. A specific example of the compounds to be incorporated in the electrically-conductive particulate material-containing layer of the invention is represented by the compound of the formula (B).

In the invention, the amount of the organosilane compound represented by the formula (B) will be described.

(A) In the Case where the Organosilane Compound is Used in the Surface Treatment of Electrically-Conductive Particulate Material The amount of the organosilane compound represented by the formula (B) is not specifically limited but is preferably from 1% by mass to 300% by mass, more preferably from 3% by mass to 100% by mass, most preferably from 5% by mass to 50% by mass based on the particulate inorganic oxide. The amount of the organosilane compound represented by the formula (B) is preferably from 1 mol-% to 300 mol-%, more preferably from 5 mol-% to 300 mol-%, most preferably from 10 mol-% to 200 mol-% per on the normality (formol) based on the hydroxyl group in the surface of inorganic oxide.

When the amount of the organosilane compound to be used falls within the above defined range, the effect of stabilizing the dispersion can be fully exerted and the film strength during film formation can be enhanced. It is also preferred that a plurality of organosilane compounds be used in combination. The plurality of compounds may be added simultaneously or at different points of time. The plurality of compounds may be previously partially condensed before being added to facilitate reaction control.

(B) In the Case where the Organosilane Compound is Incorporated in the Layers Constituting the Optical Film The amount of the organosilane compound to be used is preferably from 0.1% by mass to 90% by mass, more preferably from 0.5% by mass to 30% by mass, most preferably from 1% by mass to 20% by mass based on the total solid content of the layers constituting the optical film.

The aforementioned organosilane compound may be incorporated directly in the curable composition (coating solution for anti-glare layer, low refractive index layer, etc.). However, it is preferred that the aforementioned organosilane compound be previously processed in the presence of a catalyst to prepare a hydrolyzate and/or partial condensate thereof and the reaction solution (sol) thus obtained be then used to prepare the aforementioned curable composition. It is preferred in the invention that a composition containing a hydrolyzate and/or partial condensate of the aforementioned organosilane compound and a metal chelate compound be prepared and a solution obtained by adding a β-diketone compound and/or β-ketoester compound to the composition be then incorporated in the coating solution for at least one of anti-glare layer and low refractive index layer which is then spread.

1-(4) Initiator

The polymerization of various monomers having an ethylenically unsaturated group can be carried out by irradiating these monomers with ionizing radiation or heating these monomers in the presence of a photoradical polymerization initiator or heat radical polymerization initiator.

In order to prepare the film of the invention, a photopolymerization initiator or heat polymerization initiator can be used as well.

<Photopolymerization Initiator>

Examples of the photoradical polymerization initiator employable herein include acetophenones, benzoins, benzophenones, phosphine oxides, ketals, anthraquinones, thioxanthones, azo compounds, peroxides (as disclosed in JP-A-2001-139663), 2,3-dialkyldione compounds, disulfide compounds, fluoroamine compounds, aromatic sulfoniums, Lophine dimers, oniums, borates, active esters, active halogens, inorganic complexes, and coumarines.

Examples of the acetophenones include 2,2-dimethoxyacetophenone, 2,2-diethoxyacetophenone, p-dimethylacetophenone, 1-hydroxy-dimethylphenylketone, 1-hydroxy-dimethyl-p-isopropylphenylketone, 1-hydroxy cyclohexylphenylketone, 2-methyl-4-methylthio-2-morpholinopropiophenone, 2-benzyl-2-dimethylamino-1-(4-morpholinophenyl)-butanone, 4-phenoxydichloro acetophenone, and 4-t-butyl-dichloroacetophenone.

Examples of the benzoins include benzoin, benzoin methyl ether, benzoin ethyl ether, benzoin isopropyl ether, benzyl dimethyl ketal, benzoinbenzenesulfonic acid ester, benzointoluenesulfonic acid ester, benzoin methyl ether, benzoin ethyl ether, and benzoin isopropyl ether. Examples of the benzophenones include benzophenone, hydroxybenzophenone, 4-benzoyl-4'-methyl diphenyl sulfide, 2,4-dichlorobenzophenone, 4,4-dichlorobenzophenone, 4,4-p-chlorobenzophenone, 4,4'-dimethylaminobenzophenone (Michlers' ketone), and 3,3',4,4'-tetra(t-butylperoxycarbonyl)benzophenone.

Examples of the borates include compounds described as organic borate in Japanese Patent No. 2,764,769, JP-A-2002-116539, and Kunz, Martin, "Rad Tech '98. Proceeding April, pp. 19-22, 1998, Chicago". For example, compounds described in the above cited JP-A-2002-116539, paragraph

[0022]-[0027]. Specific examples of other organic boron compounds include organic boron-transition metal coordinated complexes disclosed in JP-A-6-348011, JP-A-7-128785, JP-A-7-140589, JP-A-7-306527 and JP-A-7-292014. Specific examples of these complexes include ion complexes with cationic dyes.

Examples of the phosphine oxides include 2,4,6-trimethylbenzoyl diphenyl phosphine oxide.

Examples of the active esters include 1,2-octanedione, 1-[4-(phenylthio)-, 2-(O-benzoyloxim)], sulfonic acid esters, and cyclic active ester compounds.

In some detail, Compounds 1 to 21 disclosed in the examples in JP-A-2000-80068 are particularly desirable.

Examples of the oniums include aromatic diazonium salts, aromatic iodonium salts, and aromatic sulfonium salts.

Specific examples of the active halogens include compounds disclosed in Wakabayashi et al, "Bull Chem. Soc. Japan", vol. 42, page 2,924 (1969), U.S. Pat. No. 3,905,815, JP-A-5-27830, M. P. Hutt, "Journal of Heterocyclic Chemistry", vol. 1 (No. 3), (1970), etc. In particular, oxazole compounds and s-triazine compounds substituted by trihalomethyl group are exemplified. More desirable among these compounds are s-triazine derivatives having at least one mono, di or trihalogen-substituted methyl group bonded to s-triazine ring. Specific known examples of these s-triazine derivatives include S-triazines and oxathiazole compounds such as 2-(p-methoxyphenyl)-4,6-bis(trichloromethyl)-s-triazine, 2-(p-methoxyphenyl)-4,6-bis(trichloromethyl)-s-triazine, 2-(p-styryl phenyl)-4,6-bis(trichloromethyl)-s-triazine, 2-(3-Br-4-di(ethylacetic acid ester)amino)phenyl)-4,6-bis(trichloromethyl)-s-triazine, and 2-trihalomethyl-5-(p-methoxyphenyl)-1,3,4-oxadiazole. In some detail, compounds disclosed in JP-A-58-15503, pp. 14-30, compounds disclosed in JP-A-55-77742, pp. 6-10, Compound Nos. 1 to 8 disclosed in JP-B-60-27673, page 287, Compound Nos. 1 to 17 disclosed in JP-A-60-239736, pp. 443-444, and Compound Nos. 1 to 19 disclosed in U.S. Pat. No. 4,701,399 are particularly desirable.

Examples of the inorganic complexes include bis ($\eta^5$-2,4-cyclopentadiene-1-il)-bis(2,6-difluoro-3-(1H-pyrole-1-il)-phenyl)titanium.

Examples of the coumarines include 3-ketocoumarine.

These initiators may be used singly or in admixture.

Various examples of initiators are disclosed in "Saishin UV Koka Gijutsu (Modern UV Curing Technology)", Technical Information Institute Co., Ltd., 1991, page 159, and Kiyomi Kato, "Shigaisen Koka Sisutemu (Ultraviolet Curing System)", Sogo Gijutsu Center, 1989, pp. 65-148 and are useful in the invention.

Preferred examples of commercially available photoradical polymerization initiators include KAYACURE (DETX-S, BP-100, BDMK, CTX, BMS, 2-EAQ, ABQ, CPTX, EPD, ITX, QTX, BTC, MCA, etc.) (produced by NIPPON KAYAKU CO., LTD.), Irgacure (651, 184, 500, 819, 907, 369, 1173, 1870, 2959, 4265, 4263, etc.) (produced by Ciba Specialty Chemicals Co., Ltd.), Esacure (KIP100F, KB1, EB3, BP, X33, KT046, KT37, KIP150, TZT, etc.) (produced by Thertomer Inc.), and combinations thereof.

The photopolymerization initiator is preferably used in an amount of from 0.1 pars by mass to 15 parts by mass, more preferably from 1 parts by mass to 10 parts by mass based on 100 parts by mass of the polyfunctional monomer.

<Photosensitizer>

In addition to the photopolymerization initiator, a photosensitizer may be used. Specific examples of the photosensitizer employable herein include n-butylamine, triethylamine, tri-n-butylphosphine, Michlers' ketone, and thioxanthone.

As the photopolymerization initiator there may be used in combination one or more of auxiliaries such as azide compound, thiourea compound and mercapto compound.

Examples of commercially available photosensitizers include KAYACURE (DMBI, EPA) (produced by NIHON KAYAKU CO., LTD.).

<Heat Polymerization Initiator>

As a heat polymerization initiator there may be used an organic or inorganic peroxide, an organic azo or diazo compound or the like.

Specific examples of the organic peroxide employable herein include benzoyl peroxide, halogen benzoyl peroxide, lauroyl peroxide, acetyl peroxide, dibutyl peroxide, cumene hydroperoxide, and butyl hydroperoxide. Specific examples of the inorganic peroxide employable herein include hydrogen peroxide, ammonium persulfate, and potassium persulfate. Specific examples of the azo compound employable herein include 2,2'-azobis(isobutylnitrile), 2,2'-azobis(propionitrile), and 1,1'-azobis(cyclohexane carbonitrile). Specific examples of the diazo compound employable herein include diazoaminobenzene, and p-nitrobenzene diazonium.

In the invention, in addition to the aforementioned heat acid generator, a compound which generates an acid when irradiated with light, i.e., photosensitive acid generator may be added. The photosensitive acid generator is a material capable of rendering the coat film of curable resin composition photosensitive so that it can be photo-cured when irradiated with radiation such as light. Examples of the photosensitive acid generator which can be properly used herein include (1) various onium salts such as iodonium salt, sulfonium salt, phosphonium salt, diazonium salt, ammonium salt and pyridinium salt; (2) sulfone compounds such as β-ketoester, β-sulfonylsulfone and α-diazo compound thereof; (3) sulfonic acid esters such as alkylsulfonic acid ester, haloalkylsulfonic acid ester, arylsulfonic acid ester and iminosulfonate; (4) sulfoneimide compounds; (5) diazomethane compounds; and others.

These photosensitive acid generators may be used singly or in combination of two or more thereof. These photosensitive acid generators may be used in combination with the aforementioned heat acid generator. The proportion of the photosensitive acid generators is preferably from 0 parts by mass to 20 parts by mass, more preferably from 0.1 parts by mass to 10 parts by mass based on 100 parts by mass of the fluorine-containing polymer in the curable resin composition. When the proportion of the photosensitive acid generators is not higher than the above defined upper limit, the resulting cured film exhibits an excellent strength and a good transparency to advantage.

The proportion of the photosensitive acid generators is preferably from 0.01 parts by mass to 10 parts by mass, more preferably from 0.1 parts by mass to 5 parts by mass based on 100 parts by mass of the curable resin composition.

For the details of other specific compounds and their use, reference can be made to JP-A-2005-43876.

1-(5) Light-Transmitting Particulate Material

The film of the invention, particularly anti-glare layer or hard coat layer, may comprise various light-transmitting particulate material incorporated therein to provide anti-glare properties (surface scattering properties) or internal scattering properties.

The light-transmitting particulate material may be an organic or inorganic particulate material. The less the particle diameter of particles is dispersed, the less are dispersed the scattering properties and the more easily can be designed the haze value. As the light-transmitting particulate material there is preferably used a plastic bead. A plastic bead having a high transparency which exhibits a refractive index difference from that of the binder falling within the above defined range is particularly preferred.

Examples of the organic particulate material employable herein include particulate polymethyl methacrylate (refractive index: 1.49), particulate crosslinked poly(acryl-styrene) copolymer (refractive index: 1.54), particulate melamine resin (refractive index: 1.57), particulate polycarbonate (refractive index: 1.57), particulate polystyrene (refractive index: 1.60), particulate crosslinked polystyrene (refractive index: 1.61), particulate polyvinyl chloride (refractive index: 1.60), and particulate benzoguanamine-melamine formaldehyde (refractive index: 1.68).

Examples of the inorganic particulate material employable herein include particulate silica (refractive index: 1.44), particulate alumina (refractive index: 1.63), particulate zirconia, particulate titania, and inorganic hollow or porous particulate material.

Preferred among these light-transmitting particulate materials are particulate crosslinked poly(meth)acrylate and particulate crosslinked poly(acryl-styrene) copolymer. By adjusting the refractive index of the binder according to the refractive index of the light-transmitting particulate material selected from the group consisting of these particulate materials, the internal haze, surface haze and central line average roughness of the invention can be attained.

Further, a binder comprising as a main component a trifunctional or higher (meth)acrylate monomer (refractive index after curing: 1.50 to 1.53) and a light-transmitting particulate material made of a crosslinked poly(meth)acrylate polymer having an acryl content of from 50 to 100% by mass are preferably used in combination. A combination of a binder and a light-transmitting particulate material made of a crosslinked poly(styrene-acryl) copolymer (refractive index: 1.48 to 1.54) is particularly preferred.

The refractive index of the binder (light-transmitting resin) and the light-transmitting particulate material of the invention is preferably from 1.45 to 1.70, more preferably from 1.48 to 1.65. In order to predetermine the refractive index of the material, the kind and proportion of the binder and the light-transmitting particulate material may be properly predetermined. How these factors should be predetermined can be previously known experimentally;

In the invention, the difference in refractive index between the binder and the light-transmitting particulate material (refractive index of light-transmitting particulate material-refractive index of binder) is preferably from 0.001 to 0.030, more preferably from 0.001 to 0.020, even more preferably from 0.001 to 0.015 as calculated in terms of absolute value. When the refractive index difference exceeds 0.030, problems occur such as blurred letter on film, drop of dark room contrast and surface clouding.

The refractive index of the binder can be quantitatively evaluated by directly measuring the refractive index of the binder by an Abbe refractometer or measuring the reflection spectrum or spectral ellipsometry of the binder. For the measurement of the aforementioned light-transmitting particulate material, two solvents having different refractive indices are mixed in various ratios to prepare solvents having various refractive indices. The light-transmitting particulate material is then dispersed in these solvents in the same amount. These dispersions are each then measured for turbidity. The refractive index of the solvent which shows the minimum turbidity is then measured by an Abbe refractometer.

The aforementioned light-transmitting particulate material can easily settle in the binder. In order to prevent the light-transmitting particulate material from settling, an inorganic filler such as silica may be added. The more the added amount of the inorganic filler is, the more effectively can be prevented the settlement of the light-transmitting particulate material but the worse is the transparency of the coat film. Accordingly, an inorganic filler having a particle diameter of not more than 0.5 μm is preferably incorporated in an amount of less than 0.1% by mass based on the amount of the binder to an extent such that the transparency of the coat film cannot be impaired.

The average particle diameter of the light-transmitting particulate material is preferably from 0.5 μm to 20 μm, more preferably from 2.0 μm to 15.0 μm. When the average particle diameter of the light-transmitting particulate material is 0.5 μm or more, the light scattering angle cannot be distributed to a wider range, making it possible to prevent the occurrence of blurred letter on the display. On the other hand, when the average particle diameter of the light-transmitting particulate material is 20 μm or less, it is not necessary that the thickness of the layer in which the light-transmitting particulate is incorporated be raised. This is desirable from the standpoint of prevention of curling and cost reduction.

Two or more light-transmitting particulate materials having different particle diameters may be used in combination. The use of a light-transmitting particulate material having a greater particle diameter makes it possible to provide anti-glare properties. The use of a light-transmitting particulate material having a smaller particle diameter makes it possible to eliminate the surface roughness.

The aforementioned light-transmitting particulate material is preferably incorporated in an amount of from 3% to 30% by mass based on the total solid content of the layer in which it is incorporated to advantage from the standpoint of prevention of blurred image, surface clouding, flicker, etc. More preferably, the amount of the light-transmitting particulate material is from 5% to 20% by mass.

The density of the light-transmitting particulate material is preferably from 10 to 1,000 mg/m$^2$, more preferably from 100 to 700 mg/m$^2$.

<Preparation and Classification of Light-Transmitting Particulate Material>

Examples of the light-transmitting particulate material according to the invention include suspension polymerization method, emulsion polymerization method, soap free emulsion polymerization method, dispersion polymerization method, and seed polymerization method. Any of these methods may be used to produce the light-transmitting particulate material of the invention. For the details of these production methods, reference can be made to Takayuki Otsu, Masayoshi Kinoshita, "Kobunshi Gosei no Jikkenho (Experiment of Polymer Synthesis)", Kagaku-Dojin Publishing Company, INC, pp. 130, 146, and 147, "Gosei Kobunshi (Synthetic Polymers)", vol. 1, pp. 246-290, vol. 3, pp. 1-108, Japanese Patent No. 2543503, Japanese Patent No. 3508304, Japanese Patent No. 2746275, Japanese Patent No. 3521560, Japanese Patent No. 3580320, JP-A-10-1561, JP-A-7-2908, JP-A-5-297506, and JP-A-2002-145919.

The distribution of the particle size of the light-transmitting particulate material is preferably monodisperse from the standpoint of haze value, dispersibility control and uniformity in coat surface conditions. In the case where particles having a particle diameter of 20% or more greater than the average particle diameter are defined to be coarse particle, the proportion of the coarse particles is preferably 1% or less, more preferably 0.1% or less, even more preferably 0.01% or less based on the total number of particles. It is a useful method to classify the light-transmitting particulate material having such a particle size distribution after preparation or synthesis reaction. By increasing the number of times of classification or intensifying the degree of classification, a particulate material having a desired distribution can be obtained.

Classification is preferably accomplished by any of air classification method, centrifugal classification method, sedimentation classification method, filtration classification method, electrostatic classification method, etc.

1-(6) Inorganic Particulate Material

In the invention, various inorganic particulate materials may be used to enhance physical properties such as hardness, optical properties such as reflectance and scattering properties, etc.

As the inorganic particulate material there may be used an oxide of at least one metal selected from the group consisting of silicon, zirconium, titanium, aluminum, indium, zinc, tin and antimony. Specific examples of these metal oxides include $ZrO_2$, $TiO_2$, $Al_2O_3$, $In_2O_3$, ZnO, $SnO_2$, $Sb_2O_3$, and ITO. Other examples of the metal oxides include $BaSO_4$, $CaCO_3$, talc, and kaolin.

The particle diameter of the inorganic particulate material to be used is preferably minimized in the dispersion medium. The mass-average particle diameter of the inorganic particulate material is from 1 nm to 200 nm, preferably from 5 nm to 150 nm, more preferably from 10 nm to 100 nm, particularly preferably from 10 nm to 80 nm. By finely dividing the inorganic particulate material to 100 nm or less, a film having a good transparency can be formed. For the measurement of the particle diameter of the inorganic particulate material, light scattering method or electron microphotography can be employed.

The specific surface area of the inorganic particulate material is preferably from 10 to 400 $m^2/g$, more preferably from 20 to 200 $m^2/g$, most preferably from 30 to 150 $m^2/g$.

The inorganic particulate material to be used in the invention is preferably incorporated in the coating solution for the layer in which it is used as disperse material in the dispersion medium.

As the dispersion medium for inorganic particulate material there is preferably used a liquid having a boiling point of from 60° C. to 170° C. Examples of the dispersing medium employable herein include water, alcohols (e.g., methanol, ethanol, isopropanol, butanol, benzyl alcohol), ketones (e.g., acetone, methyl ethyl ketone, methyl isobutyl ketone, cyclohexanone), esters (e.g., methyl acetate, ethyl acetate, propyl acetate, butyl acetate, methyl formate, ethyl formate, propyl formate, butyl formate), aliphatic hydrocarbons (e.g., hexane, cyclohexane), halogenated hydrocarbons (e.g., methylene chloride, chloroform, carbon tetrachloride), aromatic hydrocarbons (e.g., benzene, toluene, xylene), amides (e.g., dimethyl formamide, dimethyl acetamide, n-methylpyrrolidone), ethers (e.g., diethyl ether, dioxane, tetrahydrofurane), and ether alcohols (e.g., 1-methoxy-2-propanol). Particularly preferred among these dispersing media are toluene, xylene, methyl ethyl ketone, methyl isobutyl ketone, cyclohexanone, and butanol.

Still preferred among these dispersing media are methyl ethyl ketone, methyl isobutyl ketone, and cyclohexanone.

For the dispersion of the inorganic particulate material, a dispersing machine is used. Examples of the dispersing machine employable herein include sand grinder mill (e.g., bead mill with pin), high speed impellor mill, pebble mill, roller mill, attritor, and colloid mill. Particularly preferred among these dispersing machines are sand grinder mill and high speed impellor mill. Predispersion may be effected. Examples of the dispersing machine for use in predispersion include ball mill, three-roll mill, kneader, and extruder.

<High Refractive Index Particulate Material>

For the purpose of enhancing the refractive index of the layer constituting the invention, a cured composition having an inorganic particulate material having a high refractive index dispersed in a mixture of a monomer, an initiator and an organic group-substituted silicon compound is preferably used.

As the inorganic particulate material to be used herein there is preferably used $ZrO_2$ or $TiO_2$ in particular from the standpoint of refractive index. For the purpose of enhancing the refractive index of the hard coat layer, particulate $ZrO_2$ is most desirable. As the inorganic particulate material for high refractive index layer and middle refractive index layer, particulate $TiO_2$ is most desirable.

As the aforementioned particulate $TiO_2$ there is particularly preferably used an inorganic particulate material mainly composed of $TiO_2$, as a main component, containing at least one element selected from the group consisting of cobalt, aluminum and zirconium. The term "main component" as used herein is meant to indicate the component which occurs in the greatest content (% by mass) among the components constituting the particulate material.

The refractive index of the particulate material comprising $TiO_2$ as a main component in the invention is preferably from 1.90 to 2.80, more preferably from 2.10 to 2.80, most preferably from 2.20 to 2.80.

The mass-average particle diameter of the primary particles of the particulate material comprising $TiO_2$ as a main component is preferably from 1 nm to 200 nm, more preferably from 1 nm to 150 nm, even more preferably from 1 nm to 100 nm, particularly preferably from 1 nm to 80 nm.

The crystalline structure of the particulate material comprising $TiO_2$ as a main component is preferably mainly composed of rutile, rutile/anatase mixed crystal, anatase or amorphous structure, particularly rutile structure. The term "main component" as used herein is meant to indicate the component which occurs in the greatest content (% by mass) among the components constituting the particulate material.

The incorporation of at least one element selected from the group consisting of Co (cobalt), Al (aluminum) and Zr (zirconium) in the particulate material comprising $TiO_2$ as a main component makes it possible to suppress the photocatalyst activity of $TiO_2$ and hence enhance the weathering resistance of the film of the invention.

Particularly preferred among these elements is Co (cobalt). Two or more of these elements are preferably used in combination.

The inorganic particulate material of the invention comprising $TiO_2$ as a main component may be subjected to surface treatment to have a core/shell structure as disclosed in JP-A-2001-166104.

The amount of the monomer and inorganic particulate material to be incorporated in the layer is preferably from 10% to 90% by mass, more preferably from 20% to 80% by mass based on the total mass of the binder. Two or more inorganic particulate materials may be incorporated in the layer.

<Low Refractive Index Particulate Material>

The inorganic particulate material to be incorporated in the low refractive index layer preferably has a low refractive index. Examples of the inorganic particulate material include particulate magnesium fluoride and silica. Particulate silica is particularly preferred from the standpoint of refractive index, dispersion stability and cost.

The average particle diameter of the particulate silica is preferably from not smaller than 30% to not greater than 150%, more preferably from not smaller than 35% to not greater than 80%, even more preferably from 40% to not greater than 60% of the thickness of the low refractive layer. In some detail, when the thickness of the low refractive layer is 100 nm, the particle diameter of the particulate silica is preferably from not smaller than 30 nm to not greater than 150 nm, more preferably from not smaller than 35 nm to not greater than 80 nm, even more preferably from not smaller than 40 nm to not greater than 60 nm.

The average particle diameter of the particulate silica preferably falls within the above defined range from the standpoint of the effect of improving scratch resistance and the enhancement of external appearance such as fine roughness on the surface of the low refractive layer and black tone and density and integrated reflectance. The particulate silica may be crystalline or amorphous. The particulate silica may be monodisperse or may be composed of agglomerated particles so far as they have a predetermined particle diameter. The shape of the particulate silica is most preferably sphere but may be amorphous.

Further, the low refractive layer may comprise at least one of particulate silica materials having an average particle diameter of less than 25% of the thickness of the low refractive layer (hereinafter referred to as "small particle size particulate silica") incorporated therein in combination with the aforementioned particulate silica (hereinafter referred to as "large particle size inorganic particulate silica").

The small particle size particulate silica can be present in the gap between the large size silica particles and thus can act as a retainer for large particle diameter particulate silica.

In the case where the thickness of the low refractive layer is 100 nm, the average particle diameter of the small particle diameter particulate silica is preferably from not smaller than 1 nm to not greater than 20 nm, more preferably from not smaller than 5 nm to not greater than 15 nm, particularly preferably from not smaller than 10 nm to not greater than 15 nm. The use of such a particulate silica is advantageous in material cost and effect of retainer.

The spread of the low refractive index particulate material is preferably from 1 mg/m$^2$ to 100 mg/m$^2$, more preferably from 5 mg/m$^2$ to 80 mg/m$^2$, even more preferably from 10 mg/m to 60 mg/m$^2$. The spread of the low refractive index particulate material preferably falls within the above defined range from the standpoint of the effect of improving scratch resistance and the enhancement of external appearance such as fine roughness on the surface of the low refractive layer and black tone and density and integrated reflectance.

<Hollow Particulate Silica>

For the purpose of further reducing the refractive index of the film, a hollow particulate silica is preferably used.

The refractive index of the hollow particulate silica is preferably from 1.15 to 1.40, more preferably from 1.17 to 1.35, most preferably from 1.17 to 1.30. The refractive index used herein means the refractive index of the entire particulate material rather than the refractive index of only the silica of the shell of the hollow particulate silica. Supposing that the radius of the bore of the particle is a and the radius of the shell of the particle is b, the percent void x is represented by the following numerical formula (VIII):

$$x=(4\pi a^3/3)/(4\pi b^3/3)\times 100 \quad\quad\quad (VIII)$$

The percent void x of the hollow particulate silica is preferably from 10% to 60%, more preferably from 20% to 60%, most preferably from 30% to 60%. As the refractive index of the hollow particulate silica decreases from the above defined range and the percentage void of the hollow particulate silica rises from the above defined range, the thickness of the shell decreases, reducing the strength of the particulate material. Therefore, a particulate material having a refractive index of 1.15 or more is preferred from the standpoint of scratch resistance.

The method for producing the hollow silica is disclosed in JP-A-2001-233611 and JP-A-2002-79616. In particular, a particulate material the shell of which has a bore therein and closed pores is preferred. The refractive index of the hollow particulate silica can be calculated by the method described in JP-A-2002-79616.

The spread of the hollow silica is preferably from 1 mg/m$^2$ to 100 mg/m$^2$, more preferably from 5 mg/m$^2$ to 80 mg/m$^2$, even more preferably from 10 mg/m$^2$ to 60 mg/m$^2$. The spread of the hollow silica preferably falls within the above defined range from the standpoint of the effect of improving scratch resistance and the enhancement of external appearance such as fine roughness on the surface of the low refractive layer and black tone and density and integrated reflectance.

The average particle diameter of the hollow silica is preferably from not smaller than 30% to not greater than 150%, more preferably from not smaller than 35% to not greater than 80%, even more preferably from 40% to not greater than 60% of the thickness of the low refractive layer. In some detail, when the thickness of the low refractive layer is 100 nm, the particle diameter of the hollow silica is preferably from not smaller than 30 nm to not greater than 150 nm, more preferably from not smaller than 35 nm to not greater than 100 nm, even more preferably from not smaller than 40 nm to not greater than 65 nm.

When the particle diameter of the particulate silica is too small, the proportion of bore decreases, making it possible to expect the reduction of refractive index. On the other hand, when the particle diameter of the particulate silica is too great, fine roughness can be formed on the surface of the low refractive layer, causing the deterioration of the external appearance such as black tone and density and integrated reflectance. The particulate silica may be crystalline or amorphous. The particulate silica is preferably monodisperse. The shape of the particulate silica is most preferably sphere but may be amorphous.

Two or more hollow silica materials having different average particle sizes may be used in combination. The average particle diameter of the hollow silica can be electron-microphotographically determined.

In the invention, the specific surface area of the hollow silica is preferably from 20 to 300 m$^2$/g, more preferably from 30 to 120 m$^2$/g, most preferably from 40 to 90 m$^2$/g. The surface are of the hollow silica can be determined by BET method with nitrogen.

In the invention, a boreless particulate silica may be used in combination with the hollow silica. The particle size of the boreless silica is preferably from not smaller than 30 nm to not greater than 150 nm, more preferably from not smaller than 35 nm to not greater than 100 nm, most preferably from not smaller than 40 nm to not greater than 80 nm.

1-(7) Electrically-Conductive Particulate Material

The film of the invention may comprise various electrically-conductive particulate materials incorporated therein to exhibit electrical conductivity. For the details of these electrically-conductive particulate materials, reference can be made to JP-A-2005-196122.

1-(8) Surface Active Agent

In the film of the invention, the light diffusing layer-forming coating composition may comprise either or both of a fluorine-based surface active agent and a silicone-based surface active agent incorporated therein to assure uniformity in surface conditions such as coating uniformity, drying uniformity and point defect. In particular, a fluorine-based surface active agent is preferably used because it can exert an effect of eliminating defects in surface conditions such as coating unevenness, drying unevenness and point defect. The surface active agent is intended to render the light diffusing layer-forming coating composition adaptable to high speed coating while enhancing the uniformity in surface conditions so as to enhance the productivity.

Preferred examples of the fluorine-based surface active agent include fluoroaliphatic group-containing copolymers (hereinafter occasionally abbreviated as "fluorine-based polymer"). Useful examples of the fluorine-based polymer include acrylic resins and methacrylic resins containing repeating units corresponding to the following monomer (i) and repeating units corresponding to the following monomer (ii), and copolymers of these monomers with vinyl-based monomers copolymerizable therewith.

(i) Fluoroaliphatic Group-Containing Monomer Represented by the Following Formula (a)

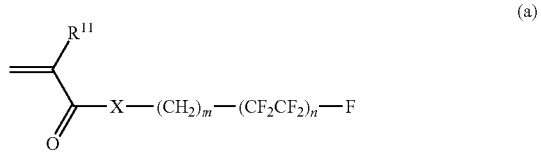

wherein $R^{11}$ represents a hydrogen atom or methyl group; X represents an oxygen atom, sulfur atom or —N($R^{12}$)— in which $R^{12}$ represents a hydrogen atom or a $C_1$-$C_4$ alkyl group such as methyl, ethyl, propyl and butyl, preferably hydrogen atom or methyl; m represents an integer of from 1 to 6; and n represents an integer of from 2 to 4. X is preferably an oxygen atom.

(ii) Monomer Represented by the Following Formula (b) Copolymerizable with the Monomer (i)

wherein $R^{13}$ represents a hydrogen atom or methyl group; and Y represents an oxygen atom, sulfur atom or —N($R^{15}$)— in which $R^{15}$ represents a hydrogen atom or a $C_1$-$C_4$ alkyl group such as methyl, ethyl, propyl and butyl, preferably hydrogen atom or methyl. Y is preferably an oxygen atom, —N(H)— or —N(CH$_3$)—.

$R^{14}$ represents a $C_4$-$C_{20}$ straight-chain, branched or cyclic alkyl group which may have substituents. Examples of the substituents on the alkyl group represented by $R^{14}$ include hydroxyl groups, alkylcarbonyl groups, arylcarbonyl groups, carboxyl groups, alkylether groups, arylether groups, halogen atoms such as fluorine atom, chlorine atom and bromine atom, nitro group, cyano group, and amino group. The invention is not limited to these substituents. As the $C_4$-$C_{20}$ straight-chain, branched or cyclic alkyl group there may be preferably used butyl, pentyl, hexyl, heptyl, octyl, nonyl, decyl, undecyl, dodecyl, tridecyl, tetradecyl, pentadecyl, octadecyl or eicosanyl group which may be straight-chain or branched, a monocyclic cycloalkyl or bicycloheptyl group such as cyclohexyl and cycloheptyl or polycyclic cycloalkyl group such as bicycloheptyl, bicyclodecyl, tricycloundecyl, tetraclycododecyl, adamanthyl, norbonyl and tetracyclodecyl.

The proportion of the fluoroaliphatic group-containing monomer represented by the formula (a) in the amount of fluorine-based polymer to be used in the invention is 10 mol-% or more, preferably from 15 to 70 mol-%, more preferably from 20 to 60 mol-%.

The mass-average molecular mass of the fluorine-based polymer to be used in the invention is preferably from 3,000 to 100,000, more preferably from 5,000 to 80,000.

The added amount of the fluorine-based polymer to be used in the invention is preferably from 0.001% to 5% by mass, more preferably from 0.005% to 3% by mass, even more preferably from 0.01% to 1% by mass based on the mass of the coating solution. When the added amount of the fluorine-based polymer falls below 0.001% by mass, the resulting effect is insufficient. On the other hand, when the added amount of the fluorine-based polymer exceeds 5% by mass, the coat film cannot be thoroughly dried. Further, the properties of coat film (e.g., reflectance, scratch resistance) can be adversely affected.

1-(9) Thickening Agent

In the film of the invention, a thickening agent may be used to adjust the viscosity of the coating solution.

The term "thickening agent" as used herein is meant to indicate a material which raises the viscosity of a liquid when incorporated therein. The magnitude of the rise of the viscosity of the coating solution developed by the addition of the thickening agent is preferably from 0.05 to 50 cP (from 0.05 to 50 mPa·s), more preferably from 0.10 to 20 cP (from 0.1 to 20 mPa·s), most preferably from 0.10 to 10 cP (from 0.10 to 10 mPa·s).

Examples of the thickening agent employable herein will be given below, but the invention is not limited thereto.

Poly-ε-caprolactone
Poly-ε-caprolactone diol
Poly-ε-caprolactone triol
Polyvinyl acetate
Poly(ethylene adipate)
Poly(1,4-butylene adipate)
Poly(1,4-butylene glutarate)
Poly(1,4-butylene succinate)
Poly(1,4-butylene terephthalate)
Poly(ethylene terephthalate)
Poly(2-methyl-1,3-propylene adipate)
Poly(2-methyl-1,3-propylene glutarate)
Poly(neopentylglycol adipate)
Poly(neopentylglycol sebacate)
Poly(1,3-propylene adipate)
Poly(1,3-propylene glutarate)
Polyvinyl butyral
Polyvinyl formal
Polyvinyl acetal
Polyvinyl propanal
Polyvinyl hexanal
Polyvinyl pyrrolidone
Polyvinyl pyrrolidone
Polyacrylic acid ester
Polymethacrylic acid ester
Cellulose acetate
Cellulose acetate
Cellulose propionate
Cellulose acetate butyrate Besides these compounds, known viscosity adjustors or thixotropy-providing agents such as scmetite, tetrasilicon fluoride mica, bentonite, silica, montmorillonite and polyacrylic soda disclosed in JP-A-8-325491 and ethyl cellulose, polyacrylic acid and organic clay disclosed in JP-A-10-219136 may be used.

1-(10) Coating Solvent

As the solvent to be used in the coating composition for forming the various layers of the invention there may be used any solvent selected from the standpoint of capability of dissolving or dispersing the various components therein, ease of forming uniform surface conditions at the coating step and drying step, assurance of liquid preservability, provision of proper saturated vapor pressure.

Two or more solvents may be used in admixture. From the standpoint of burden of drying in particular, the solvent to be used herein preferably comprises a solvent having a boiling point of 100° C. or less at ordinary pressure and room temperature as a main component and a small amount of a solvent having a boiling point of 100° C. or more for the purpose of adjusting the drying speed.

Examples of the solvent having a boiling point of 100° C. or less include hydrocarbons such as hexane (boiling point: 68.7° C.), heptane (boiling point: 98.4° C.), cyclohexane (boiling point: 80.7° C.) and benzene (boiling point: 80.1° C.), halogenated hydrocarbons such as dichloromethane (boiling point: 39.8° C.), chloroform (boiling point: 61.2° C.), carbon tetrachloride (boiling point: 76.8° C.), 1,2-dichloroethane (boiling point: 83.5° C.) and trichloroethylene (boiling point: 87.2° C.), ethers such as diethylether (boiling point: 34.6° C.), diisopropylether (boiling point: 68.5° C.), dipropylether (boiling point: 90.5° C.) and tetrahydrofurane (boiling point: 66° C.), esters such as ethyl formate (boiling point: 54.2° C.), methyl acetate (boiling point: 57.8° C.), ethyl acetate (boiling point: 77.1° C.) and isopropyl acetate (boiling point: 89° C.), ketones such as acetone (boiling point: 56.1° C.) and 2-butanone (also referred to as "methyl ethyl ketone"; boiling point: 79.6° C.), alcohols such as methanol (boiling point: 64.5° C.), ethanol (boiling point: 78.3° C.), 2-propanol (boiling point: 82.4° C.) and 1-propanol (boiling point: 97.2° C.), cyano compounds such as acetonitrile (boiling point: 81.6° C.) and propionitrile (boiling point: 97.4° C.), and carbon disulfide (boiling point: 46.2° C.). Preferred among these solvents are ketones and esters. Particularly preferred among these solvents are ketones. Particularly preferred among the ketones is 2-butanone.

Examples of the solvent having a boiling point of 100° C. or more include octane (boiling point: 125.7° C.), toluene (boiling point: 110.6° C.), xylene (boiling point: 138° C.), tetrachloroethylene (boiling point: 121.2° C.), chlorobenzene (boiling point: 131.7° C.), dioxane (boiling point: 101.3° C.), dibutylether (boiling point: 142.4° C.), isobutyl acetate (boiling point: 118° C.), cyclohexanone (boiling point: 155.7° C.), 2-methyl-4-pentanone (also referred to as "MIBK"; boiling point: 115.9° C.), 1-butanol (boiling point: 117.7° C.), N,N-dimethylformamide (boiling point: 153° C.), N,N-dimethylacetamide (boiling point: 166° C.), and dimethylsulfoxide (boiling point: 189° C.). Preferred among these solvents are cyclohexanone and 2-methyl-4-pentanone.

1-(11) Others

The film of the invention may comprise a resin, a coupling agent, a coloring inhibitor, a colorant (pigment, dye), an antifoaming agent, a leveling agent, a fire retardant, an ultraviolet absorber, an infrared absorber, an adhesivity-providing agent, a polymerization inhibitor, an oxidation inhibitor, a surface modifier, etc. incorporated therein besides the aforementioned components.

1-(12) Support

As the support for the film of the invention there may be used any of transparent resin film, transparent resin sheet, transparent resin sheet and transparent glass without any limitation. Examples of the transparent resin film employable herein include cellulose acylate film (e.g., cellulose triacetate film (refractive index: 1.48)), cellulose diacetate film, cellulose acetate butyrate film, cellulose acetate propionate film), polyethylene terephthalate film, polyether sulfone film, polyacrylic resin film, polyurethane-based resin film, polyester film, polycarbonate film, polysulfone film, polyether film, polymethyl pentene film, polyether ketone film, and (meth) acryl nitrile film.

<Cellulose Acylate Film>

Preferred among these films is cellulose acylate film, which exhibits a high transparency and little optical birefringence, can be easily produced and is normally used as a protective film for polarizing plate. Cellulose triacetate film is particularly preferred. The thickness of the transparent support is normally from about 25 μm to 1,000 μm.

In the invention, as the cellulose acetate film there is preferably used a cellulose acetate having a percent acetylation of from 59.0% to 61.5%.

The term "percent acetylation" as used herein is meant to indicate the amount of acetic acid bonded per unit mass of cellulose. The measurement and calculation of percent acetylation can be carried out by the method for measurement and calculation of acetylation degree disclosed in ASTM: D-817-91 (method for testing cellulose acetate, etc.).

The viscosity-average polymerization degree (DP) of cellulose acylate is preferably 250 or more, more preferably 290 or more.

Mw/Mn (Mw represents a mass-average molecular mass; Mn represents a number-average molecular mass) of the cellulose acrylate to be used in the invention as determined by gel permeation chromatography is preferably close to 1.0. In other words, the molecular mass distribution is preferably sharp. In some detail, Mw/Mn is preferably from 1.0 to 1.7, more preferably from 1.3 to 1.65, most preferably from 1.4 to 1.6.

In general, the hydroxyl groups in 2-, 3- and 6-positions in cellulose acylate are not distributed by one third of the total substitution degree. The degree of substitution of hydroxyl group in 6-position tends to be smaller than the others. In the invention, the degree of substitution of hydroxyl group in 6-position in cellulose acylate is preferably greater than that in 2- and 3-positions.

The hydroxyl groups in 6-position are substituted by acryl group by 32% or more, more preferably 33% or more, particularly preferably 34% or more based on the total substitution degree. Further, the degree of substitution by acyl group in 6-position of cellulose acrylate is preferably 0.88 or more. The hydroxyl groups in 6-position may be substituted by acyl group having 3 or more carbon atoms such as propionyl group, butyloyl group, valeloyl group, benzoyl group and acryloyl group other than acetyl group. For the measurement of substitution degree in these positions, NMR can be employed.

As the cellulose acylate to be used in the invention there may be used a cellulose acetate obtained by the method disclosed in JP-A-11-5851, paragraphs [0043]-[0044], ([Example], [Synthesis Example 1]), [0048]-[0049] ([Synthesis Example 2]), [0051]-[0052] ([Synthesis Example 3]).

<Polyethylene Terephthalate Film>

In the invention, a polyethylene terephthalate film, too, is excellent in transparency, mechanical strength, planarity, chemical resistance and humidity resistance and inexpensive and thus can be used to advantage.

In order to further enhance the adhesive strength of the transparent plastic film with the hard coat layer provided thereon, the transparent plastic film is more preferably subjected to adhesive treatment.

Examples of commercially available optical PET film with adhesive layer include Cosmoshine A4100 and A4300 (produced by TOYOBO CO., LTD.).

2. Layers Constituting The Film

The film of the invention is obtained by mixing the aforementioned various compounds, and then spreading the mixture. The layers constituting the film of the invention will be further described hereinafter.

2-(1) Anti-Glare Layer

The anti-glare layer is formed for the purpose of providing the film with anti-glare properties developed by surface scattering and hard coat properties for enhancing the scratch resistance of the film.

Known examples of the method for forming anti-glare properties include a method which comprises laminating a mat-like shaped film having a fine surface roughness as disclosed in JP-A-6-16851, a method involving the cure shrinkage of an ionizing radiation-curable resin by the difference of dose of ionizing radiation as disclosed in JP-A-2000-206317, a method which comprises solidifying a light-transmitting particulate material and a light-transmitting resin while being gelated by making the use of the mechanism that the mass proportion of good solvent based on the light-transmitting resin decreases due to drying to form roughness on the surface of the coat film as disclosed in JP-A-2000-338310, and a method which comprises applying external pressure to provide surface roughness as disclosed in JP-A-2000-275404. These known methods may be used in the invention.

The anti-glare layer to be used in the invention preferably comprises a binder which preferably provides hard coat properties, a light-transmitting particulate material for providing anti-glare properties and a solvent as essential components so that the protrusion of the light-transmitting material itself or the protrusion formed by the aggregate of a plurality of particles can form surface roughness.

The anti-glare layer formed by the dispersion of mat particles is made of a binder and a light-transmitting particulate material dispersed therein. The anti-glare layer having anti-glare properties preferably has both anti-glare properties and hard coat properties.

Specific preferred examples of the aforementioned particulate mat employable herein include inorganic particulate compounds such as particulate silica and particulate $TiO_2$; and particulate resins such as particulate acryl, crosslinked particulate acryl, particulate polystyrene, crosslinked particulate styrene, particulate melamine resin and particulate benzoguanamine resin. Preferred among these particulate mats are crosslinked particulate styrene, crosslinked particulate acryl, and particulate silica.

The shape of the particulate mat may be spherical or amorphous.

For the measurement of the distribution of particle size of mat particles, a coulter counter method is employed. The particle size distribution thus measured is then converted to distribution of number of particles.

By adjusting the refractive index of the light-transmitting resin according to that of the various light-transmitting particulate materials selected from these particulate materials, the internal haze and surface haze of the invention can be attained. In some detail, a combination of a light-transmitting resin (refractive index after curing: 1.55 to 1.70) comprising as a main component a trifunctional or higher (meth) acrylate monomer which is preferably incorporated in the anti-glare layer of the invention described later and a light-transmitting particulate material and/or particulate benzoguanamine made of a crosslinked poly(meth)acrylate polymer having a styrene content of from 50% to 100% by mass is preferred. In particular, a combination of the aforementioned light-transmitting particulate resin and a light-transmitting particulate material (refractive index: 1.54 to 1.59) made of a crosslinked poly(styrene-acrylate) copolymer having a styrene content of from 50% to 100% by mass is preferred.

The light-transmitting particulate material is preferably incorporated in the anti-glare layer thus formed in an amount of from 3% to 30% by mass based on the total solid content in the anti-glare layer from the standpoint of anti-glare properties, blurred image, surface clouding, flicker, etc. The content of the light-transmitting particulate material is more preferably from 5% to 20% by mass. When the content of the light-transmitting particulate material falls below 3% by mass, the resulting anti-glare layer lacks anti-glare properties. On the other hand, when the content of the light-transmitting particulate material exceeds 30% by mass, problems occur such as blurred image, surface clouding and flicker.

The density of the light-transmitting particulate material is preferably from 10 to 1,000 mg/m², more preferably from 100 to 700 mg/m².

Further, the absolute value of the difference in refractive index between the light-transmitting resin and the light-transmitting particulate material is preferably 0.04 or less. The absolute value of the difference in refractive index between the light-transmitting resin and the light-transmitting particulate material is more preferably from 0.001 to 0.030, even more preferably from 0.001 to 0.020, still more preferably from 0.001 to 0.015. When this difference exceeds 0.040, problems occur such as blurred letter on the film, drop of dark room contrast and surface clouding.

The refractive index of the aforementioned light-transmitting resin can be quantitatively evaluated by directly measuring the refractive index of the binder by an Abbe refractometer or measuring the reflection spectrum or spectral ellipsometry of the light-transmitting resin. For the measurement of the aforementioned light-transmitting particulate material, two solvents having different refractive indices are mixed in various ratios to prepare solvents having various refractive indices. The light-transmitting particulate material is then dispersed in these solvents in the same amount. These dispersions are each then measured for turbidity. The refractive index of the solvent which shows the minimum turbidity is then measured by an Abbe refractometer.

Further, two or more particulate mats having different particle diameters may be used in combination. The use of a particulate mat having a greater particle diameter makes it possible to provide anti-glare properties. The use of a particulate mat having a smaller particle diameter makes it possible to provide other optical properties. For example, in the case where an anti-glare anti-reflection film is stuck to a high fineness display having a pixel density of 133 ppi or more, a display image quality defect called "flicker" can occur. The occurrence of "flicker" is attributed to the presence of roughness on the surface of the anti-glare anti-reflection film that causes the enlargement or shrinkage of pixels, resulting in the loss of brightness uniformity. The combined use of a particulate mat having a smaller particle diameter than the particulate mat providing anti-glare properties and a refractive index different from that of the binder makes it possible to remarkably eliminate the occurrence of "flicker".

The thickness of the anti-glare layer is preferably from 1 μm to 10 μm, more preferably from 1.2 μm to 8 μm. When the thickness of the anti-glare layer is too small, the resulting anti-glare layer lacks hard coat properties. On the other hand, when the thickness of the anti-glare layer is too great, the resulting anti-glare layer exhibits a deteriorated curling resistance or a raised brittleness and hence a deteriorated workability. Thus, the thickness of the anti-glare layer preferably falls within the above defined range.

On the other hand, the central line average roughness (Ra) of the anti-glare layer is preferably from 0.10 μm to 0.40 μm. When the central line average roughness (Ra) of the anti-glare layer exceeds 0.40 μm, problems occur such as flicker and surface whitening upon reflection of external light. The sharpness of transmitted image is preferably from 5% to 60%.

The strength of the anti-glare layer is preferably H or more, more preferably 2H or more, most preferably 3H or more as determined by pencil hardness test.

2-(2) Hard Coat Layer

The film of the invention has a hard coat layer provided therein in addition to the anti-glare layer to provide the film with a desired physical strength.

Preferably, a low refractive index layer is provided on the hard coat layer. More preferably, a middle refractive index layer and a high refractive index layer are provided interposed between the hard coat layer and the low refractive index layer to constitute an anti-reflection film.

The hard coat layer may be composed of two or more layers.

The refractive index of the hard coat layer of the invention is preferably from 1.48 to 2.00, more preferably from 1.52 to 1.90, even more preferably from 1.55 to 1.80 taking into account the optical design for obtaining an anti-reflection film. In the invention, at least one low refractive index layer is provided on the hard coat layer. Therefore, when the refractive index of the hard coat layer is too smaller than the above defined range, the resulting film exhibits deteriorated anti-reflection properties. On the other hand, when the refractive index of the hard coat layer is too greater than the above defined range, there is a tendency that the tint of reflected light increases.

The thickness of the hard coat layer is normally from about 0.5 μm to 50 μm, preferably from about 1 μm to 20 μm, more preferably from about 2 μm to 10 μm, most preferably from about 3 μm to 7 μm to provide the film with sufficient durability and impact resistance.

Further, the strength of the hard coat layer is preferably H or more, more preferably 2H or more, most preferably 3H or more as determined by pencil hardness test.

Moreover, the abrasion loss of the test specimen developed after Taber test according to JIS K5400 is preferably as small as possible.

The hard coat layer is preferably formed by the crosslinking reaction or polymerization reaction of an ionizing radiation-curable compound. For example, the hard coat layer can be formed by spreading a coating composition containing an ionizing radiation-curable polyfunctional monomer or polyfunctional oligomer over a transparent support, and then allowing the polyfunctional monomer or polyfunctional oligomer to undergo crosslinking reaction or polymerization reaction.

As the functional group of the ionizing radiation-curable polyfunctional monomer or polyfunctional oligomer there is preferably used a photopolymerizable, electron ray-polymerizable or radiation-polymerizable functional group. Particularly preferred among these functional groups is photopolymerizable functional group.

Examples of the photopolymerizable functional group include unsaturated polymerizable functional groups such as (meth)acryloyl group, vinyl group, styryl group and allyl group. Particularly preferred among these unsaturated polymerizable functional groups is (meth)acryloyl group.

The hard coat layer may comprise a particulate mat having an average particle diameter of from 1.0 μm to 10.0 μm, preferably from 1.5 μm to 7.0 μm, such as inorganic particulate compound and particulate resin incorporated therein for the purpose of providing internal scattering properties.

The binder for the hard coat layer may comprise either or both of a high refractive monomer and an inorganic particulate material incorporated therein for the purpose of controlling the refractive index of the hard coat layer. The inorganic particulate material has an effect of suppressing cure shrinkage developed by crosslinking reaction in addition to the effect of controlling refractive index. In the invention, the product of polymerization of the aforementioned polyfunctional monomer and/or high refractive index monomer or other materials after the formation of the hard coat layer, including the inorganic particulate material dispersed therein, is referred to as "binder".

For the purpose of maintaining the image sharpness, the sharpness of transmitted image is preferably adjusted in addition to the adjustment of shape of surface roughness. The sharpness of image transmitted by a clear anti-reflection film is preferably 60% or more. The sharpness of transmitted image is normally an indication showing the degree of blurredness of image transmitted by a film. The greater this value is, the sharper and better is the image transmitted by the film. The sharpness of transmitted image is preferably 70% or more, more preferably 80% or more.

2-(3) High Refractive Index Layer, Middle Refractive Index Layer

The film of the invention can comprise a high refractive index layer and a middle refractive index layer provided therein to enhance its anti-reflection properties.

In the present specification, the high refractive index layer and middle refractive index layer are occasionally generically termed as "high refractive index layer". In the invention, the terms "high" of high refractive index layer, "middle" of middle refractive index layer and "low" of low refractive index layer are meant to indicate the relationship of magnitude of refractive index of these layers. Referring to the relationship with the transparent support, the refractive index of the low refractive index layer and high refractive index layer preferably satisfies the relationship that the refractive index of the low refractive index layer is lower than that of the transparent support and the refractive index of the high refractive index layer is higher than that of the transparent support.

Further, in the present specification, the high refractive index layer, middle refractive index layer and low refractive index layer are occasionally generically termed as "anti-reflection layer".

In order to prepare an anti-reflection film by forming a low refractive index layer on the high refractive index layer, the refractive index of the high refractive index layer is preferably from 1.55 to 2.40, more preferably from 1.60 to 2.20, even more preferably from 1.65 to 2.10, most preferably from 1.80 to 2.00.

In the case where a middle refractive index layer, a high refractive index layer and a low refractive index layer are spread over the support sequentially in this order of closeness to the support to prepare an anti-reflection film, the refractive index of the high refractive index layer is preferably from 1.65 to 2.40, more preferably from 1.70 to 2.20. The refractive index of the middle refractive index layer is adjusted so as to be in between the refractive index of the low refractive index layer and the high refractive index layer. The refractive index of the middle refractive index layer is preferably from 1.55 to 1.80.

The inorganic particulate material comprising as a main component $TiO_2$ to be incorporated in the high refractive index layer and middle refractive index layer is used in the form of dispersion to form the high refractive index layer and middle refractive index layer.

The inorganic particulate material is dispersed in a dispersing medium in the presence of a dispersant.

The high refractive index layer and middle refractive index layer to be used in the invention are preferably formed by adding to a dispersion having an inorganic particulate material dispersed in a dispersion medium preferably a binder precursor required for the formation of matrix (e.g., ionizing radiation-curable polyfunctional monomer or polyfunctional oligomer described later), a photopolymerization initiator, etc. to obtain coating compositions for forming a high refractive index layer and a middle refractive index layer, respectively, spreading these coating compositions over a transparent support, and then allowing the ionizing radiation-curable compound (e.g., polyfunctional monomer or polyfunctional oligomer) to undergo crosslinking reaction or polymerization reaction so that it is cured.

Further, the binder for the high refractive index layer and middle refractive index layer is preferably allowed to undergo crosslinking reaction or polymerization reaction with the dispersant at the same time with or after the spreading of these layers.

The binder for the high refractive index layer and middle refractive index layer thus prepared comprises the anionic group of the binder incorporated therein which has been produced by the crosslinking reaction or polymerization reaction of the aforementioned desirable dispersant with the ionizing radiation-curable polyfunctional monomer or polyfunctional oligomer. Further, in the binder for the high refractive index layer and middle refractive index layer, the anionic group acts to keep the inorganic particles dispersed. The crosslinked or polymerized structure renders the binder capable of forming a film to enhance the physical strength, chemical resistance and weathering resistance of the high refractive index layer and middle refractive index layer.

The binder for the high refractive index layer is incorporated in an amount of from 5% to 80% by mass based on the solid content of the coating composition for the high refractive index layer.

The content of the inorganic particulate material in the high refractive index layer is preferably from 10% to 90% by mass, more preferably from 15% to 80% by mass, particularly preferably from 15% to 75% by mass based on the mass of the high refractive index layer. Two or more inorganic particulate materials may be incorporated in the high refractive index layer in combination.

In the case where the low refractive index layer is provided on the high refractive index layer, the refractive index of the high refractive index layer is preferably higher than that of the transparent support.

The high refractive index layer also preferably comprises a binder incorporated therein which is obtained by the crosslinking or polymerization reaction of an ionizing radiation-curable compound containing an aromatic ring, an ionizing radiation-curable compound containing a halogen element other than fluorine (e.g., Br, I, Cl), an ionizing radiation-curable compound containing an atom such as S, N and P, or the like.

The thickness of the high refractive index layer can be properly designed depending on the purpose. In the case where the high refractive index layer is used as an optical interference layer, the thickness of the high refractive index layer is preferably from 30 nm to 200 nm, more preferably from 50 nm to 170 nm, particularly preferably from 60 nm to 150 nm.

In the case where the high refractive index layer is free of anti-glare property-providing particles, the haze of the high refractive index layer is preferably as low as possible. Preferably it is 5% or less, more preferably 3% or less, particularly preferably 1% or less.

The high refractive index layer is preferably formed on the aforementioned transparent support directly or with other layers interposed therebetween.

2-(4) Low Refractive Index Layer

In order to reduce the reflectance of the film of the invention, a low refractive index layer may be used. The refractive index of the low refractive index layer is preferably from 1.20 to 1.46, more preferably from 1.25 to 1.46, particularly preferably from 1.30 to 1.46.

The thickness of the low refractive index layer is preferably from 30 nm to 500 nm, more preferably from 70 nm to 500 nm. In order to render the low refractive index layer electrically conductive, the thickness of the low refractive index layer is preferably from 130 nm to 500 nm. The haze of the low refractive index layer is preferably 3% or less, more preferably 2% or less, most preferably 1% or less. Referring specifically to the strength of the low refractive index layer, the strength of the low refractive index layer is preferably H or more, more preferably 2H or more, most preferably 3H or more as determined by pencil hardness test at a load of 500 g.

2-(5) Antistatic Layer, Electrically-Conductive Layer

In the invention, an antistatic layer is preferably provided besides the layer containing an electrically-conductive particulate material the interior of which is porous or hollow from the standpoint of prevention of electrostatic charge of the surface of the film. Known examples of the method for forming the antistatic layer include a method which comprises spreading an electrically-conductive coating solution containing an electrically-conductive particulate material and a reactive curable resin, a method which comprises subjecting a metal, metal oxide or other materials constituting the transparent support to vacuum evaporation or sputtering to form a thin electrically-conductive film, and a method involving the incorporation of an electrically-conductive polymer such as polythiophene and polyaniline. The electrically-conductive layer can be formed on the support directly or with a primer layer interposed therebetween for intensifying the adhesion to the support. Further, the antistatic layer may be used as a part of the anti-reflection film.

The thickness of the antistatic layer is preferably from 0.01 µm to 10 µm, more preferably from 0.03 µm to 7 µm, even more preferably from 0.05 µm to 5 µm. The surface resistivity of the antistatic layer is preferably from $10^5$ to $10^{12}$ Ω/sq, more preferably from $10^5$ to $10^9$ Ω/sq, most preferably from $10^5$ to $10^8$ Ω/sq. For the measurement of the surface resistivity of the antistatic layer, a four-point probe method may be employed.

The antistatic layer is preferably substantially transparent. In some detail, the haze of the antistatic layer is preferably 10% or less, more preferably 5% or less, even more preferably 3% or less, most preferably 1% or less. The transmittance of the antistatic layer with respect to light having a wavelength of 550 nm is preferably 50% or more, more preferably 60% or more, even more preferably 65% or more, most preferably 70% or more.

The antistatic layer of the invention is excellent in strength. In some detail, the strength of the antistatic layer is preferably H or more, more preferably 2H or more, even more preferably 3H or more, most preferably 4H or more as determined by a pencil hardness test at a load of 1 kg.

2-(6) Interference Unevenness (Interference Band Unevenness) Preventive Layer

In the case where there is a substantial difference (0.03 or more) in refractive index between the transparent support and the hard coat layer or the transparent support and the anti-glare layer, reflected light is generated at the interference of the transparent support with the hard coat layer or the anti-glare layer. This reflected light can interfere with the light reflected by the surface of the antistatic layer to produce interference unevenness caused by slight thickness unevenness of the hard coat layer (or anti-glare layer). In order to prevent the occurrence of such an interference unevenness, an interference unevenness preventive layer having a refractive index $n_P$ intermediate between that of the transparent support and the hard coat layer (or anti-glare layer) and a thickness $d_P$ satisfying the following formula may be provided between the two layers.

$$d_P=(2N-1)\times\lambda/(4n_P) \quad (C)$$

wherein $\lambda$ represents any visible light wavelength falling within a range of from 450 nm to 650 nm; and N represents a natural number.

Further, in the case where the optical film is stuck to an image display devices or the like, an adhesive layer may be laminated on the transparent support on the side thereof opposite the anti-reflection layer. In the case where there is a substantial difference in refractive index (0.03 or more) between the transparent support and the adhesive layer in such an embodiment, reflected light is generated at the interference of the transparent support with the adhesive layer. This reflected light can interfere with light reflected by the surface of the anti-reflection layer or the like, possibly causing the occurrence of interference unevenness attributed to unevenness in the thickness of the support or hard coat layer as described above. For the purpose of preventing the occurrence of such an interference unevenness, the same interference unevenness preventive layer as mentioned above may be provided on the transparent support on the side thereof opposite the anti-reflection layer.

For the details of such an interference unevenness preventive layer, reference can be made to JP-A-2004-345333. In the invention, the interference unevenness preventive layer disclosed in the above cited patent application may be used.

2-(7) Bonding-Aid Layer

The optical film of the invention may comprise a bonding-aid layer provided thereon. The term "bonding-aid layer" as used herein is meant to indicate a layer capable of rendering the protective film for polarizing plate capable of being easily bonded to its adjacent layer or the hard coat layer capable of being easily bonded to the support.

Examples of bonding-aid treatment include a treatment which comprises providing a bonding-aid layer of a bonding aid such as polyester, acrylic acid ester, polyurethane, polyethyleneimine, silane coupling agent or the like on a transparent plastic film.

Examples of the bonding-aid layer which can be preferably used in the invention include a layer comprising a polymer compound having —COOM group (in which M represents a hydrogen atom or cation). In an even more desirable embodiment, a layer comprising a polymer compound having —COOM group is provided on the film substrate side of the optical film and a layer mainly composed of a hydrophilic polymer compound is provided adjacent to the former layer on the polarizing layer side of the optical film. The term "polymer compound having —COOM group" as used herein is meant to indicate a styrene-maleic acid copolymer, vinyl acetate-maleic acid copolymer or vinyl acetate-maleic acid-maleic anhydride copolymer having —COOM group. The vinyl acetate-maleic acid copolymer having —COOM group is particularly preferred. These polymer compounds may be used singly or in combination of two or more thereof. The mass-average molecular mass of these polymer compounds is preferably from about 500 to 500,000. For preferred examples of the polymer compounds having —COOM group, reference can be made to JP-A-6-094915 and JP-A-7-333436.

Preferred examples of the hydrophilic polymer compounds include hydrophilic cellulose derivatives (e.g., methyl cellulose, carboxymethyl cellulose, hydroxy cellulose), polyvinyl alcohol derivatives (e.g., polyvinyl alcohol, vinyl acetate-vinyl alcohol copolymer, polyvinyl acetal, polyvinyl formal, polyvinyl benzal), natural polymer compounds (e.g., gelatin, casein, gum arabic), hydrophilic polyester derivatives (e.g., partially-sulfonated polyethylene terephthalate), and hydrophilic polyvinyl derivatives (e.g., poly-N-vinypyrrolidone, polyacrylamide, polyvinyl indazole, polyvinyl pyrazole). These hydrophilic polymer compounds may be used singly or in combination of two or more thereof.

The thickness of the bonding-aid layer is preferably from 0.05 μm to 1.0 μm from the standpoint of the adhesive effect.

2-(8) Anti-Curling Layer

The film of the invention may be subjected to anti-curling treatment. The term "anti-curling treatment" as used herein is meant to indicate a treatment for rendering the film capable of being rounded with the treated surface thereinside. Once the film of the invention is thus subjected to the anti-curling treatment, the film of the invention can be prevented from being curled with the treated side thereinside when the transparent resin film is surface-treated on one side thereof such that it is surface treated differently at different extents from one side to the other.

In an embodiment of the invention, the anti-curling layer is provided on the substrate on the side thereof opposite the anti-glare layer or anti-reflection layer. In another embodiment, the bonding-aid layer is provided on side of the transparent resin film. In other embodiment, the transparent resin film is subjected to anti-curling treatment on the other side thereof.

Specific examples of the anti-curling treatment include a method involving the spreading of a solvent, and a method involving the spreading of a solvent with a transparent resin such as cellulose triacetate, cellulose diacetate and cellulose acetate propionate. In some detail, the method involving the spreading of a solvent is carried out by spreading a composition comprising a solvent capable of dissolving or swelling the cellulose acylate film to be used as protective film for polarizing plate. Accordingly, the coating solution for the anti-curling layer preferably comprises a ketone-based or ester-based organic solvent. Preferred examples of the ketone-based organic solvent employable herein include acetone, methyl ethyl ketone, methyl isobutyl ketone, cyclohexanone, ethyl lactate, acetyl acetone, diacetone alcohol, isophorone, ethyl-n-butyl ketone, diisopropyl ketone, diethyl ketone, di-n-propyl ketone, methyl cyclohexanone, methyl-n-butyl ketone, methyl-n-propyl ketone, methyl-n-hexane, and methyl-n-heptyl ketone. Preferred examples of the ester-based organic solvent employable herein include methyl acetate, ethyl acetate, butyl acetate, methyl lactate, and ethyl lactate. However, as the solvent to be used herein there may be used a solvent which does not dissolve the cellulose acylate film therein besides the solvent capable of dissolving and/or swelling the cellulose acylate film. A composition obtained by mixing these components in a proper proportion according to the curling degree of the transparent resin film or the kind of the resin is used at a spread according to these factors. Alternatively, a transparent hard treatment or antistatic treatment may be effected to exert an anti-curling effect.

2-(9) Water-Absorbing Layer

The film of the invention may comprise a water-absorbing agent incorporated therein. The water-absorbing agent may be selected from water-absorbing compounds consisting of alkaline earth metals. Examples of these water-absorbing compounds include BaO, SrO, CaO, and MgO. The water-absorbing agent may be selected from the group consisting of metal elements such as Ti, Mg, Ba and Ca. The particle size of these particulate absorbers is preferably 100 nm or less, more preferably 50 nm or less.

The layer containing a water-absorbing agent may be prepared by a vacuum evaporation method or the like as in the case of barrier layer. Alternatively, nanoparticles may be prepared by various methods. The thickness of the layer containing a water-absorbing agent is preferably from 1 nm to 100 nm, more preferably from 1 nm to 10 nm. The layer containing a water-absorbing agent may be incorporated interposed between the support and the laminate (laminate of barrier layer and organic layer), on the top of the laminate, interposed between the layers constituting the laminate or in the organic layer or barrier layer in the laminate. In the case where the layer containing a water-absorbing agent is added to the barrier layer, a co-evaporation method is preferably used.

2-(10) Primer Layer/Thin Inorganic Layer

The film of the invention may comprise a known primer layer or thin inorganic layer provided interposed between the support and the laminate to enhance the gas barrier properties thereof.

The primer layer can be formed by, e.g., an acrylic resin, epoxy resin, urethane resin, silicone resin or the like. In the invention, as the primer layer there is preferably used an organic-inorganic hybrid layer. As the thin inorganic layer there is preferably used an inorganic vacuum deposit or a dense inorganic thin coat formed by sol-gel method. As the inorganic vacuum deposit there is preferably used a vacuum deposit of silica, zirconia, alumina or the like. The inorganic vacuum deposit is preferably formed by vacuum metallizing method, sputtering method or the like.

3. Layer Configuration of Film

Figure 2:
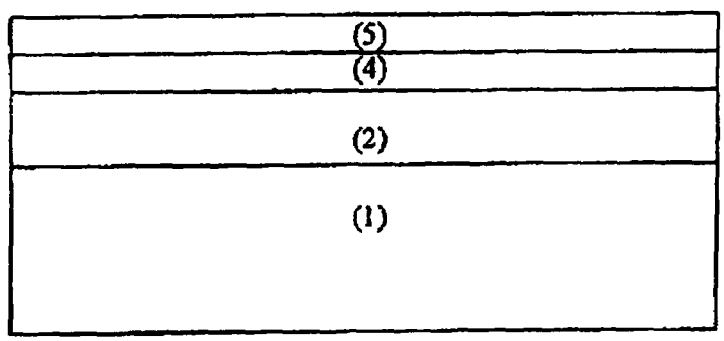
FIG. 2 is a schematic sectional view diagrammatically illustrating another preferred exemplary embodiment of the film of the invention.
Figure 3:
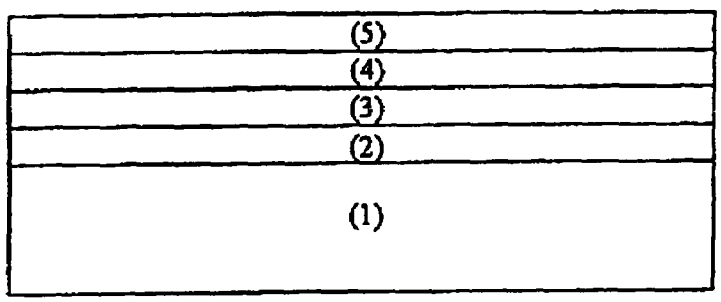
FIG. 3 is a schematic sectional view diagrammatically illustrating a further preferred exemplary embodiment of the film of the invention.

Referring to the film of the invention, the aforementioned layers can be used to form a known layer configuration. Representative examples of such a known layer configuration include the following ones.

a. Support/hard coat layer
b. Support/hard coat layer/low refractive index layer (FIG. 1)
c. Support/hard coat layer/high refractive index layer/low refractive index layer (FIG. 2)
d. Support/hard coat layer/middle refractive index layer/high refractive index layer/low refractive index layer (FIG. 3)

When a low refractive index layer is laminated on a hard coat layer provided on the support as in the layer configuration b (FIG. 1), the resulting laminate can be used as an anti-reflection film to advantage. By forming the low refractive index layer on the hard coat layer to a thickness of about ¼ of the wavelength of light, surface reflection can be eliminated by the principle of thin film interference.

Further, also when a high refractive index layer and a low refractive index layer are laminated on a hard coat layer provided on the support as in the layer configuration c (FIG. 2), the resulting laminate can be used as an anti-reflection film to advantage. Moreover, when a support, a hard coat layer, a middle refractive index layer, a high refractive index layer and a low refractive index layer are laminated in this order as in layer configuration d (FIG. 3), the reflectance of the film of the invention can be reduced to 1% or less.

Figure 4:
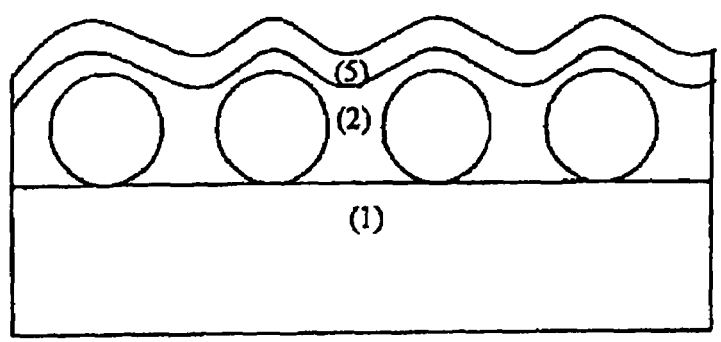
FIG. 4 is a schematic sectional view diagrammatically illustrating a still further preferred exemplary embodiment of the film of the invention.

In the layer configuration a or d, the hard coat layer (2) can act as an anti-glare layer having anti-glare properties. The anti-glare properties can be attained by the dispersion of mat particles as shown in FIG. 4 or the surface shaping by a method such as embossing as shown in FIG. 5. The anti-glare layer formed by the dispersion of mat particles comprises a binder and a light-transmitting particulate material dispersed in the binder. The anti-glare layer having anti-glare properties preferably exhibits both anti-glare properties and hard coat properties. The anti-glare layer may be composed of a plurality of layers, e.g., 2 to 4 layers.

Examples of the layer which may be provided interposed between the transparent support and the layer disposed closer to the surface side or on the outermost surface include interference unevenness (interference band unevenness) preventive layer, antistatic layer (to be provided in the case where the display side requires the reduction of surface resistivity or in the case where attachment of dust to the surface or the like raises problems), another hard coat layer (to be provided in the case where the provision of only one hard coat layer or anti-glare layer is not sufficient to attain a desired hardness), gas barrier layer, water-absorbing layer (moistureproof layer), adhesion improving layer, and stainproof layer (stain preventive layer).

The various refractive index layers constituting the anti-glare anti-reflection film having the anti-reflection layer of the invention preferably satisfies the following relationship.

Refractive index of hard coat layer>refractive index of transparent support>refractive index of low refractive index layer 4. Production Method The film of the invention can be formed by the following method, but the invention is not limited thereto.

4-(1) Preparation of Coating Solution

<Preparation>

Firstly, coating solutions containing components for forming the various layers are prepared. During this procedure, the evaporation loss of the solvent can be minimized to suppress the rise of the water content in the coating solution. The water content in the coating solution is preferably 5% or less, more preferably 2% or less. The suppression of the evaporation loss of the solvent can be attained by enhancing the airtightness of the tank in which the various materials charged are stirred, minimizing the area of the coating solution in contact with air during the movement of the coating solution or like means. Further, a means for eliminating the water content in the coating solution during, before or after spreading may be provided.

<Physical Properties of Coating Solution>

In the coating method of the invention, the upper limit of spreading speed is greatly affected by the physical properties of the coating solution. Therefore, the physical properties and surface tension of the coating solution at the moment of spreading need to be controlled.

The viscosity of the coating solution is preferably 2.0 [mPa·sec] or less, more preferably 1.5 [mPa·sec] or less, most preferably 1.0 [mPa·sec] or less. Some coating solutions change in its viscosity depending on the shear rate. Therefore, the aforementioned value indicates viscosity at the shear rate at the moment of spreading. The incorporation of a thixotropic agent in the coating solution makes it possible to provide a low viscosity during a high shear spreading and a high viscosity during drying in which little or no shear is applied to the coating solution. Thus, little unevenness can occur during drying to advantage.

Though not constituting the physical properties of the coating solution, the amount of the coating solution to be spread over the transparent support, too, affects the upper limit of spreading speed. The amount of the coating solution to be spread over the transparent support is preferably from 2.0 to 5.0 [cm$^3$/m$^2$]. When the amount of the coating solution to be spread over the transparent support increases, the upper limit of spreading speed can be raised to advantage. However, when the amount of the coating solution to be spread over the transparent support increases too much, the resulting drying load rises. Accordingly, the optimum amount of the coating solution to be spread over the transparent support is preferably predetermined depending on the formulation and procedural conditions.

The surface tension of the coating solution is preferably from 15 [mN/m] to 36 [mN/m]. The reduction of surface tension by the incorporation of a leveling agent or like means makes it possible to suppress drying unevenness to advantage. On the other hand, when the surface tension of the coating solution decreases too much, the upper limit of spreading speed decreases. Therefore, the surface tension of the coating solution is more preferably from 17 [mN/m] to 32 [mN/m], even more preferably from 19 [mN/m] to 26 [mN/m].

<Filtration>

The coating solution to be spread is preferably filtered prior to spreading. As the filter to be used herein there is preferably used one having pores having as small a diameter as possible so far as the components of the coating solution cannot be removed. For filtration, a filter having an absolute filtration precision of from 0.1 μm to 10 μm may be used. Preferably, a filter having an absolute filtration precision of from 0.1 μm to 5 μm is used. The thickness of the filter is preferably from 0.1 mm to 10 mm, more preferably from 0.2 mm to 2 mm. In this case, filtration is preferably effected at a filtration pressure of 1.5 MPa or less, more preferably 1.0 MPa or less, even more preferably 0.2 MPa or less.

The filter member to be used herein is not specifically limited so far as it cannot affect the coating solution. In some detail, the same material as the filter member for wet dispersion of inorganic compound may be exemplified.

Further, the coating solution thus filtered is preferably subjected to ultrasonic dispersion shortly before spreading to help defoaming or dispersion and retention of dispersed materials.

4-(2) Treatment Before Spreading

The support to be used in the invention is preferably subjected to surface treatment before spreading. Specific examples of surface treatment employable herein include corona discharge treatment, glow discharge treatment, flame treatment, acid treatment, alkali treatment, and ultraviolet irradiation. As disclosed in JP-A-7-333433, an undercoating layer is preferably provided to advantage.

Examples of the dusting method to be used at the dusting step as a step before spreading include dry dusting methods such as method which comprises pressing a nonwoven fabric, blade or the like against the surface of the film as disclosed in JP-A-59-150571, method which comprises blowing air having a high purity against the surface of film at a high speed to cause attached matters to be peeled off the surface of film and sucked at a nearby suction port as disclosed in JP-A-10-309553 and method which comprises blowing ultrasonically vibrating compressed air against the surface of film to cause attached matters to be peeled off the surface of film and sucked (Neutral Cleaner, produced by SHINKO CO., LTD.) as disclosed in JP-A-7-333613.

Further, there may be also used a wet dusting method such as method which comprises introducing the film into a washing tank in which attached matters are then peeled off the film using an ultrasonic oscillator, method which comprises supplying a washing solution onto the film, blowing a high speed air against the film, and then sucking the air as disclosed in JP-B-49-13020 and method which comprises continuously rubbing the web with a roll wet with a liquid, and then spraying a liquid over the rubbed surface of the web to wash the web as disclosed in JP-A-2001-38306. Particularly preferred among these dusting methods are method involving ultrasonic dusting and method involving wet dusting from the standpoint of dusting effect.

The surface of the film support is particularly preferably destaticized before the dusting step to raise the dusting efficiency and suppress the attachment of dust. For destaticization, a corona discharge process ionizer, an ionizer for emitting light such as UV and soft X-ray or the like may be used. The charged voltage of the film support before and after dusting or spreading is preferably 1,000 V or less, more preferably 300 V or less, particularly preferably 100 V or less.

From the standpoint of retention of planarity of film, the temperature of the support (preferably cellulose acylate film) is preferably Tg or less, specifically 150° C. or less at these treatment steps.

In the case where the cellulose acylate film is bonded to the polarizing film as in the use of the film of the invention as a protective film for polarizing plate, the cellulose acylate film is preferably subjected to acid treatment or alkali treatment, i.e., saponification from the standpoint of adhesion to polarizing film.

From the standpoint of adhesion, the surface free energy of the cellulose acylate film is preferably 55 mN/m or more, more preferably from not smaller than 60 mN/m to not greater than 75 mN/m. The surface free energy of the cellulose acylate film can be adjusted by the aforementioned surface treatment.

4-(3) Spreading

The various layers of the film of the invention can be formed by the following coating methods, but the invention is not limited thereto.

There may be used known methods such as dip coating method, air knife coating method, curtain coating method, roller coating method, wire bar coating method, gravure coating method, extrusion coating method (die coating method) (see U.S. Pat. No. 2,681,294) and microgravure coating method. Preferred among these coating methods are microgravure coating method and die coating method.

In the microgravure coating method to be used in the invention, a gravure roll having a diameter of from about 10 mm to 100 mm, preferably from about 20 mm to 50 mm with a gravure pattern marked on the entire circumference thereof is disposed under the support and rotated in the direction opposite the direction of conveyance of the support. Under these conditions, excessive coating solution is scraped off the surface of the gravure roll with a doctor blade so that a constant amount of the coating solution is transferred and spread over the lower surface of the support at the position where the upper surface of the support is in free state. In accordance with the microgravure coating method, at least one of hard coat layer and low refractive index layer containing a fluorine-containing olefin-based polymer can be provided on one side of the transparent support which is being continuously unwound from the rolled form.

Referring to the spreading conditions of microgravure coating method, the number of lines of gravure pattern carved on the gravure roll is preferably from 50 to 800 lines/inch, more preferably from 100 to 300 lines/inch. The depth of gravure pattern is preferably from 1 µm to 600 µm, more preferably from 5 µm to 200 µm. The rotary speed of the gravure roll is preferably from 3 rpm to 800 rpm, more preferably from 5 rpm to 200 rpm. The conveying speed of the support is preferably from 0.5 to 100 m/min, more preferably from 1 to 50 m/min.

In order to supply the film of the invention at a high productivity, an extrusion method (die coating method) is preferably employed. The extrusion method is preferably employed for a region having a small wet spread (20 cm$^3$/m$^2$ or less) such as hard coat layer and anti-reflection layer in particular.

4-(4) <Drying>

After being spread over the support directly or with other layers interposed therebetween, the film of the invention is preferably conveyed in the form of web into a zone which has been heated to remove the solvent away.

As the method for drying the solvent away there may be used various knowledges. Specific examples of these knowledges include JP-A-2001-286817, JP-A-2001-314798, JP-A-2003-126768, JP-A-2003-315505, and JP-A-2004-34002.

The temperature of the drying zone is preferably from 25° C. to 140° C. It is preferred that the temperature of the former half of the drying zone is relatively low and the latter half of the drying zone is relatively high. However, the temperature of the drying zone is preferably not higher than the value at which the volatilization of components other than the solvent contained in the various layer coating compositions begins. Some commercially available photoradical generators to be used in combination with ultraviolet-curable resin are evaporated in an amount of about scores of percent in a few minutes in a 120° C. hot air. Further, some monofunctional or bifunctional acrylate monomers are evaporated in a 100° C. hot air. In the case where these compounds are used, the temperature of the drying zone is preferably not higher than the value at which the volatilization of components other than the solvent contained in the various layer coating compositions begins.

Further, the drying air to be applied to the various layer coating compositions which have been spread over the support preferably flows over the surface of the coat film at a velocity of from 0.1 to 2 m/sec while the solid content concentration of the aforementioned coating compositions are from 1% to 50% to prevent the occurrence of drying unevenness.

When the difference in temperature between the conveying roll in contact with the support having various layer coating compositions thus spread thereover on the side thereof opposite the coated surface and the support in the drying zone is from 0° C. to 20° C., the occurrence of drying unevenness due to unevenness in heat transfer on the conveying roll can be prevented to advantage.

4-(5) Curing

The film of the invention having the solvent thus dried out can be then passed in the form of web through a zone for curing the various coat films by ionizing radiation and/or heat so that the coat films are cured.

The kind of ionizing radiation to be used in the invention is not specifically limited and may be properly selected from the group consisting of ultraviolet ray, electron ray, near ultraviolet ray, visible light, near infrared ray, infrared ray and X-ray depending on the kind of the curable composition that constitutes the film. Preferred among these ionizing radiations are ultraviolet ray and electron ray. Particularly preferred among these ionizing radiations is ultraviolet ray because it can be easily handled and can easily give a high energy.

As the light source of ultraviolet ray that causes the photopolymerization of ultraviolet reactive compound there may be used any light source emitting ultraviolet rays. Examples of the light source employable herein include low pressure mercury vapor lamp, middle pressure mercury vapor lamp, high pressure mercury vapor lamp, ultrahigh pressure mercury vapor lamp, carbon-arc lamp, metal halide lamp, and xenon lamp. Other examples of the light source employable herein include ArF exima laser, KrF exima laser, exima lamp, and synchrotron radiator. Among these light sources, ultrahigh pressure mercury vapor lamp, high pressure mercury vapor lamp, low pressure mercury vapor lamp, carbon-arc lamp, xenon-arc lamp, and metal halide lamp.

Electron rays may be similarly used. Examples of electron rays employable herein include those having an energy of from 50 keV to 1,000 keV, preferably from 100 keV to 300 keV emitted by various electron accelerators such as Cockroft-Walton type electron accelerator, Van de Graaf generator, resonance transformer type electron accelerator, insulated core transformer type electron accelerator, linear electron accelerator, Dynamitron type electron accelerator and high frequency type electron accelerator.

The radiation conditions depend on the kind of the lamp used. The radiation dose is preferably 10 mJ/cm$^2$ or more, more preferably from 50 mJ/cm$^2$ to 10,000 mJ/cm$^2$, particularly preferably from 50 mJ/cm$^2$ to 2,000 mJ/cm$^2$. During this procedure, the distribution of radiation dose in the web width direction, including the both ends thereof, is preferably from 50% to 100%, more preferably from 80% to 100% based on the maximum radiation dose at the center.

In the invention, at least one of the layers laminated on the support is preferably cured at a step where it is irradiated with ionizing radiation in an atmosphere having an oxygen concentration of 10 vol-% or less while being heated to a surface temperature of 60° C. or more for 0.5 seconds or more from the initiation of irradiation with ionizing radiation.

Further, these layers are preferably heated in an atmosphere having an oxygen concentration of 3 vol-% or less at the same time with irradiation with ionizing radiation and/or continuously.

In particular, the low refractive index layer having a small thickness is preferably cured in this manner. The curing reaction is accelerated by heat to form a film excellent in physical strength and chemical resistance.

The period of time during which irradiation with ionizing radiation is effected is preferably from not shorter than 0.7 seconds to not longer than 60 seconds, more preferably from not shorter than 0.7 seconds to not longer than 10 seconds. When irradiation with ionizing radiation is effected for 0.7 seconds or more, the curing reaction can be completed to effect sufficient curing. On the other hand, when irradiation with ionizing radiation is effected for 60 seconds or less, it is not necessary that the low oxygen concentration be kept over an extended period of time, making it possible to avoid the rise of the size of apparatus or eliminate the necessity for a large amount of inactive gas to advantage.

The ionizing radiation-curable compound is preferably cured by crosslinking reaction or polymerization in an atmosphere having an oxygen concentration of 6 vol-% or less, more preferably 4 vol-% or less, particularly preferably 2 vol-% or less, most preferably 1 vol-% or less. In order to reduce the oxygen concentration in the atmosphere, a large amount of an inactive gas such as nitrogen is needed to disadvantage from the standpoint of production cost.

Referring to the method for reducing the oxygen concentration to 10 vol-% or less, the atmosphere (nitrogen concentration: about 79 vol-%; oxygen concentration: 21 vol-%) is preferably replaced by another gas, particularly preferably by nitrogen (nitrogen purge).

Under the conditions that an inactive gas is supplied into the ionizing radiation chamber and slightly blown toward the web inlet side of the ionizing radiation chamber, the introduction of air accompanying the conveyance of the web can be eliminated, making it possible to effectively reduce the oxygen concentration in the reaction chamber and efficiently reduce the substantial oxygen concentration on the extreme surface which is much subject to inhibition of curing due to oxygen. The direction of flow of the inactive gas at the web inlet side of the radiation chamber can be controlled by properly adjusting the balance of air supply and air discharge of the radiation chamber.

A method which comprises blowing an inactive gas directly against the surface of the web is preferably used as a method for eliminating the introduction of air accompanying the conveyance of the web.

A pre-chamber can be provided before the aforementioned reaction chamber to eliminate oxygen on the surface of the web, making it possible to effect curing more efficiently. The gap between the side face constituting the web inlet side of the ionizing radiation reaction chamber or its pre-chamber and the surface of the web is preferably from 0.2 mm to 15 mm, more preferably from 0.2 mm to 10 mm, even more preferably from 0.2 mm to 5 mm to make efficient use of the inactive gas. However, in order to make continuous production of a web, web members need to be connected to each other. In order to connect the web members, there is widely used a method involving the use of an adhesive tape or the like. Therefore, when the gap between the surface of the inlet side of the ionizing radiation reaction chamber and the pre-chamber is too small, the bonding member such as adhesive tape can be caught by the surface of the inlet side of the ionizing radiation reaction chamber and the pre-chamber to disadvantage. In order to narrow the gap, the surface of the inlet side of the ionizing radiation reaction chamber and the pre-chamber is preferably partly movable so that the gap can be widened by the amount of the connected portion when the connected portion enters the ionizing radiation reaction chamber and the pre-chamber. To this end, the surface of the inlet side of the ionizing radiation chamber or the pre-chamber may be rendered movable back and forth in the conveyance direction so that when the connected portion passes by, the surface of the inlet side moves back and forth to widen the gap. Alternatively, the surface of the inlet side of the ionizing radiation reaction chamber or the pre-chamber is rendered movable perpendicularly to the surface of the web so that when the connected portion passes by, the surface of the inlet side moves vertically to widen the gap.

During curing, the surface of the film is preferably heated to a temperature of from not lower than 60° C. to not higher than 170° C. When the surface of the film is heated to 60° C. or less, the resulting heating effect is insufficient. On the other hand, when the surface of the film is heated to 170° C. or more, problems can occur such as deformation of substrate. The heating temperature is more preferably from 60° C. to 100° C. The term "surface of film" as used herein is meant to indicate the surface of the layer to be cured. The period of time during which the temperature of the film reaches the above defined value is preferably from not shorter than 0.1 seconds to not longer than 300 seconds, more preferably 10 seconds or less, form the beginning of the UV irradiation. When the period of time during which the temperature of the film is kept at the above defined range is too short, the reaction of the curable composition constituting the film cannot be accelerated. On the other hand, when the period of time during which the temperature of the film is kept at the above defined range is too long, the optical properties of the film are deteriorated. Further, problems can occur such as rise of the size of apparatus.

The heating method is not specifically limited. Preferred examples of the heating method employable herein include a method involving the contact of the film with heated roll, a method which comprises blowing heated nitrogen against the film, and a method involving the irradiation with far infrared ray or infrared ray. A method which comprises passing hot water and a medium such as vapor and oil through the rotary metal roll to effect heating as disclosed in Japanese Patent No. 2523574 ma be used as well. As the heating means there may be used a dielectrically heated roll.

Irradiation with ultraviolet ray may be effected every time when one of a plurality of constituting layers is provided or after these layers are laminated. Alternatively, two methods may be effected in combination. From the standpoint of productivity, irradiation with ultraviolet ray is preferably effected after lamination.

In the invention, at least one of the layers laminated on the support can be cured by a plurality of times of irradiation with ionizing radiation. In this case, at least two times of irradiation with ionizing radiation are preferably effected in a continuous reaction chamber the oxygen concentration in which is not more than 3 vol-%. By effecting a plurality of times of irradiation with ionizing radiation in the same low oxygen concentration reaction chamber, the reaction time required for curing can be effectively assured.

In particular, in the case where the production speed is raised for higher productivity, a plurality of times of irradiation with ionizing radiation are needed to assure the energy of ionizing radiation required for curing reaction.

Further, in the case where the percent curing (100−residual functional group content) is less than 100%, when the percent curing of the lower layer developed when the upper layer is provided thereon and cured by irradiation with ionizing radiation and/or heating is higher than that shown before the provision of the upper layer, the adhesion between the lower layer and the upper layer can be enhanced to advantage.

4-(6) Handling

In order to continuously produce the film of the invention, a step of continuously feeding a support film from rolled form, a step of spreading and drying a coating solution, a step of curing the coat film and a step of winding the support film having a cured layer provided thereon may be occasionally effected.

The film support is continuously fed from a rolled film support into a clean chamber where the charged film support is then destaticized by a destaticizer. Subsequently, foreign matters attached to the film support are removed by the dusting device. Subsequently, a coating solution is spread over the film support at a spreading zone disposed in the clean chamber. The film support thus coated is fed into a drying chamber where it is then dried.

The film support having a dried coat layer is then fed from the drying chamber into a curing chamber where the monomers contained in the coat layer are then polymerized to cure. Subsequently, the film support having a cured layer is fed into a curing zone where curing is then completed. The film support having a completely cured layer is then wound into a roll.

The aforementioned steps may be effected every time when the various layers are each formed. Alternatively, a plurality of spreading zone-drying chamber-curing zone may be provided so that the various layers can be continuously formed.

In order to form the film of the invention, it is preferred that the spreading step in the spreading zone and the drying step in the drying chamber be effected in an air atmosphere having a high cleanness at the same time with the precision filtration of the coating solution as previously mentioned. It is also preferred that dust on the film be thoroughly removed before spreading. The air cleanness at the spreading step and drying step is Class 10 (number of particles having a size of 0.5 µm or more: 353/cubic meter or less) or more, more preferably Class 1 (number of particles having a size of 0.5 µm or more: 35.5/cubic meter or less) or more according to the air cleanness specification of US Federal Standard 209E. Moreover, the air cleanness is more preferably high also in the feeding zone and winding zone other than the coating-drying step.

4-(7) Saponification

In order to use the film of the invention as one of the surface protective film for two sheets of polarizing films to prepare a polarizing plate, the surface of the film of the invention is preferably hydrophilicized on the side thereof on which it is stuck to the polarizing film to enhance the adhesion of the adherend surface thereof.

a. Method Involving Dipping in an Alkaline Solution

In this method, the film is dipped in an alkaline solution under proper conditions so that the entire surface of the film having reactivity with an alkali is saponified. This method requires no special facilities to advantage from the standpoint of cost. The alkaline solution is preferably an aqueous solution of sodium hydroxide. The concentration of the aqueous solution of sodium hydroxide is preferably from 0.5 to 3 mol/L, particularly preferably from 1 to 2 mol/L. The temperature of the alkaline solution is preferably from 30° C. to 75° C., particularly preferably from 40° C. to 60° C.

The aforementioned combination of saponification conditions is preferably a combination of relatively mild conditions. The combination of saponification conditions may be predetermined by the material and configuration of the film and the target contact angle of the film.

The film which has thus been dipped in an alkaline solution is then preferably thoroughly washed with water so that the alkaline components cannot remain in the film or dipped in a dilute acid so that the alkaline components are neutralized.

When the film of the invention is saponified, it is hydrophilicized on the surface thereof opposite the surface having a coat layer. The protective film for polarizing plate is disposed in such an arrangement that the hydrophilicized surface of the transparent support comes in contact with the polarizing film.

The hydrophilicized surface is useful to enhance the adhesion to the adhesive layer comprising a polyvinyl alcohol as a main component.

From the standpoint of adhesion to the polarizing film, the saponification is preferably effected in such a manner that the contact angle of the surface of the transparent support opposite the coat layer with respect to water is as low as possible. On the other hand, however, the dipping method is subject to damage on the surface of the transparent support having a coat layer up to the interior thereof at the same time. It is therefore important to predetermine the minimum required reaction conditions. In the case where as an indication of damage on the various layers by an alkali there is used contact angle of the other surface of the transparent support with respect to water, particularly when the transparent support is a triacetyl cellulose film, the contact angle is preferably from 10 degrees to 50 degrees, more preferably from 30 degrees to 50 degrees, even more preferably from 40 degrees to 50 degrees. When the contact angle is 50 degrees or more, a problem with adhesion to the polarizing film can occur to disadvantage. On the other hand, when the contact angle is less than 10 degrees, the film can be damaged excessively to impair its physical strength to disadvantage.

b. Method Involving Spreading of Alkaline Solution

As a method for avoiding the damage on the various layers in the aforementioned dipping method there is preferably used an alkaline solution spreading method which comprises spreading an alkaline solution only over the surface of the transparent support opposite the surface having a coat layer, heating, rinsing and then drying the alkaline coat layer thus formed under proper conditions. The term "spreading" as used herein is meant to indicate that an alkaline solution is allowed to come in contact with only the surface of the film to be saponified. Besides spreading, spraying, contact with a belt impregnated with an alkaline solution or other measures may be effected. The employment of these methods requires separate facilities and steps for spreading the alkaline solution. Thus, these methods are poorer in the dipping method a. from the standpoint of cost. On the other hand, since these methods allow the alkaline solution to come in contact with only the surface of the film to be saponified, the film can comprise a layer made of a material which can be easily affected by the alkaline solution on the other surface thereof. For example, vapor deposit or sol-gel film undergoes various phenomena such as corrosion, dissolution and exfoliation when affected by an alkaline solution and thus should not be subjected to dipping method. This spreading method can be used for these layers without any problem because these layers do not come in contact with the alkaline solution.

Any of the saponification methods a. and b. can be effected after the formation of various layers on the support which has been unwound from the roll. Thus, the step of producing a film may be followed by these saponification steps to form a continuous procedure. Further, the step of producing a film may be similarly followed by a step of sticking the film to the polarizing plate made of a support which has been unwound from the roll to form a continuous procedure. In this manner, the polarizing plate can be prepared more efficiently than the same procedure effected in the form of sheet.

c. Method Involving Protection with Laminate Film for Protection

In the case where the coat layer lacks resistance to an alkaline solution as in the case of the saponification method b., a laminate film may be stuck to the film on the final layer side thereof after the formation of the final layer. The film is then dipped in an alkaline solution so that it is hydrophilicized only on the triacetyl cellulose side thereof opposite the final layer side. Thereafter, the laminate film is peeled off the film. In accordance with this method, too, the film can be subjected to hydrophilicization required for polarizing plate protective film only on the surface of the triacetyl cellulose film opposite the final layer side without giving any damage on the coat layer. As compared with the aforementioned saponification method b., this saponification method is advantageous in that no devices for spreading an alkaline solution are required although the laminate film is generated as a waste.

d. Method Involving Dipping in Alkaline Solution after the Formation of Up to Middle Layer In the case where the film is resistant to an alkaline solution up to lower layers, but the upper layers are insufficiently resistant to the alkaline solution, the film may be dipped in the alkaline solution after the formation of up to the lower layers so that the both sides of the film is hydrophilicized. Thereafter, the upper layers may be formed. This saponification method complicates the production procedure. However, in the case where the film comprising an anti-glare layer and a low refractive index layer made of fluorine-containing sol-gel film has a hydrophilic group, this saponification method is advantageous in that the interlayer adhesion between the anti-glare layer and the low refractive index layer can be enhanced.

e. Method Involving the Formation of Coat Layer on Previously Saponified Triacetyl Cellulose Film The triacetyl cellulose film may be previously dipped in an alkaline solution so that it is saponified. A coat layer may be then formed on any one surface of the saponified triacetyl cellulose film directly or with other layers interposed therebetween. In the case where the film is dipped in an alkaline solution to undergo saponification, the interlayer adhesion of the film to the saponified and hydrophilicized surface of the triacetyl cellulose film can be deteriorated. In this case, the triacetyl cellulose film thus saponified may be subjected to corona discharge treatment, glow discharge treatment or the like only on the side thereof having a coat layer so that the hydrophilicized surface thereof is removed. Thereafter, a coat layer may be formed on the surface of the triacetyl cellulose film thus treated. Further, in the case where the coat layer has a hydrophilic group, the interlayer adhesion may be enhanced.

4-(8) Preparation of Polarizing Film

The film of the invention can be used as a polarizing film or a protective film disposed on one or both sides thereof to form a polarizing film.

In the case where the film of the invention is used as one of the protective films, the other protective film may be an ordinary cellulose acetate film. However, a cellulose acetate film which has been produced by the aforementioned solution film-forming method and then stretched in the width direction of rolled film by a factor of from 10% to 100% is preferably used.

Further, the polarizing plate of the invention preferably comprises an anti-reflection film provided on one side thereof and an optically-compensatory film having an optically anisotropic layer made of a liquid crystal compound as the other protective film.

Examples of the polarizing film include iodine-based polarizing films, dye-based polarizing films comprising dichroic dye, and polyene-based polarizing films. The iodine-based polarizing films and dye-based polarizing films are normally produced from a polyvinyl alcohol-based film.

The slow axis of the transparent support or cellulose acetate film of the anti-reflection film and the transmission axis of the polarizing film are disposed substantially parallel to each other.

For the productivity of polarizing plates, the moisture permeability of the protective film is important. The polarizing film and the protective film are stuck to each other with an aqueous adhesive. The solvent of the adhesive is dried as it diffuses in the protective film. The higher the moisture permeability of the protective film is, the faster is dried the solvent and the higher is the productivity. However, when the moisture permeability of the protective film is too high, the water content enters the polarizing film to deteriorate the polarizing properties of the polarizing plate in some working atmospheres of the liquid crystal display device (under high humidity).

The moisture permeability of the protective film is determined by the thickness, free volume, hydrophilicity, hydrophobicity and other properties of the transparent support or polymer film (and polymerizable liquid crystal compound).

In the case where the film of the invention is used as a protective film for polarizing plate, the moisture permeability of the film of the invention is preferably from 100 to 1,000 g/m$^2$·24 hrs, more preferably from 300 to 700 g/m$^{20}$·24 hrs.

The thickness of the transparent support can be adjusted by lip flow rate, line speed, stretching or shrinkage during film forming. Since the moisture permeability differs with the main material used, the moisture permeability of the protective film can be predetermined to a desired range by thickness adjustment.

The free volume of the transparent support can be adjusted by the drying temperature and time during film forming.

In this case, too, the moisture permeability differs with the main material used. Therefore, the moisture permeability of the protective film can be predetermined to a desired range by adjustment of free volume.

The hydrophilicity and hydrophobicity of the transparent support can be adjusted with additives. By adding a hydrophilic additive to the aforementioned free volume, the moisture permeability of the transparent support can be raised. On the contrary, by adding a hydrophobic additive to the free volume, the moisture permeability of the transparent support can be lowered.

By independently controlling the aforementioned moisture permeability, a polarizing plate having optical compensation properties can be produced at a low cost and a high productivity.

As the polarizing film there may be used any known polarizing film or a sheet cut out of a polarizing film of continuous length the absorption axis of which is neither parallel to nor perpendicular to the longitudinal direction. The polarizing film of continuous length the absorption axis of which is neither parallel to nor perpendicular to the longitudinal direction is prepared in the following manner.

A polymer film which is continuously fed is given a tension while being retained at both edges thereof by a retaining unit so that it is stretched. In some detail, the polymer film is stretched at least in the width direction by a factor of from 1.1 to 20.0. The difference in longitudinal moving speed of retaining unit between at the both edges thereof is 3% or less. The film is bent while being retained at both edges thereof in such a manner that the direction of movement of the film is arranged such that the angle between the direction of movement of the film at the outlet of the step of retaining the both edges of the film and the direction of substantial stretching of the film is from 20° to 70°. In particular, a polarizing film having its absorption axis disposed obliquely at 45° is preferably used from the standpoint of productivity.

For the details of the method for stretching a polymer film, reference can be made to JP-A-2002-86554, paragraph [0020]-[0030].

Among the two sheets of protective film for polarizer, the film other than the anti-reflection film is preferably an optically-compensatory film having an optically-compensatory layer containing an optically anisotropic layer. An optically-compensatory film (retardation film) is capable of enhancing the viewing angle properties of the screen of liquid crystal display devices.

As the optically-compensatory film there may be used any known optically-compensatory film. In order to widen the viewing angle, an optically-compensatory film disclosed in JP-A-2001-100042 is preferably used.

6. Embodiments of Use of the Invention

The film of the invention is used for image display devices such as liquid crystal display device (LCD), plasma display panel (PDP), electroluminescence display (ELD) and cathode ray tube display device (CRT). The optical film according to the invention can be provided on known displays such as plasma display panel (PDP) and cathode ray tube display device (CRT).

6-(1) Liquid Crystal Display Device

The film and polarizing plate of the invention can be used for image display devices such as liquid crystal display device to advantage. The film and polarizing plate of the invention are preferably provided on the outermost surface of these displays.

A liquid crystal display device comprises a liquid crystal cell and two sheets of polarizing plate disposed on the respective side thereof. The liquid crystal cell comprises a liquid crystal supported interposed between two sheets of electrode substrate. Further, an optically anisotropic layer may be disposed interposed between the liquid crystal cell and one of the polarizing plates or between the liquid crystal cell and both the polarizing plates.

The liquid crystal cell is preferably of TN mode, VA mode, OCB mode, IPS mode or ECB mode.

<TN Mode>

In a TN mode liquid crystal cell, when no voltage is applied to the liquid crystal cell, rod-shaped liquid crystal molecules are substantially horizontally aligned and twist-aligned at an angle of from 60° to 120°.

A TN mode liquid crystal cell is most widely used as a color TFT liquid crystal display device. For details, reference can be made to many literatures.

<VA Mode>

In a VA mode liquid crystal cell, when no voltage is applied to the liquid crystal cell, rod-shaped liquid crystal molecules are substantially vertically aligned.

VA mode liquid crystal cells include (1) liquid crystal cell in VA mode in a narrow sense in which rod-shaped liquid crystal molecules are oriented substantially vertically when no voltage is applied but substantially horizontally when a voltage is applied (as disclosed in JP-A-2-176625). In addition to the VA mode liquid crystal cell (1), there have been provided (2) liquid crystal cell of VA mode which is multi-domained to expand the viewing angle (MVA mode) (as disclosed in SID97, Digest of Tech. Papers (preprint) 28 (1997), 845), (3) liquid crystal cell of mode in which rod-shaped molecules are oriented substantially vertically when no voltage is applied but oriented in twisted multidomained mode when a voltage is applied (n-ASM mode) (as disclosed in Preprints of Symposium on Japanese Liquid Crystal Society Nos. 58 to 59, 1998 and (4) liquid crystal cell of SUR-VALVAL mode (as reported in LCD International 98).

<OCB Mode>

An OCB mode liquid crystal cell is a liquid crystal cell of bend alignment mode wherein rod-shaped liquid crystal molecules are oriented in substantially opposing directions (symmetrically) from the upper part to the lower part of the liquid crystal cell as disclosed in U.S. Pat. Nos. 4,583,825 and 5,410,422. In the OCB mode liquid crystal cell, rod-shaped liquid crystal molecules are oriented symmetrically with each other from the upper part to the lower part of the liquid crystal cell. Therefore, the bend alignment mode liquid crystal cell has a self optical compensation capacity. Accordingly, this liquid crystal mode is also called OCB (optically compensatory bend) liquid crystal mode. The bend alignment mode liquid crystal display device is advantageous in that it has a high responce.

<IPS Mode>

An IPS mode liquid crystal cell operates to switch display when an in-plane electric field is applied to nematic liquid crystal. For details, reference can be made to Proc. IDRC (Asia Display '95), pp. 577-580 and pp. 707-710.

<ECB Mode>

In an ECB mode liquid crystal cell, when no voltage is applied to the liquid crystal cell, rod-shaped liquid crystal molecules are substantially horizontally aligned. An ECB mode liquid crystal cell is one of liquid crystal display modes having the simplest structure. For details, reference can be made to JP-A-5-203946.

5-(2) Display Other than Liquid Crystal Display Devices

<PDP>

A plasma display panel (PDP) normally comprises a gas, glass substrates, an electrode, an electrode lead material, a thick film printing material, and a fluorescent material. The glass substrates include a front surface glass substrate and a rear surface glass substrate. The two sheets of glass substrate each have an electrode and an insulating layer formed thereon. The rear surface glass substrate further has a fluorescent material layer formed thereon. The two sheets of glass substrate are assembled to each other. A gas is then encapsulated in the gap between the two sheets of glass substrate thus assembled.

Plasma display panels (PDP) have been already marketed. For the details of plasma display panels, reference can be made to JP-A-5-205643 and JP-A-9-306366.

The front surface sheet may be disposed on the front surface of the plasma display panel. The front surface sheet is preferably provided with a strength high enough to protect the plasma display panel. The front surface sheet may be disposed apart from the plasma display panel or stuck directly to the main body of the plasma display panel.

In an image display device such as plasma display panel, an optical filter may be stuck directly to the surface of the display. Alternatively, in the case where a front surface sheet is provided in front of the display, an optical filter may be stuck to the front side (outside) or rear side (display side) of the front surface sheet.

<Touch Panel>

The film of the invention can be applied to touch panels or the like disclosed in JP-A-5-127822 and JP-A-2002-48913.

<Organic EL Element>

The film of the invention can be used as a substrate (substrate film) or protective film for organic EL element, etc.

In the case where the film of the invention is used for organic EL element or the like, the contents disclosed in JP-A-11-335661, JP-A-11-335368, JP-A-2001-192651, JP-A-2001-192652, JP-A-2001-192653, JP-A-2001-335776, JP-A-2001-247859, JP-A-2001-181616, JP-A-2001-181617, JP-A-2002-181816, JP-A-2002-181617, and JP-A-2002-056976 can be applied. Further, these contents are preferably used in combination with the contents disclosed in JP-A-2001-148291, JP-A-2001-221916, and JP-A-2001-231443.

6. Various Properties

The various measurement methods concerning the invention and desired values of properties will be described hereinafter.

6-(1) Reflectance

For the measurement of specular reflectance and tint, a Type ARV-474 adapter is mounted on a Type V-550 spectrophotometer [produced by JASCO Corporation]. The sample is then measured for specular reflectance of light which has been incident at an angle of 5° and then reflected at an angle of −5° at a wavelength of from 380 nm to 780 nm. The measurements are then used to calculate luminous reflectance which is then evaluated for anti-reflection properties.

The anti-glare anti-reflection film of the invention is preferably predetermined to have a specular reflectance of 2.5% or less and a transmittance of 90% or more so as to suppress the reflection of external light and hence enhance the viewability of the display. The specular reflectance of the anti-glare anti-reflection film of the invention is particularly preferably 1.5% or less. Most preferably, the layer configuration as disclosed in the paragraph 3-d is employed to reduce the specular reflectance of the anti-glare anti-reflection film of the invention to 1.0% or less.

6-(2) Tint

For the evaluation of tint of the anti-glare anti-reflection polarizing plate of the invention, the sample can be measured for tint of specularly reflected light, i.e., L*, a* and b* values in CIE1976L*a*b* color space with respect to light having a wavelength of from 380 nm to 780 nm from a CIE standard light source $D_{65}$ incident thereon at an angle of 5°.

L*, a* and b* values are preferably predetermined to fall within the range of $3 \leq L^* \leq 20$, $-7 \leq a^* \leq 7$ and $-10 \leq b^* \leq 10$, respectively. When these factors fall within the above defined ranges, the tint of reflected light ranging from reddish violet to bluish violet, which has been one of the problems with the related art polarizing plates, can be eliminated. Further, when these factors are predetermined to fall within the range of $3 \leq L^* \leq 10$, $0 \leq a^* \leq 5$ and $-7 \leq b^* \leq 0$, respectively, the aforementioned problem can be drastically eliminated. Thus, when the anti-glare anti-reflection polarizing plate of the invention is applied to a liquid crystal display device, the tint developed when external light having a brightness such as light from indoor fluorescent lamp is slightly reflected by the liquid crystal display device is neutral and thus is not offensive. In some detail, when a* value is not greater than 7, the reddish tint is not too strong. When a* value is not smaller than −7, the cyanish tint is not too strong to advantage. Further, when b* value is not smaller than −7, the bluish tint is not too strong. When b* is not greater than 0, the yellowish tint is not too strong to advantage.

Further, the uniformity in tint of reflected light can be determined from a* and b* on L*a*b* chromaticity diagram determined by reflection spectrum of reflected light at a wavelength of from 380 nm to 680 nm as a percent tint change according to the following numerical formulae.

Percent tint change $(a^*)=(a^*_{max}-a^*_{min})/a^*_{av} \times 100$

Percent tint change $(b^*)=(b^*_{max}-b^*_{min})/b^*_{av} \times 100$     Numerical formula (21):

wherein $a^*_{max}$ and $a^*_{min}$ represent the maximum and minimum values of a* value, respectively; $b^*_{max}$ and $b^*_{min}$ represent the maximum and minimum values of b* value, respectively; and $a^*_{av}$ and $b^*_{av}$ represent the average of a* and b* values, respectively. These percent tint changes are each preferably 30% or less, more preferably 20% or less, most preferably 8% or less.

Further, the film of the invention preferably exhibits a tint change ΔEw of 15 or less, more preferably 10 or less, most preferably 5 or less after weathering test. When the tint change ΔEw of the film of the invention after weathering test falls within the above defined range, both the elimination of reflection and the reduction of tint of reflected light can be attained at the same time. Therefore, in the case where the film of the invention is applied to the outermost surface of an image display device, for example, the tint developed when external light such as light from indoor fluorescent lamp is slightly reflected by the image display device is neutral, rendering the fidelity of displayed images good to advantage.

The aforementioned tint change ΔEw can be determined according to the following numerical formula (22).

$\Delta E_w = [(\Delta L_w)^2 + (\Delta a_w)^2 + (\Delta b_w)^2]^{1/2}$     Numerical formula (22):

wherein $\Delta L_w$, $\Delta a_w$ and $\Delta b_w$ are the change of L*, a* and b* values after weathering test, respectively.

6-(3) Sharpness of Transmitted Image

The sharpness of transmitted image can be measured by means of a Type ICM-2D image clarity meter (produced by Suga Test Instruments Co., Ltd.) with an optical sieve having a slit width of 0.5 mm according to JIS-K7105.

The sharpness of image transmitted by the film of the invention is preferably 60% or more. In general, the sharpness of transmitted image is an indication of degree of blurredness of image transmitted by a film. The greater this value is, the sharper and better is the image that can be see through the film. The sharpness of image transmitted by the film of the invention is preferably from 5% to 30% because the provision of sufficient anti-glare properties, the elimination of blurred image and the prevention of drop of dark room contrast can be attained at the same time.

6-(4) Surface Roughness

The measurement of central line average roughness (Ra) can be carried out according to JIS-B0601.

Referring to the surface roughness of the optical film of the invention, the central line average roughness Ra of the optical film of the invention is preferably from 0.001 μm to 0.30 μm. The 10 point-average roughness Rz of the optical film of the invention is preferably 10 or less times Ra. The average distance Sm between raised portion and recessed portion of roughness of the optical film of the invention is preferably from 1 μm to 100 μm. In the inventive embodiment in which a porous or hollow electrically-conductive particulate material is incorporated in the low refractive index layer of the optical film, the occurrence of interference unevenness can be eliminated even in a region having low anti-glare properties as compared with the related art embodiment comprising an electrically-conductive layer containing a high refractive index electrically-conductive particulate material. Therefore, when Ra is from 0.001 μm to 0.15 μm, the effect of the invention can be remarkably exerted.

6-(5) Haze

The haze of the film of the invention is a haze value defined according to JIS-K7105. The haze of the film of the invention is automatically measured as haze (=(scattered light/total transmitted light)×100 (%)) using a Type NDH-1001DP turbidity meter (produced by Nippon Denshoku Industries Co., Ltd.) according to the measuring method defined by JIS-K7361-1.

The surface haze and internal haze can be measured by the following procedure.

(1) The total haze value (H) of the film is measured according to JIS-K7136.

(2) A few droplets of a silicone oil are added to the front surface and rear surface of the film on the low refractive index layer side thereof. The film is then interposed between two sheets of a glass sheet having a thickness of 1 mm (microslide glass #S 9111, produced by Matsunami Glass Ind., Ltd.) so that the film comes in fully optical contact with the two sheets of glass sheet to remove surface haze. Under these conditions, the laminate is then measured for haze. Separately, two sheets of the same glass sheet having only the silicone oil interposed therebetween are measured for haze. The latter haze value is subtracted from the former haze value to calculate the internal haze (Hi) of the film.

(3) The internal haze value (Hi) thus calculated at the procedure (2) above is then subtracted from the total haze value (H) measured at the aforementioned procedure (1) to calculate the surface haze (Hs) of the film.

6-(7) Scratch Resistance

<Evaluation of Scratch Resistance with Steel Wool>

By effecting a rubbing test on the film using a rubbing tester under the following conditions, an indication of scratch resistance can be given.

Atmospheric condition for evaluation: 25° C., 60% RH

Rubbing material: steel wool (grade No. 0000, produced by Nihon Steel Wool Co., Ltd.)

The steel wool is wound on the rubbing end (1 cm×1 cm) of the tester which comes in contact with the sample, and then fixed with a band.

Moving distance (one way): 13 cm

Rubbing speed: 13 cm/sec

Load: 500 g/cm$^2$ and 200 g/cm$^2$

Contact area of forward end: 1 cm×1 cm

Number of times of rubbing: 10 (back and forth)

The sample thus rubbed is coated with an oil-based black ink on the rear side thereof, and then visually observed for scratch on the rubbed area with reflected light or for the difference in amount of reflected light from the area other than the rubbed area. In this manner, the scratch resistance of the optical film of the invention is evaluated.

<Evaluation of Scratch Resistance with Eraser>

By effecting a rubbing test on the film using a rubbing tester under the following conditions, an indication of scratch resistance can be given.

Atmospheric condition for evaluation: 25° C., 60% RH

Rubbing material: Plastic eraser (MONO, produced by Tombow Pencil Co., Ltd.)

The plastic eraser is fixed to the rubbing end (1 cm×1 cm) of the tester which comes in contact with the sample.

Moving distance (one way): 4 cm

Rubbing speed: 2 cm/sec

Load: 500 g/cm$^2$

Contact area of forward end: 1 cm×1 cm

Number of times of rubbing: 100 (back and forth)

The sample thus rubbed is coated with an oil-based black ink on the rear side thereof, and then visually observed for scratch on the rubbed area with reflected light or for the difference in amount of reflected light from the area other than the rubbed area. In this manner, the eraser scratch resistance of the optical film of the invention is evaluated.

<Taber Test>

This Taber test is effected according to JIS-K5400. In accordance with this Taber test, the scratch resistance of the film can be evaluated by the abrasion loss of the test specimen after the test.

The smaller the abrasion loss is, the better is the scratch resistance of the film.

6-(8) Hardness

<Pencil Hardness>

The strength of the film of the invention can be evaluated by pencil hardness test according to JIS-K5400.

The pencil hardness of the film of the invention is preferably H or more, preferably 2H or more, most preferably 3H or more.

<Surface Elastic Modulus>

The surface elastic modulus in the invention is a value obtained by means of a surface microhardness meter (Fischer Scope H100VP-HCU, produced by Fischer Instruments K.K.). For the determination of the surface elastic modulus in the invention, the indentation depth at a proper testing load is measured in such a manner that the indentation depth does not exceed 1 µm using a diamond quadrangular pyramid indenter (angle between the opposite faces of the forward end: 136°). The surface elastic modulus is then determined from the change of load and displacement developed during unloading.

Further, the surface hardness can be determined as universal hardness using the aforementioned surface microhardness meter. For the determination of the universal hardness, the indentation depth is measured at a testing load using a quadrangular pyramid indenter. The universal hardness is then calculated by dividing the testing load by the surface area of the resulting dent calculated by the geometrical form. It is known that there is a positive correlation between the aforementioned surface elastic modulus and the universal hardness.

The universal hardness of a crosslinked polymer as defined herein is represented by the universal hardness (N/mm$^2$) measured on a crosslinked polymer film having a thickness of from about 20 µm to 30 µm cured on a glass sheet using a microhardness meter (Fischer Scope H100, produced by Fischer Instruments K.K.) in the following procedure.

A coating solution having a solid content concentration of about 25% containing a necessary catalyst, crosslinking agent, polymerization initiator, etc. besides a crosslinkable polymer is spread over a polished slide glass (26 mm×76 mm×1.2 mm) produced by TOSHINRIKO CO., LTD. using a bar coater which has been properly selected such that the cured film thickness reaches a range of from about 20 µm to 30 µm. In the case where the crosslinkable polymer is thermosetting, the thermosetting conditions under which the film can be thoroughly cured are previously predetermined (e.g., 125° C., 10 minutes). Also in the case where the crosslinkable polymer is ionizing radiation-curable, the thermosetting conditions under which the film can be thoroughly cured are previously predetermined (e.g., oxygen concentration: 12 ppm; UV dose: 750 mJ/cm$^2$). With the load varying continuously from 0 mN to 4 mN, the film samples are each subjected to indentation by a conical diamond indenter to a depth of 1/10 of the film thickness at maximum, at which the hardness of the glass sheet substrate cannot be affected. The universal hardness is then calculated from F/A averaged over N of 6 determined from the dent area A (mm$^2$) per load F applied to the film sample.

Further, the surface hardness of the film can be determined by nanoindentation as defined in JP-A-2004-354828. The hardness of the thus determined is preferably from 2 GPa to 4 GPa. The nanoindentation elastic modulus of the film thus determined is preferably from 10 GPa to 30 GPa.

6-(9) Stainproofness Test

<Marking Ink Wipability>

The film is fixed to the surface of a glass sheet with an adhesive. Three circles having a diameter of 5 mm are then drawn on the film with the nib (fine) of a black marking ink pen "Macky Gokuboso (Macky Superfine)" (produced by ZEBRA CO. LTD.) at 25° C.—60% RH. After 5 seconds, the surface of the optical film is then wiped off with a ten-folded BEMCOT (trade name; ASAHI KASEI FIBERS CORPORATION) back and forth 20 times at a load such that the bundle of BEMCOT is depressed. The aforementioned drawing and wiping cycle is repeated under the aforementioned conditions until the ink mark i no longer erased by wiping. The number of drawing and wiping cycles at which the ink mark can be wiped off is then determined to evaluate stainproofness.

The number of drawing and wiping cycles at which the ink mark can no longer be erased is preferably 5 or more, more preferably 10 or more.

As the black marking ink there may be used also Magic Ink No. 700 (M700-T1 black) Gokuboso (Superfine). A solid circle having a diameter of 1 cm is then drawn on the sample. The sample is then allowed to stand for 24 hours. The sample is then rubbed with BEMCOT (produced by ASAHI KASEI FIBERS CORPORATION). Whether or not the marking ink can be wiped off can then be determined to evaluate marking ink wipability.

6-(10) Evaluation of Adhesion

The adhesion between the layers of the film or between the support and the coat layer can be evaluated in the following manner.

The film sample is notched on the coat layer side thereof with a knife to form a check consisting of 11 longitudinal and crosswise lines disposed 1 mm apart from each other, totaling 100 square checks. A polyester adhesive tape (No. 31B) (produced by NITTO DENKO CORPORATION) is contact-bonded to the checkered surface of the film sample which is then allowed to stand for 24 hours. The polyester adhesive tape is then peeled off the film sample. This test is effected three times in the same place. Whether or not the checks are peeled off is then visually observed.

The number of checks peeled off among the 100 checks is preferably 10 or less, more preferably 2 or less.

6-(11) Brittleness Test (Cracking Resistance)

Cracking resistance is one of important properties for preventing the occurrence of cracking during handling such as film spreading, working and cutting, spreading of adhesive over film and bonding of film to various materials.

The film sample is cut into a size of 35 mm×140 mm. The film sample is then allowed to stand at a temperature of 25° C. and a relative humidity of 60% for 2 hours. The film sample thus processed is then rounded into a cylinder. The diameter of curvature at which cracking begins is then measured to evaluate the cracking resistance of the surface of the film sample.

In the case where the film of the invention is rounded with the coat layer side thereof disposed outside, the diameter of curvature at which cracking begins is preferably 50 mm or less, more preferably 40 mm or less, most preferably 30 mm or less. Referring to cracking at the edge portion of the film, it is preferred that there occur no cracking or the length of cracking, if any, be less than 1 mm on the average.

6-(12) Dustability

The film of the invention is stuck to a monitor. Dust (fiber dust from mat or clothing) is then sprayed over the surface of the monitor. The dust is then wiped off with a cleaning cloth to evaluate the dustability of the film.

The dust can be preferably removed completely by 6 times of wiping, more preferably 3 or less times of wiping.

EXAMPLE

The invention will be further described hereinafter in the following examples, but the invention is not limited thereto. The terms "parts" and "%" as used herein are meant to indicate "parts by mass" and "% by mass", respectively, unless otherwise specified.

Example of Synthesis of Particulate Material

Synthesis Example 1

[Synthesis of Hollow Electrically-Conductive Particulate Material A-1 Having Unltrafinely Divided Au Bonded to Particulate $SiO_2$]

39 g of IPA (isopropyl alcohol) dispersion of a hollow particulate silica (prepared according to Preparation Example 4 in JP-A-2002-79616; average particle diameter: about 40 nm; shell thickness: about 10 nm; refractive index of particulate silica: 1.31; silica concentration: 20% by mass), 3 ml of 3-mercapto propyl trimethoxysilane and 15 mg of aluminum isopropoxide were added to 200 ml of MEK (ethyl methyl ketone). The mixture was then stirred. To the mixture was then added 3 ml of water. The mixture was heated to 60° C. where it was then stirred for 4 hours to undergo reaction. Thereafter, to the reaction solution was added a solution of 8.4 g of chloroauric acid (III) tetrahydrate in 80 ml of MEK. To the mixture was then added 15 ml of hydroxyacetone. The mixture was then stirred for 30 minutes. The temperature of the solution was lowered to room temperature. The dispersion thus obtained was then analyzed by TEM and XRD. As a result, ultrafinely divided Au particles having a particle diameter of from 3 nm to 5 nm were observed bonded to the entire surface of the hollow particulate silica.

The mass ratio of Au to silica ($SiO_2$) was 0.62. The specific resistivity of powder of electrically-conductive particulate material was 90 Ω·cm.

For the determination of specific resistivity of powder, the sample powder was compressed at a pressure of 9.8 MPa (100 kg/cm$^2$) to form a columnar powder molded material (diameter: 18 mm; thickness: 3 mm). The sample was then measured for dc resistivity. The measurements were then substituted in the following formula to determine the specific resistivity of powder (Ω·cm).

$$\text{Specific resistivity of powder (Ω·cm)} = \text{Measured value (Ω)} \times [2.54 \text{ (cm}^2\text{)}/0.3 \text{ (cm)}]$$

Synthesis Example 2

[Synthesis of Hollow Electrically-Conductive Particulate Material A-2 Having Particulate $SiO_2$ Covered by Antimony Oxide]

[Preparation of Hollow Silica-Based Particulate Material (C-1)]

A mixture of 100 g of a silica sol having an average particle diameter of 5 nm and an $SiO_2$ concentration of 20% by mass and 1,900 g of purified water was heated to 80° C. The resulting mother reaction liquor had a pH value of 10.5. To the mother liquor were then added 9,000 g of a 1.17% by mass aqueous solution of sodium silicate as $SiO_2$ and 9,000 g of a 0.83% by mass sodium aluminate as $Al_2O_3$ at the same time. During this procedure, the reaction solution was kept at a temperature of 80° C. Shortly after the addition of these components, the pH value of the reaction solution was raised to 12.5. Thereafter, the pH value of the reaction solution showed little or no change. After the termination of the addition of these components, the reaction solution was then allowed to cool to room temperature. The reaction solution was then washed by an ultrafiltration membrane to prepare a dispersion of primary particles of $SiO_2·Al_2O_3$ having a solid content concentration of 20% by mass.

To 500 g of the primary particle dispersion was then added 1,700 g of purified water. The mixture was then heated to 98° C. 53,200 g of ammonium sulfate having a concentration of 0.5% by mass was then added to the mixture which was being kept at the same temperature. To the mixture were then added 3,000 g of a 1.17% by mass aqueous solution of sodium silicate as $SiO_2$ and 9,000 g of a 0.5% by mass aqueous solution of sodium aluminate as $Al_2O_3$ to obtain a dispersion of a particulate composite oxide (1).

Subsequently, to 500 g of a dispersion of particulate composite oxide (1) which had been washed by an ultrafiltration membrane to have a solid content concentration of 13% by mass was added 1,125 g of purified water. To the mixture was then added dropwise a concentrated hydrochloric acid (concentration: 35.5% by mass) until the pH value thereof reached 1.0 so that it was dealuminated. Subsequently, the reaction solution was washed by an ultrafiltration member while 10 L of an aqueous solution of hydrochloric acid having a pH value of 3 and 5 L of purified water being added thereto so that the aluminum salt thus dissolved was separated out to obtain a hollow silica-based particulate material (C-1) having a solid content concentration of 20% by mass.

The silica-based particulate material (C-1) had an average particle diameter of 58 nm, $MO_x/SiO_2$ (molar) ratio of 0.0097 and a refractive index of 1.30.

[Preparation of Antimonic Acid]

111 g of antimony trioxide (produced by SUMITOMO METAL MINING CO., LTD.; KN purity: 98.5% by mass) was suspended in a solution of 57 g of caustic potash (produced by ASAHI GLASS CO., LTD.; purity: 85% by mass) in 1,800 g of purified water. The suspension thus obtained was then heated to 95° C. Subsequently, to the suspension was added an aqueous solution obtained by diluting 32.8 g of aqueous hydrogen peroxide (produced by HAYASHI PURE CHEMICAL IND., LTD.; guaranteed quality; purity: 35% by mass) with 110.7 g of purified water in 9 hours (0.1 mole/hr) to make a solution of antimony trioxide. Thereafter, the solution was ripened for 11 hours. After cooled, the solution thus obtained was measured out in an amount 1,000 g. The solution was diluted with 6,000 g of purified water, and then passed through a cation exchange resin (produced by Mitsubishi Chemical Corporation; pk-216) so that it was deionized. The solution thus obtained had a pH value of 2.1 and an electrical conductivity of 2.4 mS/cm.

Subsequently, to 400 g of a dispersion obtained by diluting the hollow silica-based particulate material (C-1) thus prepared to a solid content concentration of 1% by mass was added 40 g of antimonic acid having a solid content concentration of 1% by mass. The mixture was then stirred at 70° C. for 11 hours. The mixture was then concentrated through an ultrafilitration membrane to prepare an antimony oxide-coated silica-based particulate material (P-1) dispersion having a solid content concentration of 20% by mass. The antimony oxide-coated silica-based particulate material dispersion had an average particle diameter of 60 nm and an antimony oxide coat layer thickness of about 2 nm.

To 100 g of the antimony oxide-coated silica-based particulate material dispersion were then added 300 g of purified water and 400 g of methanol. The mixture was then mixed with 3.57 g of ethyl orthosilicate ($SiO_2$ concentration: 28% by mass). The mixture was then heated to 50° C. with stirring for 15 hours to prepare a dispersion of antimony oxide-coated silica-based particulate material (A-2) having a silica coat layer formed thereon. Using an ultrafiltration membrane, the dispersion thus obtained was then subjected to solvent replacement with methanol and concentrated to a solid content concentration of 20% by mass. Subsequently, using a rotary evaporator, the dispersion was subjected to solvent replacement with isopropyl alcohol to obtain an isopropyl alcohol dispersion of silica-based particulate material having a concentration of 20% by mass.

Subsequently, to 100 g of the isopropyl alcohol dispersion of antimony oxide-coated silica-based particulate material having a silica coat layer formed thereon was added 0.73 g of a methacrylic silane coupling agent (produced by Shin-Etsu Chemical Co., Ltd.; KBM-503). The mixture was then heated to 50° C. with stirring for 15 hours so that a silica coat layer was formed thereon to prepare a dispersion of surface-treated antimony oxide-coated silica-based particulate material (A-2).

The mass ratio of antimony oxide to silica ($SiO_2$) was 0.11. The electrically-conductive particulate material thus obtained had a powder specific resistivity of 1,600 Ω·cm and a refractive index of 1.41.

Synthesis Example 3

[Synthesis of Hollow Electrically-Conductive Particulate Material A-3 Having Particulate $SiO_2$ Coated with Antimony Oxide]

A particulate material having an average particle diameter of 76 nm and a refractive index of 1.26 was obtained in the same manner as in Synthesis Example 2 except that the conditions for the preparation of the hollow silica-based particulate material (C-1) were changed. An antimony oxide coat layer was then formed on the particulate material to a thickness of about 4 nm to form an antimony oxide-coated silica-based particulate material having an average particle diameter of 78 nm. An isopropyl alcohol dispersion of silica-based particulate material having a concentration of 20% by mass was then prepared.

Subsequently, the silica-based particulate material was subjected to surface treatment in the same manner as in Synthesis Example 2 to prepare a dispersion of surface-treated antimony oxide-coated silica-based particulate material (A-3).

The mass ratio of antimony oxide to silica ($SiO_2$) was 0.20. The electrically-conductive particulate material had a powder specific resistivity of 600 Ω·cm and a refractive index of 1.41.

Synthesis Example 4 (Comparative)

[Preparation of Silica-Based Particulate Material (B-1)]

An aqueous dispersion of the silica-based particulate material (C-1) as used in Synthesis Example 2 having a solid content concentration of 20% by mass was prepared. To 100 g of the aqueous dispersion were then added 300 g of purified water and 400 g of methanol. The mixture was then mixed with 3.57 g of ethyl orthosilicate ($SiO_2$ concentration: 28% by mass). The mixture was then heated to 50° C. with stirring for 15 hours to prepare an aqueous dispersion of a silica-based particulate material having a silica coat layer formed thereon. Using an ultrafiltration membrane, the dispersion thus obtained was then subjected to solvent replacement with methanol and concentrated to a solid content concentration of 20% by mass. Subsequently, using a rotary evaporator, the dispersion was subjected to solvent replacement with isopropyl alcohol to obtain an isopropyl alcohol dispersion of silica-based particulate material having a concentration of 20% by mass.

Subsequently, to 100 g of the isopropyl alcohol dispersion of a silica-based particulate material was added 0.73 g of a methacrylic silane coupling agent (produced by Shin-Etsu Chemical Co., Ltd.; KBM-503). The mixture was then heated to 50° C. with stirring for 15 hours to form a silica coat layer. Thus, a surface-treated silica-based particulate material (B-1)

was prepared. The surface-treated silica-based particulate material (B-1) having a silica coat layer formed thereon had an average particle diameter of 58 nm. The finely dived powder thus obtained was an insulating material.

Synthesis Example 5 (Comparative)

[Preparation of Particulate Antimony Oxide (B-2)]

111 g of antimony trioxide (produced by SUMITOMO METAL MINING CO., LTD.; KN purity: 98.5% by mass) was suspended in a solution of 57 g of caustic potash (produced by ASAHI GLASS CO., LTD.; purity: 85% by mass) in 1,800 g of purified water. The suspension thus obtained was then heated to 95° C. Subsequently, to the suspension was added an aqueous solution obtained by diluting 59.2 g of aqueous hydrogen peroxide (produced by HAYASHI PURE CHEMICAL IND., LTD.; guaranteed quality; purity: 35% by mass) with 194.9 g of purified water in 6 hours (0.27 mole/hr) to make a solution of antimony trioxide. Thereafter, the solution was ripened for 14 hours. After cooled, the solution thus obtained was measured out in an amount 1,000 g. The solution was diluted with 6,000 g of purified water, and then passed through a cation exchange resin (produced by Mitsubishi Chemical Corporation; pk-216) so that it was deionized. The solution thus obtained had a pH value of 2.0 and an electrical conductivity of 3.1 mS/cm.

Subsequently, the suspension was ripened at a temperature of 70° C. for 10 hours, and then concentrated through an ultrafiltration membrane to prepare a dispersion of particulate antimony oxide having a solid content concentration of 14% by mass. The dispersion of particulate antimony oxide (R-1) thus obtained had a pH value of 2.1 and an electrical conductivity of 1.2 mS/cm.

The dispersion of particulate antimony oxide (R-1) was then diluted to a solid content concentration of 5% by mass. To 100 g of the dispersion thus prepared was then added 100 g of methanol. The mixture was then mixed with 1.79 g of ethyl orthosilicate ($SiO_2$ concentration: 28% by mass). The mixture was then heated to 50° C. with stirring for 15 hours to prepare a dispersion of particulate antimony oxide coated with a silica coat layer. Using an ultrafiltration membrane, the dispersion thus obtained was then subjected to solvent replacement with methanol and concentrated to a solid content concentration of 20% by mass. Subsequently, using a rotary evaporator, the dispersion was subjected to solvent replacement with isopropyl alcohol to obtain an isopropyl alcohol dispersion of particulate antimony oxide having a concentration of 20% by mass.

Subsequently, to 100 g of the isopropyl alcohol dispersion of a particulate antimony oxide having a silica coat layer formed thereon was added 1.5 g of a methacrylic silane coupling agent (produced by Shin-Etsu Chemical Co., Ltd.; KBM-503). The mixture was then heated to 50° C. with stirring for 15 hours to form a silica coat layer. Thus, a dispersion of a surface-treated particulate antimony oxide (B-2) was prepared.

The dispersion of surface-treated particulate material (B-2) comprised particles having an average particle diameter of 20 nm, an electrically-conductive powder specific resistivity of 500 Ω·cm and a refractive index of 1.63.

Example of Synthesis of Optical Film

Example 1

Hard coat layer coating solutions (HC-1) to (HC-6) set forth in Table 1 were prepared.

TABLE 1

Formulation of hard coat layer coating solution

| Constituent | | HC-1 | HC-2 | HC-3 | HC-4 | HC-5 | HC-6 |
|---|---|---|---|---|---|---|---|
| DPHA | mass % | 43.0 | 21.5 | 31.0 | 31.5 | 38.0 | 34.5 |
| PETA | mass % | 43.0 | 21.5 | 40.0 | 40.0 | 40.0 | 40.0 |
| Organosilane compound | mass % | 10.0 | 5.0 | 10.0 | 10.0 | 10.0 | 10.0 |
| Polymerization initiator | mass % | 4.0 | 2.0 | 3.5 | 3.5 | 3.5 | 3.5 |
| Inorganic particulate material B-2 | mass % | 0.0 | 50.0 | 0.0 | 0.0 | 0.0 | 0.0 |
| Particulate crosslinked styrene | mass % | 0.0 | 0.0 | 10.0 | 0.0 | 5.5 | 0.0 |
| Particulate crosslinked acryl-styrene | mass % | 0.0 | 0.0 | 5.5 | 0.0 | 3.0 | 0.0 |
| Particulate crosslinked acryl | mass % | 0.0 | 0.0 | 0.0 | 0.0 | 0.0 | 12.0 |
| Particulate silica | mass % | 0.0 | 0.0 | 0.0 | 15.0 | 0.0 | 0.0 |
| Solid content concentration | mass % | 30.0 | 30.0 | 30.0 | 30.0 | 30.0 | 30.0 |
| Solvent formulation (MIBK/IPA/MEK) | mass % | (90/0/10) | (72/20/8) | (90/0/10) | (90/0/10) | (90/0/10) | (90/0/10) |

The content of the constituents in Table 1 above are each represented by the mass percentage of solid content. The compounds used will be described in detail below.

PETA: (Mixture of pentaerythritol triacrylate and pentaerythritol tetraacrylate, produced by NIHON KAYAKU CO., LTD.)

DPHA: (Mixture of dipentaerythritol pentaacrylate and dipentaerythritol hexaacrylate, produced by NIHON KAYAKU CO., LTD.)

Organosilane compound: (3-Acryloyloxypropyl trimethoxysialne, KBM-5103, produced by Shin-Etsu Chemical Co., Ltd.)

Polymerization initiator: (Irgacure 184, produced by Nihon Ciba-Geigy K.K.)

Particulate crosslinked styrene: (Particulate crosslinked polystyrene having a particle diameter of 3.5 μm; SX-350, produced by Soken Chemical & Engineering Co., Ltd.)

Particulate crosslinked acryl-styryl: (Particulate crosslinked acryl-styrene having a particle diameter of 3.5 μm; produced by Soken Chemical & Engineering Co., Ltd.)

Particulate crosslinked acryl: (Particulate crosslinked PMMA having a particle diameter of 3 μm, MXS-300, produced by Soken Chemical & Engineering Co., Ltd.)

Particulate silica: (Particulate silica having a particle diameter of 1.5 μm; KE-P150, produced by NIPPON SHOKUBAI CO., LTD.)

MIBK: (Methyl isobutyl ketone)

IPA: (Isopropyl alcohol)

MEK: (Methyl ethyl ketone)

Low refractive index layer coating solutions were prepared as follows.

(Preparation of Low Refractive Index Layer Coating Solution (LL-1))

32.1 g of ethyl orthosilicate ($SiO_2$ concentration: 28% by mass) and 1.22 g of henicosafluorododecyl trimethoxysilane were mixed with a mixture of 55.0 g of isopropyl alcohol, 10 g of purified water and 1.69 g of a 61% by mass nitric acid. The mixture was then stirred at 50° C. for 1 hour to prepare a matrix-forming component solution having a solid content concentration of 10% by mass (M-1).

Subsequently, 6.7 g of the matrix-forming component solution (M-1) was mixed with 1.65 g of the dispersion of antimony oxide-coated silica-based particulate material (A-2) prepared above. The mixture was then diluted with isopropyl alcohol to prepare a low refractive index layer coating solution (LL-1) having a solid content concentration of 1.0% by mass.

(Preparation of Low Refractive Index Layer Coating Solution (LL-2))

A low refractive index layer coating solution (LL-2) having a solid content concentration of 1.0% by mass was prepared in the same manner as in the preparation of the low refractive index layer coating solution (LL-1) except that the aforementioned comparative silica-based particulate material (B-1) was used instead of the dispersion of antimony oxide-coated silica-based particulate material (A-2).

(Preparation of Low Refractive Index Layer Coating Solution (LL-3))

36.5 g of ethyl orthosilicate ($SiO_2$ concentration: 28% by mass) was mixed with 51.8 g of isopropyl alcohol, 10 g of purified water and 1.69 g of a 61% by mass nitric acid. The mixture was then stirred at 50° C. for 1 hour to prepare a matrix-forming component solution (M-2) having a solid content concentration of 10% by mass.

Subsequently, 7 g of the matrix-forming component solution (M-2) was mixed with 1.5 g of the dispersion of antimony oxide-coated silica-based particulate material (A-2) prepared above. The mixture was then diluted with isopropyl alcohol to prepare a low refractive index layer coating solution (LL-3) having a solid content concentration of 1.0% by mass.

(Preparation of Low Refractive Index Layer Coating Solution (LL-4))

34.3 g of ethyl orthosilicate ($SiO_2$ concentration: 28% by mass) was mixed with and 0.61 g of henicosafluorododecyl trimethoxysilane were mixed with a mixture of 55.0 g of isopropyl alcohol, 10 g of purified water and 1.69 g of a 61% by mass nitric acid. The mixture was then stirred at 50° C. for 1 hour to prepare a matrix-forming component solution (M-3) having a solid content concentration of 10% by mass.

Subsequently, 6.7 g of the matrix-forming component solution (M-3) was mixed with 1.65 g of the comparative particulate silica (B-1) prepared above. The mixture was then diluted with isopropyl alcohol to prepare a low refractive index layer coating solution (LL-4) having a solid content concentration of 1.0% by mass.

(Preparation of Low Refractive Index Layer Coating Solution (LL-7))

A low refractive index layer coating solution (LL-7) was prepared in the same manner as in the preparation of the low refractive index layer coating solution (LL-1) except that the fluorine-containing organosilane compound was changed to heptadecafluorodecyl trimethoxysilane in the same amount.

(Preparation of Stainproof Layer Coating Solution (OC-1))

Henicosafluorododecyl trimethoxysilane was dissolved in isopropyl alcohol to prepare a stainproof layer coating solution (OC-1) having a concentration of 0.1% by mass.

The coating solution thus obtained was then used to prepare the following optical film.

(Preparation of Optical Film (101))

A hard coat layer coating solution (HC-1) was spread over a triacetyl cellulose film having a thickness of 80 μm and a width of 1,340 mm "TAC-TD80U" {produced by Fuji Photo Film Co., Ltd. (now, FUJIFILM corporation)} at a conveying speed of 30 m/minute by a microgravure coating method, and then dried at 60° C. for 150 seconds. While the air in the vessel was being purged with nitrogen (oxygen concentration: 0.05% or less), the coat layer was then irradiated with ultraviolet ray having an emission energy of 100 mJ/cm$^2$ from a 160 W/cm air-cooled metal halide lamp (produced by EYE GRAPHICS CO., LTD.) at a radiation illuminance of 400 mW/cm$^2$ so that it was cured to prepare a hard coat layer having a thickness of 4 μm. The optical film with hard coat layer is designated as "HC-1A".

The aforementioned low refractive index layer coating solution (LL-1) was then spread over (HC-1A) by a microgravure coating method in such a manner that the cured low refractive index layer had a thickness of 95 nm to prepare Sample 101. Shortly before the spreading of the low refractive index layer coating solution, to the low refractive index layer coating solution was added 3-isocyanatepropyl triethoxysilane in an amount of 1.5% by mass based on the total solid content. After spreading, the solvent was then evaporated at 90° C. for 150 seconds. The coat layer was then heat-cured at 120° C. for 10 minutes. Thereafter, while the air in the vessel was being purged with nitrogen to attain an atmosphere having an oxygen concentration of 0.01 vol-% or less, the coat layer was then irradiated with ultraviolet ray having an emission energy of 240 mJ/cm$^2$ from a 240 W/cm air-cooled metal halide lamp {produced by EYE GRAPHICS CO., LTD.) at a radiation illuminance of 120 mW/cm$^2$. The refractive index of the low refractive index layer was 1.43. In this manner, the optical film (101) was prepared.

(Preparation of Optical Film (102))

A hard coat layer coating solution (HC-1) was spread over a triacetyl cellulose film having a thickness of 80 μm and a width of 1,340 mm "TAC-TD80U" {produced by Fuji Photo Film Co., Ltd. (now, FUJIFILM Corporation)} at a conveying speed of 30 m/minute by a microgravure coating method, and then dried at 60° C. for 150 seconds. While the air in the vessel was being purged with nitrogen (oxygen concentration: 0.05% or less), the coat layer was then irradiated with ultraviolet ray having an emission energy of 100 mJ/cm$^2$ from a 160 W/cm air-cooled metal halide lamp {produced by EYE GRAPHICS CO., LTD.) at a radiation illuminance of 400 mW/cm$^2$ so that the coat layer was cured to prepare a hard coat layer having a thickness of 3.7 μm (HC-2A).

The aforementioned hard coat layer coating solution (HC-2) was then spread over (HC-2A) by a microgravure coating method in such a manner that the cured hard coat layer had a thickness of 0.3 μm at a conveying speed of 30 m/minute. The coat layer was then heat-cured at 60° C. for 150 seconds. Thereafter, while the air in the vessel was being purged with nitrogen (oxygen concentration: 0.05% or less), the coat layer was then irradiated with ultraviolet ray having an emission energy of 100 mJ/cm$^2$ from a 160 W/cm air-cooled metal halide lamp {produced by EYE GRAPHICS CO., LTD.) at a radiation illuminance of 400 mW/cm$^2$ so that the coat layer was cured. The optical film with hard coat layer is designated as "HC-2B".

The aforementioned low refractive index layer coating solution (LL-2) was then spread over the hard coat layer of (HC-2B) by a microgravure coating method in such a manner that the cured low refractive index layer had a thickness of 95 nm to prepare Sample 102. Shortly before the spreading of the low refractive index layer coating solution, to the low refractive index layer coating solution was added 3-isocyanatepropyl triethoxysilane in an amount of 1.5% by mass based on the total solid content. After spreading, the solvent was then evaporated at 90° C. for 150 seconds. The coat layer was then heat-cured at 120° C. for 10 minutes. Thereafter, while the air in the vessel was being purged with nitrogen to attain an atmosphere having an oxygen concentration of 0.01 vol-% or less, the coat layer was then irradiated with ultraviolet ray having an emission energy of 240 mJ/cm² from a 240 W/cm air-cooled metal halide lamp {produced by EYE GRAPHICS CO., LTD.) at a radiation illuminance of 120 mW/cm². Thus, an optical film (102) was prepared.

(Preparation of Optical Films (103) to (105))

Anti-reflection films (103) to (105) were prepared in the same manner as in the optical film (101) except that the low refractive index layer coating solution was changed (LL-2) to (LL-4), respectively.

(Preparation of Optical Film (106))

The aforementioned stainproof layer coating solution (OC-1) was spread over the aforementioned optical film (103), and then cured at 110° C. for 10 minutes to form a stainproof layer. The thickness of the stainproof layer was 2 nm.

The configuration of the optical films (101) to (106) will be set forth in Table 2 below. These optical films were each then measured for surface roughness (Ra). As a result, the surface roughness of these optical films were found to be from 0.03 to 0.05, demonstrating that these optical films had a clear surface.

TABLE 2

| Sample No. | Layer configuration | | | Remarks |
|---|---|---|---|---|
| | Hard coat layer | Low refractive index layer | Stainproof layer | |
| 101 | HC-1 | — | LL-1 | — | Inventive |
| 102 | HC-1 | HC-2 | LL-2 | — | Comparative |
| 103 | HC-1 | — | LL-3 | — | Comparative |
| 104 | HC-1 | — | LL-2 | — | Comparative |
| 105 | HC-1 | — | LL-4 | — | Comparative |
| 106 | HC-1 | — | LL-3 | OC-1 | Inventive |
| 107 | HC-1 | — | LL-7 | — | Inventive |

(Evaluation of Optical Film)

The film samples thus obtained were each allowed to stand at 25° C.—60% RH for 24 hours, and then evaluated for the following properties.

(Evaluation 1) Surface Resistivity (Log SR)

For the measurement of surface resistivity (SR), a circular electrode method was employed. The common logarithm of the surface resistivity was then calculated as log (SR). Those allowing the leakage of surface charge and showing remarkable elimination of dust attachment have log (SR) of 12 or less, particularly preferably 10 or less.

(Evaluation 2) Contact Angle

Using a Type CA-V automatic contact angle meter (produced by Kyowa Interface Science Co., Ltd.), a 2 μl droplet of purified water was dropped onto the film. After 30 seconds, the contact angle of the film was then measured. The contact angle of the film of the invention with respect to purified water is preferably 95° or more, most preferably 105° or more.

(Evaluation 3) Dynamic Friction Coefficient

The dynamic friction coefficient of the film was measured with a 5 mmφ stainless steel sphere at a load of 100 g and a speed of 60 cm/min using a Type HEIDON-14 dynamic friction coefficient meter. The dynamic friction coefficient of the film of the invention is preferably 0.30 or less, most preferably 0.20.

(Evaluation 4) (Si2p/Fls)

The area of photoelectron spectrum of Si2p and Fls on the outermost surface of the optical film measured by a Type ESCA-3400 X-ray photoelectron spectroscope (produced by Shimadzu Corporation; degree of vacuum: 1×10⁻⁵ Pa; X-ray source: target Mg; voltage: 12 kV; current: 20 mA) were used to calculate the ratio of peak area (Si2p/Fls) of silicon atom (Si2p) to fluorine atom (Fls) on the surface of the optical film. The smaller this ratio is, the more is the proportion of fluorine atom based on silicon atom in the surface of the film and the more can be expected the reduction of surface free energy.

(Evaluation 5) Stainproofness/Stainproof Durability

The optical film was fixed to the surface of a glass sheet with an adhesive. Three circles having a diameter of 5 mm were drawn on the optical film with the nib (fine) of a black marking ink pen "Macky Gokuboso (Macky Superfine)" (produced by ZEBRA CO. LTD.) at 25° C.—60% RH. After 5 seconds, the surface of the optical film was wiped off with a ten-folded BEMCOT (trade name; ASAHI KASEI FIBERS CORPORATION) back and forth 20 times at a load such that the bundle of BEMCOT was depressed. The aforementioned drawing and wiping cycle was repeated under the aforementioned conditions until the ink mark was no longer erased by wiping. The number of drawing and wiping cycles at which the ink mark can be wiped off was determined to evaluate stainproofness. The number of drawing and wiping cycles at which the ink mark can no longer be erased is 15 or more, more preferably 50 or more.

Using a rubbing tester, rubbing test was effected on the optical film under the following conditions. The optical film thus rubbed was then processed in the same manner as in the aforementioned stainproofness evaluation to evaluate stainproof durability.

Rubbing material: The rubbing end (1 cm×1 cm) of the tester in contact with the sample was wrapped by BEMCOT M-3 (produced by ASAHI KASEI FIBERS CORPORATION) which was then fixed to the rubbing end with a band so that it could not be moved. BEMCOT on the rubbing end of the tester was impregnated with 1.0 g of a weakly alkaline household detergent (Glass Mypet, produced by KAO CORPORATION).

Moving distance (one way): 13 cm, rubbing speed: 13 cm/sec.

Load: 200 g/cm³, contact area of forward end: 1 cm×1 cm

Number of times of rubbing: 10 reciprocations (Evaluation 6) Dustproofness

The various antireflection film samples were each stuck to the surface of CRT in such an arrangement that the transparent support side thereof was opposed to CRT. The laminate was then used in a room having dust and tissue paper dust having a size of 0.5 μm or more in a number of from 1,000,000 to 2,000,000 per ft³ (cubic feet) for 24 hours. The number of dust and tissue paper dust per 100 cm² of the antireflection film was then counted. When the average value of counts was less than 20, the dustproofness was evaluated as A. When the average value of counts was from 20 to 49, the dustproofness was evaluated as B. When the average value of counts was from 50 to 199, the dustproofness was evaluated as C. When the average value of counts was 200 or more, the dustproofness was evaluated as D.

(Evaluation 7) Evaluation of Steel Wool Scratch Resistance (SW)

Using a rubbing tester, rubbing test was effected under the following conditions.

Evaluation atmosphere: 25° C., 60% RH

Rubbing material: The rubbing end (1 cm×1 cm) of the tester in contact with the sample was wrapped by a steel wool (No. 0000, produced by Nihon Steel Wool Co., Ltd.) which was then fixed to the rubbing end with a band so that it could not be moved. The film sample was then rubbed with the rubbing end of the tester back and forth.

Moving distance (one way): 13 cm, rubbing speed: 13 cm/sec.

Load: 200 g/cm$^3$, contact area of forward end: 1 cm×1 cm

Number of times of rubbing: 10 reciprocations

The sample thus rubbed was coated with an oil-based black ink on the other side thereof.

The sample was then visually observed with reflected light for scratch at the rubbed area.

The results were then evaluated according to the following criterion.

G: No scratch observed even when very carefully observed;
GF: Slight scratch observed when very carefully observed;
F: Some slight scratch observed;
FP: Middle class of scratch observed;
P: Scratch observed at glance (Evaluation 8) Evaluation of Coating Unevenness The optical film was cut into an A4 size sheet. A PET film with a black adhesive was then stuck to the back side of the sheet. The sample was then visually evaluated for coating unevenness under a 1,000 lux three-wavelength fluorescent lamp according to the following criterion. Fives sheets of the A4 size sample were observed in this manner to evaluate the frequency of occurrence of unevenness.

E: No unevenness observed;
G: One or less unevennesses observed, but acceptable for normal use;
F: 1 to 3 unevennesses observed;
P: Three or more unevennesses observed The results of evaluation are set forth in Table 3.

trically-conductive particulate material required to lower the surface resistivity of the outermost surface of the optical film can be reduced to advantage from the standpoint of cost (comparison of Sample 101 with Sample 102). It can be also seen that the inventive sample containing a fluorine-containing silane compound in the layer containing an electrically-conductive particulate material the interior of which is porous or hollow or its adjacent layer is excellent in stainproof durability even when the proportion of fluorine atoms in the surface thereof is the same as that of the comparative samples (comparison of Sample 101 with Samples 102 and 104). It can also be seen that when a fluorosilane compound having a fluoroalkyl group having 10 or more carbon atoms (CloF$_{21}$—) is used, the stainproof durability after rubbed with a nonwoven cloth impregnated with a weakly alkaline detergent is little deteriorated. This fluorosilane compound can exert a higher effect on the stainproof layer. (comparison of Samples 101, 105, 107). Moreover, the inventive optical films (101) and (106) exhibit as low a luminous reflectance as 2.1 and thus is excellent in antireflection properties.

Example 2

(Preparation of Low Reflective Layer Coating Solution (LL-5))

A low refractive index layer coating solution (LL-5) was prepared in the same manner as in the preparation of the low refractive index layer coating solution (LL-1) except that the fluorine-containing silane compound was replaced by the following compound (21) in the same amount.

Compound (21)

$(C_2H_5O)_3SiC_3H_6NHCOCF_2O(CF_2O)_b$—

—$(CF_2CF_2O)_cCF_2CONHC_3H_6Si(OC_2H_5)_3$ wherein b and c each represent a natural number of larger than 2 to less than 16 and larger than 3 to less than 14, respectively, with the proviso that the b and c satisfy the relationship ½≦b/c≦2.

TABLE 3

| Sample No. | log SR | Contact angle (°) | Dynamic friction coefficient | Si2p/Fls | Stainproofness | Stainproof durability (after rubbed) | Dust-proofness | Scratch resistance (SW) | Coating unevenness | Remarks |
|---|---|---|---|---|---|---|---|---|---|---|
| 101 | 9.5 | 106 | 0.20 | 0.13 | 15 | 12 | A | G | E | Inventive |
| 102 | 9.5 | 106 | 0.20 | 0.13 | 11 | 5 | A | GF | P | Comparative |
| 103 | >14.0 | 38 | 0.50 | (∞) | 0 | 0 | B | P | E | Comparative |
| 104 | >14.0 | 106 | 0.20 | 0.13 | 11 | 5 | D | G | E | Comparative |
| 105 | >14.0 | 90 | 0.40 | 0.60 | 1 | 0 | B | GF | E | Comparative |
| 106 | 9.5 | 109 | 0.18 | 0.09 | 30 | 25 | A | G | E | Inventive |
| 107 | 9.5 | 104 | 0.21 | 0.14 | 5 | 0 | A | G | E | Inventive |

As can be seen in Table 3 above, the optical film having a layer containing an electrically-conductive particulate material the interior of which is porous or hollow and a fluorine-containing silane compound according to the invention exhibits a low surface resistivity, a high contact angle and a low dynamic friction coefficient and is excellent in stainproofness and stainproof durability without impairing its dustproofness and scratch resistance. In the constitution of the invention, the low refractive index layer acts also as an antistatic layer to render the optical film dustproof. In this arrangement, the provision of a new antistatic layer is not needed and a high refractive index antistatic layer is not provided, making it possible to suppress the occurrence of coating unevenness. Further, the absolute amount of the elec- (Preparation of Low Refractive Index Layer Coating Solution (LL-6))

A low refractive index layer coating solution (LL-6) was prepared in the same manner as in the preparation of the low refractive index layer coating solution (LL-1) except that the fluorine-containing silane compound was replaced by the following compound (22) in the same amount.

Compound (22)

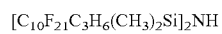

$[C_{10}F_{21}C_3H_6(CH_3)_2Si]_2NH$ (Preparation of Stainproof Layer Coating Solution (OC-2))

Heptadecafluorodecyl trimethoxysilane was dissolved in isopropyl alcohol to prepare a 0.1% by mass stainproof layer coating solution (OC-2).

(Preparation of Stainproof Layer Coating Solution (OC-3))

A fluorine-containing silane compound represented by the following compound (23) (molecular mass: about 5,000, mixture of compounds where p=2 to 10, produced by DAIKIN INDUSTRIES, ltd.) was diluted with perfluorohexane to prepare a 0.1% by mass stainproof layer coating solution (OC-3).

Compound (23)

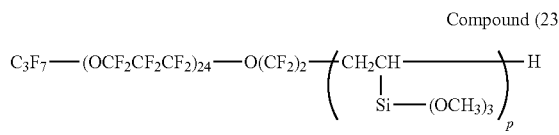

(Preparation of Stainproof Layer Coating Solution (OC-4))

4 parts by mass of a fluorine-containing silane compound represented by the following compound (24) and 1 part by mass of an alkoxysilane having a long-chain hydrocarbon group represented by the following compound (25) were dissolved in 200 parts by mass of ethyl alcohol. To the solution were then added 1 part by mass of acetyl acetone and 0.001 parts by mass of concentrated hydrochloric acid to make a uniform solution which was then diluted with ethyl alcohol to prepare a 0.1% stainproof layer coating solution (OC-4).

Compound (24)

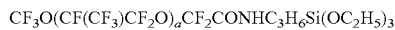

wherein a represents a number of from not smaller than 2 to smaller than 12.

Compound (25)

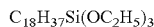

(Preparation of Stainproof Layer Coating Solution (OC-5))

DSX (produced by DAIKIN INDUSTRIES, ltd.), which is a fluoropolyether group-containing organosilane compound, was diluted with Florinate FC-77 (produced by Sumitomo 3M Japan) to prepare a stainproof layer coating solution (OC-5) of 0.1% by mass.

(Preparation of Optical Film (201))

An optical film with hard coat layer (HC-5A) was prepared in the same manner as in the preparation of the optical film with hard coat layer (HC-1A) in Example 1 except that the hard coat layer coating solution was changed to (HC-5).

The low refractive index layer coating solution (LL-1) was spread over (HC-5A) and then cured in the same manner as in the preparation of Sample (101) of Example 1 to prepare an optical film (201).

(Preparation of Optical Films (202 and 203))

Optical films (202 and 203) were prepared in the same manner as in the preparation of the optical film (201) except that the kind of the low refractive index layer coating solution was changed as set forth in Table 4.

(Preparation of Optical Film (204))

The low refractive index layer coating solution (LL-3) was spread over the aforementioned optical film with hard coat layer (HC-5A) and cured in the same manner as in the preparation of Sample (103) of Example 1 to obtain an optical film (204) having up to a low refractive index layer formed thereon. The aforementioned stainproof layer coating solution (OC-2) was spread over the optical film (204), and then cured at 110° C. for 10 minutes to form a stainproof layer. The thickness of the stainproof layer was 2 nm.

(Preparation of Optical Films (205 to 208))

Optical films (205 to 208) were prepared in the same manner as in the preparation of the optical film (204) except that the stainproof layer coating solution was changed as set forth in Table 4.

The configuration of the optical films (201) to (208) are set forth in Table 4 below.

TABLE 4

| | Layer configuration | | | |
|---|---|---|---|---|
| Sample No. | Hard coat layer | Low refractive index layer | Stainproof layer | Remarks |
| 201 | HC-5 | LL-1 | — | Inventive |
| 202 | HC-5 | LL-5 | — | Inventive |
| 203 | HC-5 | LL-6 | — | Inventive |
| 204 | HC-5 | LL-3 | OC-2 | Inventive |
| 205 | HC-5 | LL-3 | OC-1 | Inventive |
| 206 | HC-5 | LL-3 | OC-3 | Inventive |
| 207 | HC-5 | LL-3 | OC-4 | Inventive |
| 208 | HC-5 | LL-3 | OC-5 | Inventive |

These optical films were each then evaluated in the same manner as in Example 1. The results are set forth in Table 5.

TABLE 5

| Sample No. | log SR | Contact angle (°) | Dynamic friction coefficient | Si2p/Fls | Stainproofness | Stainproof durability (after rubbed) | Dust-proofness | Scratch resistance (SW) | Coating unevenness | Remarks |
|---|---|---|---|---|---|---|---|---|---|---|
| 201 | 9.5 | 106 | 0.20 | 0.13 | 15 | 12 | A | G | E | Inventive |
| 202 | 9.5 | 109 | 0.16 | 0.12 | 20 | 16 | A | G | E | Inventive |
| 203 | 9.5 | 106 | 0.21 | 0.13 | 15 | 9 | A | G | E | Inventive |
| 204 | 9.5 | 107 | 0.19 | 0.10 | 25 | 12 | A | G | E | Inventive |
| 205 | 9.5 | 109 | 0.18 | 0.09 | 30 | 25 | A | G | E | Inventive |
| 206 | 9.5 | 110 | 0.15 | 0.08 | 40 | 33 | A | G | E | Inventive |
| 207 | 9.5 | 111 | 0.13 | 0.07 | >50 | >50 | A | G | E | Inventive |
| 208 | 9.5 | 111 | 0.13 | 0.07 | >50 | >50 | A | G | E | Inventive |

As can be seen in Table 5, the optical film according to the invention exhibits a low surface resistivity, a high contact angle and a low dynamic friction coefficient and thus is excellent in stainproofness and stainproof durability without impairing the dustproofness and scratch resistance of optical film. It can also been seen that the optical film exhibits a low dynamic friction coefficient, and is excellent in both stainproofness and stainproof durability particularly when a fluoroether-based compound is used.

Example 3

(Preparation of Optical Film (301))

An optical film (301) was prepared in the same manner as in the preparation of the optical film (206) in Example 2 except that the thickness of the low refractive index layer was changed to 280 nm.

(Preparation of Optical Film (302))

An optical film (302) was prepared in the same manner as in the preparation of the optical film (206) in Example 2 except that the electrically-conductive particulate material (A-2) to be incorporated in the low refractive index layer was changed to the electrically-conductive particulate material (A-3).

(Preparation of Optical Film (303))

An optical film (303) was prepared in the same manner as in the preparation of the optical film (206) in Example 2 except that the electrically-conductive particulate material (A-2) to be incorporated in the low refractive index layer was changed to the electrically-conductive particulate material (A-1).

These optical films were each then evaluated in the same manner as in Example 1. For the evaluation of dustproofness, an additional evaluation was effected at a lowered relative humidity of 40%. The results are set forth in Table 6.

These samples were each then measured for, surface roughness, surface haze, internal haze. As a result, these samples exhibited the following values.

Sample 501 (Ra=0.19 μm; internal haze: 35%; surface haze: 6%)

Sample 502 (Ra=0.06 μm; internal haze: 15%; surface haze: 1%)

Sample 503 (Ra=0.10 μm; internal haze: 20%; surface haze: 3%)

Sample 504 (Ra=0.10 μm; internal haze: 2%; surface haze: 8%)

These samples were each then evaluated in the same manner as in Example 2. As a result, it was found that all these samples exhibit a low surface resistivity and excellent dustproofness and stainproof durability similarly to Sample 206 of Example 2.

TABLE 6

| Sample No. | log SR | Contact angle (°) | Dynamic friction coefficient | Si2p/Fls | Stainproofness | Dust-proofness (60% RH) | Dust-proofness (40% RH) | Scratch resistance (SW) | Remarks |
|---|---|---|---|---|---|---|---|---|---|
| 301 | 8.7 | 110 | 0.15 | 0.08 | 40 | A | A | G | Inventive |
| 302 | 8.9 | 110 | 0.15 | 0.08 | 40 | A | A | G | Inventive |
| 303 | 8.9 | 110 | 0.15 | 0.08 | 40 | A | A | G | Inventive |
| 206 | 9.5 | 110 | 0.15 | 0.08 | 40 | A | B | G | Inventive |

As can be seen in Table 6, when the thickness of the low refractive index layer containing an electrically-conductive particulate material is raised or the resistivity of the electrically-conductive particulate material itself is lowered, the surface resistivity of the optical film can be lowered, making it possible to enhance the dustproofness thereof at a low humidity.

Both the optical films (206) and (301) exhibited a luminous reflectance of 1.9. It can thus seen that when the thickness of the layer containing an electrically-conductive particulate material is predetermined to fall within the optical range of optical interference, the enhancement of dustproofness of the optical film can be attained without substantially raising the luminous reflectance.

Example 5

Samples 501 to 504 were prepared in the same manner as in the preparation of the optical film (206) of Example 1 except that the formulation of the hard coat layer was changed as set forth in Table 7.

TABLE 7

| | Layer configuration | | | |
|---|---|---|---|---|
| Sample No. | Hard coat layer | Low refractive index layer | Stainproof layer | Remarks |
| 501 | HC-3 | LL-3 | OC-3 | Inventive |
| 502 | HC-4 | LL-3 | OC-3 | Inventive |
| 503 | HC-5 | LL-3 | OC-3 | Inventive |
| 504 | HC-6 | LL-3 | OC-3 | Inventive |

Example 6

[Saponification of Optical Film]

The back side of the optical film of Example 2 was saponified under the following conditions.

Alkaline bath: 1.5 mol/dm$^3$ aqueous solution of sodium hydroxide, 55° C.—120 seconds First rinse bath: tap water, 60 seconds Neutralizing bath: 0.05 mol/dm$^3$ sulfuric acid, 30° C.—20 seconds Second rinse bath: tap water, 60 seconds Drying: 120° C., 60 seconds

[Preparation of Polarizing Plate with Optical Film]

Iodine was adsorbed to a stretched polyvinyl alcohol film to prepare a polarizing film. The saponified antireflection film of example 2 was then stuck to one side of the polarizing film thus prepared with a polyvinyl alcohol-based adhesive in such an arrangement that the support (triacetyl cellulose) side of the antireflection film was disposed opposed to the polarizing film. A viewing angle widening film having an optical compensation effect "Wide View Film SA12B" (produced by Fuji Photo Film Co., Ltd.) was saponified, and then stuck to the other side of the polarizing film with a polyvinyl alcohol-based adhesive. Thus, a polarizing plate was prepared.

The transmission type liquid crystal display device of TN mode having a polarizing plate mounted thereof was then evaluated. As a result, it was confirmed that display devices excellent viewability, dustproofness, scratch resistance and stainproofness can be prepared.

Example 7

The optical film of Example 2 was stuck to the surface glass sheet of an organic EL display device with an adhesive. As a result, a display device having an excellent stainproofness, a low reflectance and a high viewability was obtained.

The optical film of the invention is excellent in stainproofness and dustproofness, and particularly stainproof durability. The optical film of the invention is also an optical film having an excellent scratch resistance and eliminated coating unevenness which can be produced at a high productivity. Further, the constitution capable of rendering the surface layer electrically-conductive has an effect of enhancing the surface electrical conductivity even when the amount of antistatic agent to be used is small to advantage from the standpoint of cost as well. Moreover, the optical film of the invention comprises an electrically-conductive particulate material incorporated therein the interior of which is porous or hollow and thus exhibits a low reflectance. A polarizing plate or display device comprising the optical film of the invention exhibits an excellent handleability, reflects little external light or background and thus shows a high viewability.

The entire disclosure of each and every foreign patent application from which the benefit of foreign priority has been claimed in the present application is incorporated herein by reference, as if fully set forth.

What is claimed is:

1. An optical film, which comprises:
a support; and
a layer containing an electrically-conductive particulate material, in which an interior of the electrically-conductive particulate material is porous or hollow,
wherein the optical film comprises a fluorine-containing silane compound represented by formula [5],
wherein the layer containing the electrically-conductive particulate material is a low refractive index layer, and comprises at least one cured material of a hydrolyzate of an organosilane and a condensate of the organosilane,
wherein the volume fraction of the electrically-conductive particulate material is from not smaller than 30% to not greater than 80%, and
wherein the layer containing the electrically-conductive particulate material comprises the fluorine-containing silane compound and is an outermost surface:

$$Rf^5[-(L_5)_n\text{-}X\text{—}R^{51}\text{—}Si(OR^{52})_3]_m \qquad \text{Formula [5]}$$

wherein $Rf^5$ represents a perfluoropolyether group;
$R^{51}$ represents an alkylene group;
$R^{52}$ represents an alkyl group;
$L_5$ represents —CO—;
X represents a group selected from the group consisting of —O—, —NR$^{53}$—, —S—, —SO$_2$—, —SO$_2$NR$^{53}$— and —NR$^{53}$CO—;
$R^{53}$ represents a hydrogen atom or an alkyl group having 3 or less carbon atoms;
n represents a natural number of 0 or 1; and
m represents a natural number of 2 or less.

2. The optical film according to claim 1, which further comprises:
a stainproof layer containing a fluorine-containing silane compound provided directly on the layer containing the electrically-conductive particulate material.

3. The optical film according to claim 1,
wherein the layer containing the fluorine-containing silane compound further contains a compound represented by formula [7]:

$$R^{71}\text{—}Si(OR^{72})_3 \qquad \text{Formula [7]}$$

wherein $R^{71}$ represents a long-chain hydrocarbon group having 10 or more carbon atoms; and
$R^{72}$ represents an alkyl group.

4. The optical film according to claim 1,
wherein a ratio of peak area (Si2p/Fls) of silicon atom (Si2p) to fluorine atom (Fls) on a surface of the optical film as measured by X-ray photoelectron spectroscopy is from not smaller than 0.0 to not greater than 0.4.

5. The optical film according to claim 1, which has a dynamic friction coefficient of from not smaller than 0.02 to not greater than 0.30.

6. The optical film according to claim 1, which has a contact angle of 95° or more with respect to water.

7. The optical film according to claim 1, which has a surface resistivity of 12 or less as expressed in terms of log (SR).

8. The optical film according to claim 1,
wherein the layer containing the electrically-conductive particulate material is a low refractive index layer and has a thickness of from not smaller than 130 nm to not greater than 500 nm.

9. A polarizing plate, which comprises an optical film according to claim 1.

10. An image display device, which comprises an optical film according to claim 1.

11. An optical film, which comprises:
a support; and
a layer containing an electrically-conductive particulate material, in which an interior of the electrically-conductive particulate material is porous or hollow,
wherein the optical film comprises a fluorine-containing silane compound represented by formula [5],
which further comprises a stainproof layer containing the fluorine-containing silane compound and a compound represented by formula [7], provided directly on the layer containing the electrically-conductive particulate material,
wherein the layer containing the electrically-conductive particulate material is a low refractive index layer, and comprises at least one cured material of a hydrolyzate of an organosilane and a condensate of the organosilane,
wherein the volume fraction of the electrically-conductive particulate material is from not smaller than 30% to not greater than 80%:

$$Rf^5[-(L_5)_n\text{-}X\text{—}R^{51}\text{—}Si(OR^{52})_3]_m \qquad \text{Formula [5]}$$

wherein $Rf^5$ represents a perfluoropolyether group;
$R^{51}$ represents an alkylene group;
$R^{52}$ represents an alkyl group;
$L_5$ represents —CO—;
X represents a group selected from the group consisting of —O—, —NR$^{53}$—, —S—, —SO$_2$—, —SO$_2$NR$^{53}$— and —NR$^{53}$CO—;
$R^{53}$ represents a hydrogen atom or an alkyl group having 3 or less carbon atoms;
n represents a natural number of 0 or 1; and
m represents a natural number of 2 or less, $$R^{71}\text{—}Si(OR^{72})_3 \qquad \text{Formula [7]}$$

wherein $R^{71}$ represents a long-chain hydrocarbon group having 10 or more carbon atoms; and
$R^{72}$ represents an alkyl group.

12. The optical film according to claim 11, wherein the layer containing the electrically-conductive particulate material comprises a fluorine-containing silane compound and is an outermost surface.

13. The optical film according to claim 11, wherein a ratio of peak area (Si2p/Fls) of silicon atom (Si2p) to fluorine atom (Fls) on a surface of the optical film as measured by X-ray photoelectron spectroscopy is from not smaller than 0.0 to not greater than 0.4.

14. The optical film according to claim 11, which has a dynamic friction coefficient of from not smaller than 0.02 to not greater than 0.30.

15. The optical film according to claim 11, which has a contact angle of 95° or more with respect to water.

16. The optical film according to claim 11, which has a surface resistivity of 12 or less as expressed in terms of log (SR).

17. The optical film according to claim 11, wherein the layer containing the electrically-conductive particulate material is a low refractive index layer and has a thickness of from not smaller than 130 nm to not greater than 500 nm.

18. A polarizing plate, which comprises an optical film according to claim 11.

19. An image display device, which comprises an optical film according to claim 11.

* * * * *